(12) United States Patent
Emori et al.

(10) Patent No.: US 7,199,919 B2
(45) Date of Patent: Apr. 3, 2007

(54) TUNABLE MULTIMODE WAVELENGTH DIVISION MULTIPLEX RAMAN PUMP AND AMPLIFIER, AND A SYSTEM, METHOD, AND COMPUTER PROGRAM PRODUCT FOR CONTROLLING TUNABLE RAMAN PUMPS, AND RAMAN AMPLIFIERS

(75) Inventors: Yoshihiro Emori, Chiyoda-ku (JP); Shu Namiki, Chiyoda-ku (JP); Junji Yoshida, Chiyoda-ku (JP); Naoki Tsukiji, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 181 days.

(21) Appl. No.: 10/388,463

(22) Filed: Mar. 17, 2003

(65) Prior Publication Data
US 2003/0210457 A1 Nov. 13, 2003

Related U.S. Application Data

(60) Provisional application No. 60/364,034, filed on Mar. 15, 2002, provisional application No. 60/364,127, filed on Mar. 15, 2002.

(51) Int. Cl.
*H01S 4/00* (2006.01)
*H04B 10/12* (2006.01)

(52) U.S. Cl. .................................... 359/334
(58) Field of Classification Search ............... 359/334
See application file for complete search history.

(56) References Cited

U.S. PATENT DOCUMENTS

| | | |
|---|---|---|
| 4,616,898 A | 10/1986 | Hicks, Jr. |
| 5,664,131 A | 9/1997 | Sugiya |
| 5,673,280 A | 9/1997 | Grubb et al. |
| 5,715,263 A | 2/1998 | Ventrudo et al. |
| 5,887,093 A | 3/1999 | Hansen et al. |
| 5,912,761 A | 6/1999 | Jander et al. |
| 5,940,209 A | 8/1999 | Nguyen |
| 5,995,275 A | 11/1999 | Sugaya |
| 6,038,063 A | 3/2000 | Tsuda et al. |
| 6,115,174 A | 9/2000 | Grubb et al. |
| 6,178,038 B1 | 1/2001 | Taylor et al. |

(Continued)

FOREIGN PATENT DOCUMENTS

WO     WO 01/51986     7/2001

(Continued)

OTHER PUBLICATIONS

E. Bruce, IEEE Spectrum, pp. 35-39, "Tunable Lasers", Feb. 2002.

(Continued)

*Primary Examiner*—Jack Keith
*Assistant Examiner*—Eric Bolda
(74) *Attorney, Agent, or Firm*—Oblon, Spivak, McClelland, Maier & Neustadt, P.C.

(57) ABSTRACT

A tunable multimode wavelength division multiplex Raman pump and amplifier, and a system, method, and computer program product for controlling a tunable Raman pump and amplifier. The tunability of the pump source is accomplished by controlling the optical output and central wavelengths of tunable semiconductor laser devices. The system includes a microprocessor-based controller that monitors an amplifier's performance and adjusts the drive current and/or wavelength of the tunable pumps of an amplifier to achieve a target performance.

42 Claims, 36 Drawing Sheets

U.S. PATENT DOCUMENTS

| | | |
|---|---|---|
| 6,188,705 B1 | 2/2001 | Krainak et al. |
| 6,229,631 B1 | 5/2001 | Sato et al. |
| 6,246,510 B1 | 6/2001 | BuAbbud et al. |
| 6,292,288 B1 * | 9/2001 | Akasaka et al. ............ 359/334 |
| 6,310,716 B1 | 10/2001 | Evans et al. |
| 6,313,940 B1 | 11/2001 | Bode et al. |
| 6,317,255 B1 | 11/2001 | Fatehi et al. |
| 6,320,884 B1 | 11/2001 | Kerfoot, III et al. |
| 6,433,920 B1 | 8/2002 | Welch et al. |
| 6,433,921 B1 * | 8/2002 | Wu et al. ................... 359/334 |
| 6,441,952 B1 * | 8/2002 | Duan et al. ................. 359/334 |
| 6,760,148 B2 * | 7/2004 | Islam ......................... 359/334 |
| 6,768,577 B2 * | 7/2004 | Eggleton et al. ............ 359/335 |
| 6,845,117 B2 * | 1/2005 | Wakisaka et al. ............. 372/46 |
| 2001/0036004 A1 | 11/2001 | Ackerman et al. |

OTHER PUBLICATIONS

Y. Emori, et al., OFC/IOOC, Technical Digest, pp. PD19-1 to PD19-3, "100nm Bandwidth Flat Gain Raman Amplifiers Pumped and Gain-Equalized By 12-Wavelength-Channel WDM High Power Laser Diodes", Feb. 1999.

* cited by examiner

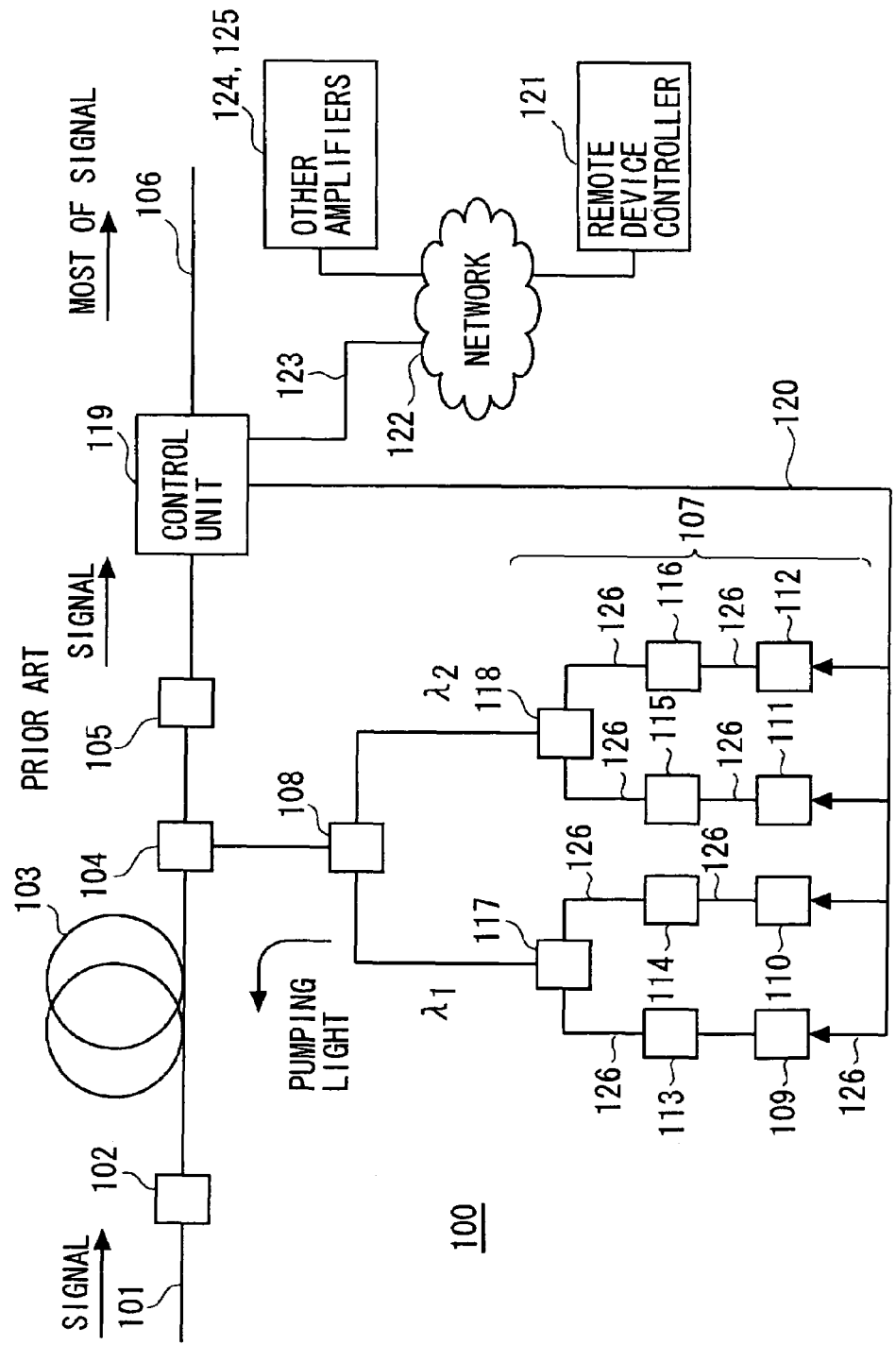

FIG. 12
Superposition Principle
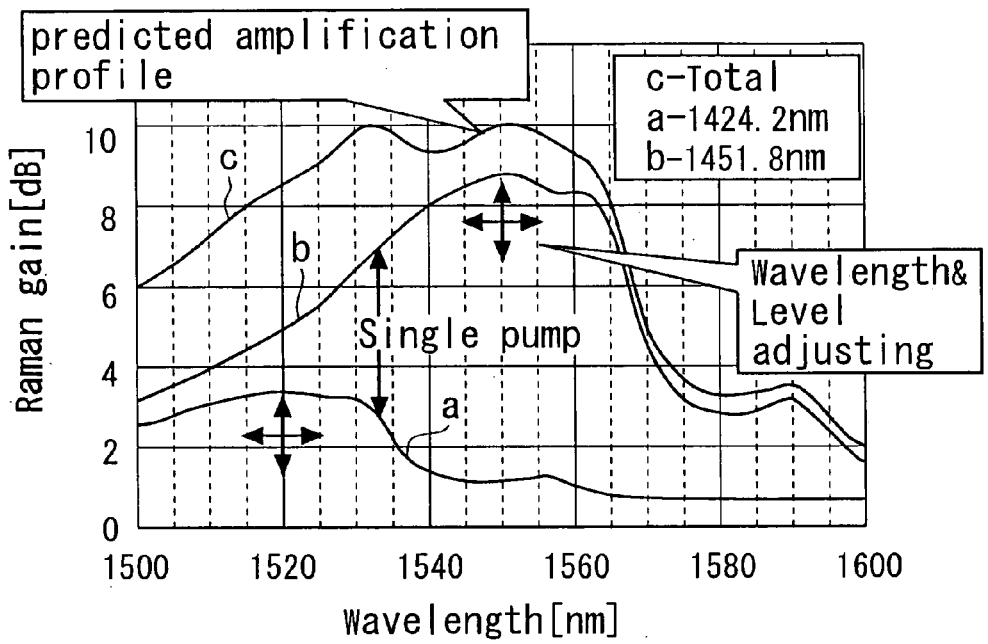
FIG. 13A
FIG. 13B
Design of pumping wavelength based on superposition principle
Design parameters:
Wavelength allocation
effective gain allocation
Specifications:
fiber type, gain and flatness bandwidth, number of LDs
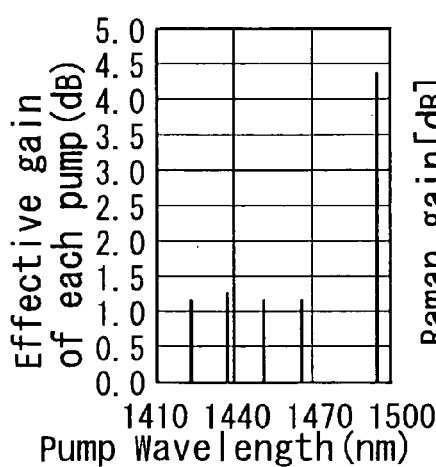
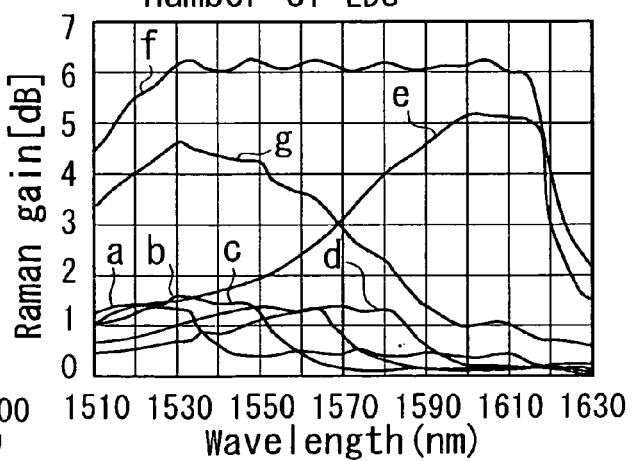

TUNABLE MULTIMODE WAVELENGTH DIVISION MULTIPLEX RAMAN PUMP AND AMPLIFIER, AND A SYSTEM, METHOD, AND COMPUTER PROGRAM PRODUCT FOR CONTROLLING TUNABLE RAMAN PUMPS, AND RAMAN AMPLIFIERS

CROSS-REFERENCE TO RELATED PATENT APPLICATIONS

This application claims the benefit of the earlier filing date of commonly owned U.S. provisional patent application Ser. No. 60/364,127 filed on Mar. 15, 2002, entitled A TUNABLE MULTIMODE WAVELENGTH DIVISION MULTIPLEX RAMAN PUMP AND AMPLIFIER, AND A SYSTEM, METHOD, AND COMPUTER PROGRAM PRODUCT FOR CONTROLLING TUNABLE RAMAN PUMPS, AND RAMAN AMPLIFIERS; and provisional patent application Ser. No. 60/364,034 filed Mar. 15, 2002, entitled DEVICE AND METHOD FOR PROVIDING A TUNABLE SEMICONDUCTOR LASER, the entire contents of each of which, including all appendices contained therein, being incorporated herein by reference. This application also contains subject matter related to that disclosed in U.S. Pat. No. 6,292,288, filed on Mar. 17, 2000, entitled "RAMAN AMPLIFIER, OPTICAL REPEATER, AND RAMAN AMPLIFICATION METHOD"; U.S. patent application Ser. No. 09/832,885, filed on Apr. 12, 2001, entitled "SEMICONDUCTOR LASER DEVICE FOR USE IN A LASER MODULE"; U.S. patent application Ser. No. 09/775,632, filed on Feb. 5, 2001, entitled "RAMAN AMPLIFIER SYSTEM, APPARATUS, AND METHOD FOR IDENTIFYING, OBTAINING, AND MAINTAINING AN ARBITRARY RAMAN AMPLIFICATION PERFORMANCE"; U.S. patent application Ser. No. 10/187,621 filed Jul. 3, 2002, entitled UTILITY SEMICONDUCTOR LASER DEVICE AND METHOD FOR SUPPRESSING INJECTION CURRENT; and U.S. patent application Ser. No. 10/214,177 filed Aug. 8, 2002, entitled DEVICE AND METHOD FOR PROVIDING A TUNABLE SEMICONDUCTOR LASER, the entire contents of each of these applications being incorporated herein by reference.

BACKGROUND OF THE INVENTION

1. Field of the Invention

The present invention relates to a tunable multimode wavelength division multiplex Raman pump and amplifier, and a system, method, and computer program product for controlling the same.

2. Discussion of the Background

With the explosion of the information age has come a demand for larger data transmission capacity for optical communication systems. Conventionally, optical communication systems transmitted data on a single optical fiber using a single wavelength of light (e.g., 1310 nm or 1550 nm). Signals at these wavelengths were desirable since they have reduced light absorption properties for optical fibers. However, in order to increase the data transmission capacity of these single fiber systems, it was necessary to increase the number of optical fibers laid on a transmission route which greatly increased the cost of optical fiber networks.

To mitigate this problem, wavelength division multiplexing (WDM) optical communications systems such as the dense wavelength division multiplexing (DWDM) system have become desirable. In a WDM system, a plurality of optical signals, each having a different wavelength, can be transmitted simultaneously through a single optical fiber.

Optical fiber communication systems transmit optical signals over considerable distances. However, the signal strength of the optical signals attenuates with distance because of absorption and scattering. Signal strength attenuation ultimately results in signal reception degradation if the signal strength is not kept above background noise (or other sources of noise) by a predetermined amount. Amplifiers are used to keep the signal strength above background noise by a predetermined amount. In general, there are two approaches to amplifying an optical signal: the first, is to use an electronic repeater, which converts the optical signal into an electric signal, amplifies the electrical signal, and then converts the amplified electrical signal back into an optical signal for further transmission along an optical fiber; the second, is to amplify the optical signal itself. Two types of amplifiers that can be used to amplify an optical signal according to the second approach are rare earth doped fiber amplifiers such as erbium doped fiber amplifiers (EDFA), and Raman amplifiers.

EDFAs are currently the most widely used optical amplifiers for WDM systems and are effective and reliable for optically amplifying WDM signals. However, EDFAs have an amplification bandwidth that is limited in range, and produce a wavelength-dependent gain profile. These two characteristics of EDFAs are undesirable for WDM signals, which are spectrally distributed, since a non-uniform amount of gain will be applied to the various WDM channels, depending on the wavelength of the channels. To offset this effect, a gain flattening filter may be used to obtain a uniform or flat gain profile (having a gain deviation of less than 1 dB) across the entire communication band. The gain flattening filter is designed to have a loss profile having a shape that is the inverse of the shape of the gain profile. Gain flattening filters, however, are limited to a particular gain profile, and are not dynamically adjustable to compensate for changes in a magnitude of the gain of the EDFA. Therefore, a flat gain profile cannot be maintained when the gain of the EDFA is changed, or if the attributes of the communications network are changed, such as by adding more WDM signals. In addition, the gain flattening filter decreases the total amount of power launched into an optical fiber.

Raman amplifiers use a phenomenon known as Stimulated Raman Scattering (SRS) of light within an optical fiber to achieve a gain in a particular wavelength band. The inelastic scattering process generates an optical phonon and a co-propagating Stokes wave, light that is downshifted in frequency from the pump light by an amount equal to the phonon frequency (i.e. total energy is conserved). In silica fibers, the peak SRS gain occurs at about 13 THz below the pump light frequency (or conversely, at a wavelength that is longer than a wavelength of the light pumped into the optical fiber by about 100 nm). Since Raman amplification is a scattering process, unassociated with the resonance properties of any particular material, one can generate a Raman gain spectrum for pump light at any wavelength. Therefore, changing a wavelength of the pump light, changes the wavelength at which a peak gain is applied to WDM signals, thereby amplifying some WDM signals more than others. By multiplexing several different pump wavelengths into the same fiber, one can generate a reasonably flat gain spectrum over an arbitrary bandwidth. Because Raman amplifiers require a greater pumping power to obtain the same gain as an EDFA, Raman amplifiers have primarily been used in signal wavelength bands outside of the amplification bandwidth of EDFAs.

Although a Raman amplifier amplifies a signal over a wide wavelength band, the gain of a Raman amplifier is relatively small and, therefore, it is preferable to use a high output laser device as a pumping source. However, increasing the output power of a single mode (or frequency) pumping source beyond a certain threshold leads to undesirable stimulated Brillouin scattering and increased noise at high peak power values. As recognized by the present inventors, to prevent this problem, a multimode laser device is preferably used as a pumping source in a Raman amplifier. A multimode laser has a plurality of oscillating longitudinal modes, each providing output power at less than the threshold at which stimulated Brillouin occurs. A multimode laser can provide a sufficient amount of output power to achieve Raman amplification distributed over the various modes (i.e., wavelengths of output light), as opposed to providing the power all at a single wavelength.

To control the wavelength of the light emitted from the pumping source, and therefore, determine what wavelength of signal will be amplified, it is well known to use fiber gratings. A fiber grating selectively reflects certain wavelengths of light causing a laser beam of a specific wavelength to be output. Fiber gratings are known to be included in the core of an optical fiber, separate from the laser device itself. However, having the grating separate from the semiconductor laser device has been found to be problematic in that it allows for noise to be introduced, for instabilities due to the mechanical vibrations that can occur between the semiconductor laser device and the optical fiber including the fiber grating, and for losses.

However, as described in U.S. patent application Ser. No. 09/832,885, a diffraction grating may be included within a spacer layer of the semiconductor device itself. By having the semiconductor laser device itself control the output characteristics of the generated light, without the use of an external grating, opportunities for noise, instabilities, and losses are minimized. The diffraction grating is configurable, allowing for the wavelengths and spacing between the multiple modes of light being generated to be predetermined.

As described in Bruce, E. "Tunable Lasers," IEEE Spectrum, pages 35–39, February 2002, there are a variety of other types of tunable lasers made for use in WDM systems, although the primary application is for generating a WDM signal at a particular frequency (or wavelength). As recognized by the present inventors, since none of these tunable lasers are made for operation as a Raman pump source that intentionally outputs light at more than one frequency, it is unclear from the literature how, or whether, these devices could be adapted for use in multimode applications.

As described in U.S. Pat. No. 6,292,288, in order to achieve a uniform gain profile over a broad range of wavelengths, a Raman amplifier can include multiple pump lasers, each providing multimode light having a predetermined spectral width, centered at a different central wavelength. By properly spacing in wavelength the pump lasers with predetermined optical output levels, it is possible to achieve a composite gain profile that is flat over a broad range of wavelengths, and therefore to provide Raman amplification over a broad range of wavelengths.

U.S. patent application Ser. No. 09/775,632 describes a system through which Raman amplification performance can be controlled. As described in that application, by controlling an output power of each of the lasers of a particular Raman amplifier, the desired gain characteristics can be maintained. Moreover, by monitoring and controlling a portion of a network, the Raman amplification performance of that portion can be controlled through cooperative adjustments made to one or more of the Raman amplifiers (or of individual pump lasers of a particular Raman amplifier) that impact that portion of the network.

FIG. 1 is a block diagram of a conventional Raman amplifier 100. The Raman amplifier 100 includes an amplifier fiber (optical fiber) 103, a WDM coupler 104, a pumping device 107, a control unit 119, and optional polarization independent isolators 102, 105. The Raman amplifier 100 is connected (or merely coupled) to an input fiber 101 and an output fiber 106, which may be optical transmission fibers such as single mode fibers (SMF), dispersion compensation fibers (DCF), dispersion flattening fibers, etc. The amplifier fiber (or optical signal transmission fiber) 103 may be similar types of fibers as well.

The Raman amplifier 100 is connected to a network 122 via a communication link 123. The network 122 is also connected to other amplifiers 124, 125 as well as a remote device controller 121. The remote device controller 121 monitors the operational status of the Raman amplifier 100 as well as the other amplifiers 124, 125. The network 122 may be a proprietary wireless or wired network, or another network that is publicly accessible, such as the Internet or a hybrid network, part proprietary and part publicly accessible. While the Raman amplifier 100 may operate autonomously, it may receive additional information about the overall system performance, such that the control unit 119 can adapt the amplification performance of the Raman amplifier 100 to help offset any adverse affects to the system's performance, as might be necessitated by a change in conditions, described in the additional information. As an example, this additional information may be that a replacement fiber with different attenuation characteristics is being used to interconnect two cascaded Raman amplifiers in a WDM system. In this case, the Raman amplifier 100 may set a new "target" amplification performance so as to normalize the channel characteristics for all of the WDM channels, despite the fact that the new fiber may attenuate some of the channels by a lesser amount than others.

The pumping device 107 includes Fabry-Perot type semiconductor lasers 109, 110, 111, 112, wavelength stabilizing fiber gratings 113, 114, 115, 116, polarization couplers 117, 118, and a WDM coupler 108. The central wavelengths of the semiconductor lasers 109 and 110 and wavelengths of the fiber gratings 113 and 114 are the same wavelength $\lambda_1$, and the central wavelengths of the semiconductor lasers 111 and 112 and reflection wavelengths of the fiber gratings 115 and 116 are the same wavelength $\lambda_2$. The central wavelengths of the semiconductor lasers 109, 110, and 111 and 112 are respectively stabilized to $\lambda_1$ and $\lambda_2$ via the wavelength stabilizing fiber gratings 113, 114 and 115, 116.

Multimode light generated by the semiconductor lasers 109, 110 and 111, 112 is combined by polarization combiners 117, 118 for each central wavelength $\lambda_1$ and $\lambda_2$, respectively. The light output from the polarization combiners 117, 118 is combined by the WDM coupler 108. Polarization maintaining fibers 126 are used in the connections between the semiconductor lasers 109, 110, 111, 112 and the polarization combiners 117, 118 to maintain two different polarization planes. This ensures that an input signal to the Raman amplifier 100 will be adequately amplified regardless of its orientation in the signal fiber 101 or amplification fiber 103.

The pumping device 107 in this example includes two pumps that provide light having two different wavelengths $\lambda_1$ and $\lambda_2$ to the amplifier fiber 103 (i.e., a first pump that provides light having a central wavelength of $\lambda_1$, and a second pump that provides light having a central wavelength of $\lambda_2$). Further, as noted in U.S. Pat. No. 6,292,288, a wavelength interval between the wavelengths $\lambda_1$ and $\lambda_2$ is selected to be in a range of 6 nm to 35 m in order to provide a flat gain profile over a range including both $\lambda_1$ and $\lambda_2$.

The light output from the pumping device 107 is coupled to the amplifier fiber 103 via the WDM coupler 104. An optical signal (e.g., a WDM signal) is incident on the amplifier fiber 103 via the input fiber 101. The optical signal is then boosted in signal level after the gain medium has being excited by the light pumped into the amplifier fiber 103, the net result being that the optical signal is Raman-amplified. In addition, the Raman-amplified optical signal is passed through the WDM coupler 104 and is transmitted toward the control unit 119, where a part of the amplified optical signal is branched to form a monitor signal (or sampled output signal), while the majority of the signal is output on the output fiber 106.

The control unit 119 includes a processor to assert control over the amplification performance of the Raman amplifier. The control can be based on either the monitored signal or an external source, such as, for example, a control signal received from the remote device controller 121. The control unit 119 generates a control signal on a bus 120, that includes a sufficient number of control lines, so as to allow for control of the drive currents and for the individual semiconductor lasers 109, 110, 111, 112 to achieve a small gain deviation relative to a target gain profile (e.g., a flat amplification profile).

FIG. 1B is a block diagram showing a redundant pump source that is an alternative to each of the separate LD lasers 109, 110, 111, and 112. In particular, the redundant pump source of FIG. 1B includes LD pump source A and LD pump source B, each being multimode and having a same central wavelength. The outputs from the two different LD pump sources are combined in a 3 dB coupler and output as two output light beams, each of which includes half powers from each of the LD pump sources. The redundant pump sources are used because it is possible that one of the LD pump sources will fail. In this failure situation, the output power will be reduced by half, unless the input power to the LD pump module that continues to operate is increased to offset the optical power lost by the failure of the companion LD pump source. In this way, even if one of the LD pump sources fails, the failed light source is survived by its companion, which can still produce some pump power output.

As compared with EDFAs, for example, Raman amplifiers are more complex devices since they contain more laser diode modules, operate over wider bandwidths that are determined by system parameters, and require controllers that are able to establish predetermined amounts of gain across the amplification bandwidth, consistent with network requirements. As recognized by the present inventors, part of the complexity is manifested in a controller that is able to adjust pump output levels when environmental or network requirements change. For example, the central wavelengths of the pump modules will change as a function of temperature. This change in central wavelength will result in change in gain shape, which must be detected by the controller and compensated. However, changing pump power level also affects the Raman amplifier's gain characteristic, and thus optimum control is not always possible due to temperature induced wavelength shifts in pump light.

Likewise, changes in system requirements may create a situation where the amplification bandwidth of the amplifier must be changed (i.e., widen, or shift to another band). While some changes are possible by switching-in or switching-out pumps to accommodate bandwidth changes, this leads to more expensive amplifiers, because more pumps are needed in the amplifier, albeit not used until needed. Likewise, some of the pumps may degrade overtime or fail. On-board spares may be used to mitigate reliability concerns, however this solution is expensive to implement if all pumps are provided with an on-board spare.

The addition of channels within the amplification bandwidth is another possible scenario. In such a scenario, it may be necessary to increase amplifier power to avoid pump depletion. Since Raman scattering is a non-linear process, the amplifier gain cannot be increased by simply increasing the laser pump power, since doing so will change the power partitioning in the output wavelengths, which will likely result in a non-flat gain spectrum.

The present inventors have also recognized that while Raman amplifiers may be used in tandem with erbium doped fiber amplifiers (EDFA), the combination sometimes can result in poor performance of the EDFA. In this situation, inherent bandwidth or gain profile of an EDFA-based system may be suboptimal due to temperature induced gain profile changes in the EDFA and/or operator-changed EDFA gain.

The present inventors have also recognized that conventional Raman amplifier systems are "custom built" to address the specific requirements for system integrators. However, as with most manufacturing processes that require customization, the cost for producing custom product is substantially greater than that for mass produced devices. Thus the present inventors have recognized a need for a narrow band amplifier that is able to be "field-configured" so that the amplifiers may be made in bulk production, yet still used in a variety of different situations in operational systems.

The present inventors have also recognized that because conventional WDM pumped Raman amplifier systems have fixed pumping wavelengths, there are fewer degrees of freedom for making adjustments to Raman gain profiles when performing adaptive dynamic gain equalization. However, the present inventors recognized that by shifting frequencies (or wavelengths) of the pump sources themselves, provides yet another control variable that simplifies adaptive dynamic gain equalization and refines the ability to compensate for wavelength ripple and thus flattening composite gain profiles in cascaded optical amplifier systems.

The present inventors have also recognized that because conventional Raman amplifiers have fixed wavelength LD pumps, there is no possibility for providing an automated process for adjusting gain profiles through a process that includes wavelength shifting. Thus, the present inventors have recognized the possibility of using a tunable LD pump, in combination with a controller feedback mechanism, to provide a fully automated Raman amplifying system that uses a plurality of tunable Raman amplifiers (or alternatively just one tunable Raman amplifier).

SUMMARY OF THE INVENTION

The inventors of the present invention have recognized that conventional optical communication systems are limited as to their flexibility and adaptability. Accordingly, one object of the present invention is to provide a tunable multimode wavelength division multiplex Raman pump and amplifier, and a system, method and computer program product for controlling the same, which address the above-identified and other limitations of conventional systems. The present inventors have recognized that conventional Raman amplifiers are manufactured to meet a customer's needs and are not able to adapt to changes in a customer's requirements, or to sub-optimal performance based on, for example, temperature variations. To the contrary, as requirements change, components such as Raman amplifiers are replaced with components that are manufactured to accommodate those new requirements. Accordingly, another object of the present invention is to provide a tunable Raman amplifier that uses tunable semiconductor laser devices that include integrated diffraction gratings. By providing a tunable Raman amplifier, more flexible optical communication systems can be built that can be controlled to adjust to either changes in the requirements of the network, or to sub-optimal performance caused by a variety factors. As an added benefit, the inventive Raman amplifier will not need to use fiber Bragg gratings external to the semiconductor laser device, which allow for the introduction of noise and losses into the system, as discussed above.

To achieve these and other objects, the present invention provides a novel tunable multimode WDM Raman amplifier, control system, method and software that uses a plurality of pumps, whose optical outputs and central wavelengths are controlled by a control unit. Controlling both the wavelength and optical output of the pumps to predetermined levels and/or wavelengths enables a flexible approach toward Raman amplifying a WDM optical signal that propagates through the optical fiber that serves as the Raman gain medium. The control unit ensures that the Raman amplification profile (e.g., a predetermined amplifier gain profile across the amplification bandwidth, and/or the amplification wavelength span) is set and maintained to be consistent with system requirements.

The control unit monitors the amplified WDM signal and, subsequently, determines if the monitored amplified WDM signal is within a predetermined threshold of the target amplification profile. If the Raman-amplified signal is not within the predetermined threshold, the control unit actively controls the pumps (by adjusting at least one of the optical output and central wavelength) to bring the monitored amplified WDM signal within the predetermined threshold of the target amplification profile. The control of the individual pumps may include adjustments made to the output power of the pump and/or the output wavelength of pumping light provided by the pump.

The control unit is also configured to respond to control signals from an external source (e.g., a central controller or other source) that directs the Raman amplifier to create a new target amplification profile. This new target amplification profile may be based on, for example, a change in system operating conditions or system requirements.

Another feature of the present invention is that each Raman amplifier in an optical communication system need not operate alone, but rather may operate in an internetworked fashion with other amplifiers in the system. Since Raman amplification is a distributed amplification, the present invention exploits this distributed effect by shifting amplification duties between adjacent, cascaded Raman amplifiers so as to compensate for unforeseen changes in component operations or system requirements.

Another feature of the present invention is a tunable Raman amplifier that is used in an optical communications system that relies on the use of EDFAs to provide wide band amplification. The pumps, amplifiers and processes of the present invention is used in combination with the EDFAs to provide excess loss compensation for the EDFAs across a desired signal bandwidth.

Another feature of the present invention is to provide a narrow band amplifier that is able to flexibly apply, over a wide wavelength range, multi-mode pumping light having a predetermined pumping bandwidth to different portions of a spectrum, within a 100 nanometer wavelength tuning range of the tunable LD module.

Another feature of the present invention is the use of a tunable LD module for use in a Raman amplifier that provides wavelength ripple compensation and flattening of a cascaded optical amplifier.

Another feature of the present invention is a fully automated design of a Raman amplifier system that employs a plurality of tunable Raman amplifiers. When designing such a system according to this automated method, an optical amplifying system of cascadable tunable WDM Raman amplifiers use an FFT optimization process to fully realize the design gain profiles set by either specification, or "in-field" specification. The actual amplifier performance is monitored by the FFT process and successive adjustments are made to the tuned wavelengths and output powers to the respective tunable LD pump modules.

Another feature of the present invention is a tunable LD pump module for providing a tunable "redundant" LD pump module as a backup source to a set of LD pump modules used in a WDM pump. As recognized by the present inventors, a limitation with the conventional redundant pump power source, is that the surviving LD pump source must have its output increased (or even being capable of being increased) such that the different pump sources must be "over specified" so that they can be ramped-up in power to be able to compensate for a shortfall in output power should one of the two LD pump sources fail. The present inventors recognized that it would be more cost and space efficient to equip an amplifier with LD pump modules that operate close to full specified power, and have one or more back-ups that can be brought on-line when the first LD module fails. Furthermore, the present inventors recognized that even one tunable LD pump module could serve as the off-line spare for multiple (perhaps five or more) LD pump modules. The restriction on whether the tunable LD pump module could serve as an off-line spare depends on the tuning range of the tunable LD pump module and the spectrum covered by the LD pump modules used in the Raman pump.

Consistent with the title of this section, the above summary is not intended to be an exhaustive discussion of all the features or embodiments of the present invention. A more complete, although not necessarily exhaustive, description of the features and embodiments of the invention is found in the section entitled "DESCRIPTION OF THE PREFERRED EMBODIMENTS," and more generally throughout the entire document.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1A is a block diagram illustrating a conventional Raman amplifier;

FIG. 12 is a graph illustrating a superposition principle for predicting a Raman amplification profile according to the present invention;

FIGS. 13A and 13B are graphs illustrating a design of a pumping device based on the superposition principle according to the present invention;

DESCRIPTION OF THE PREFERRED EMBODIMENTS

Figure 2:
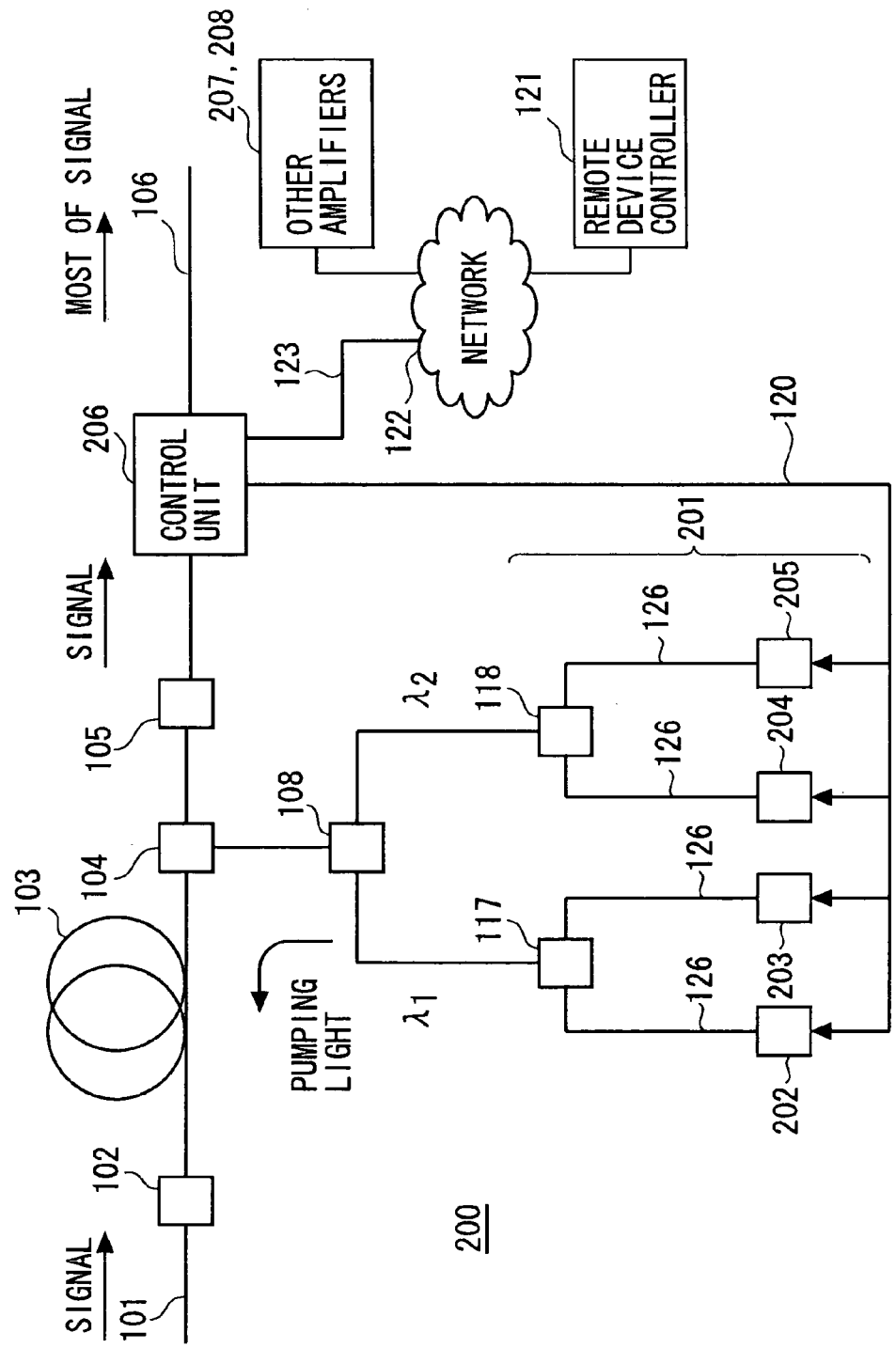
FIG. 2 is a block diagram illustrating a Raman amplifier according to one embodiment of the present invention.

Referring now to the drawings, FIG. 2 is a block diagram of a Raman amplifier 200 according to one embodiment of the present invention. The Raman amplifier 200 includes an amplifier fiber (optical fiber) 103, a WDM coupler 104, a pumping device 201, a control unit 206, and optional polarization independent isolators 102, 105. The Raman amplifier 200 is connected to an input fiber 101 and an output fiber 106, which may be optical transmission fibers such as single mode fibers, dispersion compensation fibers (DCF), dispersion flattening fibers, etc. The input fiber 101, amplification fiber 103, and the output fiber 106 may be the same fiber.

The Raman amplifier 200 is connected to a network 122 via a communication link 123. The network 122 is also connected to other amplifiers 207, 208 as well as a remote device controller 121. The remote device controller 121 monitors the operational status of the Raman amplifier 200 as well as the other amplifiers 207, 208. The network 122 may be a proprietary wireless or wired network, or another network that is publicly accessible, such as the Internet or a hybrid network, part proprietary and part publicly accessible. While the Raman amplifier 200 may operate autonomously, it may also be provided with additional information about the overall system performance, such that the control unit 206 can adapt the amplification performance of the Raman amplifier 200 to help offset any adverse affects to the system's performance as indicated by a change in conditions, reflected in the additional information. As an example, the additional information may be that a replacement fiber with different attenuation characteristics is being used to interconnect two cascaded Raman amplifiers in a WDM system. In this case, the Raman amplifier 200 may employ a new "target" amplification performance so as to normalize the channel characteristics for all of the WDM channels, despite the fact that the new fiber may attenuate some of the channels by a lesser amount than others.

The pumping device 201 includes tunable integrated diffraction grating semiconductor lasers 202, 203, 204, 205, polarization couplers 117, 118, and a WDM coupler 108. In FIG. 2, the tunable semiconductor lasers 202, 203 are tuned to the same central wavelength $\lambda_1$, and the tunable semiconductor lasers 204, 205 are tuned to the same central wavelength $\lambda_2$.

The light output from the polarization combiners 117, 118 is combined by the WDM coupler 108. Polarization maintaining fibers 126 are used in the connections between the semiconductor lasers 202, 203, 204, 205 and the polarization combiners 117, 118 to maintain two different polarization planes, thus ensuring an input signal to the Raman amplifier 200 will be adequately amplified regardless of its orientation in the signal fiber 101 or amplification fiber 103.

The pumping device 201 in this example includes two pumps that provide light having wavelengths $\lambda_1$ and $\lambda_2$ to the amplifier fiber 103. However, since the pumping device 201 includes tunable iGM lasers 202, 203, 204, 205, the two wavelengths $\lambda_1$ and $\lambda_2$ are adjustable, and need not be different. Tunable iGM laser modules, including DFB and DBR laser modules, are described in U.S. patent application Ser. No. 10/187,621 and U.S. patent application Ser. No. 10/214,177 previously cited, and thus for convenience of reading, only a portion of the contents of which is summarized herein. The present inventors have recognized that current changes within the area of the diffraction grating of the LD cause changes in the wavelength selection characteristics of the laser device. While the grating may be integrated into the LD itself, the internal diffraction grating may be supplemented with an external grating, such as a Bragg grating. This is due to a plasma effect wherein the refractive index of a material changes in relation to the carrier density of the material. Moreover, the changes in current cause a change in temperature that also changes the refractive index of the diffraction grating. In this regard, there is trade-off relation between plasma effect and thermal effect on reflective index change. That is, when the plasma effect is dominant, refractive index is decreased, and on the other hand, when the thermal effect is dominant, refractive index is increased. Thus, the refractive index of the p-InGaAsp and the p-InP spacer layer forming the diffraction grating is changed by the injecting of the current Ib. Therefore, the optical path length is longer compared to when Ib=0 and the effective period of the diffraction grating changes. Therefore, when Ib≠0, the central wavelength selected by the diffraction grating changes in response to the changes in the value of Ib.

Accordingly, this semiconductor laser device is able to control the central wavelength and multiple mode spectrum selected by controlling the value of Ib. As a result, for example, even if an actually manufactured semiconductor laser device is not able to select the central wavelength, it was designed to select at the design stage, by controlling the value of Ib, it is possible for the desired central wavelength to be selected. Therefore, the yield of the semiconductor laser device can be improved. Moreover, even if a central wavelength that is different from the central wavelength assumed at the design stage is desired, it is possible for the desired central wavelength to be selected by controlling the value of Ib. Finally, due to the electrical separation groove, it is possible to vary Ia, which controls the light output, irrespectively of Ib, which controls the central wavelength selected by the diffraction grating. Thus, the light output of the semiconductor laser device can be arbitrarily changed while keeping the central wavelength constant. Similarly, tuning may be affected by altering the ambient temperature of the grating. This change is temperature may be implemented by including a controllable heating element in the LD module, or adjacent to it, with a feedback mechanism included.

As another example, the tunable multimode laser may include an active region having a cavity length of 1200 μm, a front grating area having a length of 200 μm, and rear grating area having a length of 750 μm. The gratings are linearly chirped from a spacing Λ1 corresponding to 1400 nm to a spacing Λ2 corresponding to 1500 nm. Moreover, a period Λs of linear chirping is made to determine the reflectivity mode spacing within each grating. The reflectivity mode spacing of the front grating is 9.7 nm, while the reflectivity mode spacing of the rear grating is 8.7 nm. Thus, the grating structures provide the necessary difference in mode spacing required for Verneir tuning of the laser device, thus permitting tuning of the multiple longitudinal mode laser over a range of 103 nm.

As recognized by the present inventors, he semiconductor lasers need not be preconfigured to generate light at any particular wavelength. In one embodiment of the present invention, the pumping devices 201 are configured in central wavelength and optical output by the customer for a particular application. The inventors of the present invention have recognized that by providing "field configurable" Raman amplifiers, customers have more flexibility to adjust the operational performance of their system. Moreover, customers need not maintain an inventory of Raman amplifiers for each configuration included in their system since the tunable Raman pumps and amplifiers of the present invention are configurable by the customer. Thus, one "generic" Raman amplifier with tunable multimode Raman pumps may be stocked by a system operator, and then programmed in the field (locally at the control unit 206, or remotely via the remote device controller 121) to operate with a predetermined gain shape and amplification bandwidth.

The light output from the pumping device 201 is coupled to the amplifier fiber 103 via the WDM coupler 104. An optical signal (e.g., a WDM signal) is incident on the amplifier fiber 103 via the input fiber 101. The optical signal is then combined with the light pumped into the amplifier fiber 103 so the incident optical signal is Raman-amplified. In addition, the Raman-amplified optical signal is passed through the WDM coupler 104 and is transmitted toward the control unit 206, where a part of the amplified optical signal is branched to form a monitor signal (or sampled output signal), while the majority of the signal is output on the output fiber 106. The monitor signal is analyzed at separate wavelengths by the control unit 206 to determine if the output level of the optical signal complies with the intended level. If not, corrective action is taken to make an adjustment to the amplification profile.

The control unit 206 uses a processor to assert control over the output power and/or tune the central wavelength of light provided by each of the semiconductor lasers 202, 203, 204, 205, thereby controlling the overall amplification performance of the Raman amplifier 200. The control can be based on either the monitor signal or an external source, such as, for example, a control signal received from the remote device controller 121. The control unit 206 generates a control signal on a bus 120, that includes a sufficient number of control lines, so as to allow for control of the drive currents to achieve a small gain deviation relative to a target gain profile (e.g., a flat amplification profile), and/or the current to the wavelength tuning regions for the individual tunable semiconductor lasers 202, 203, 204, 205, to adjust the output wavelength of a particular tunable semiconductor laser 202, 203, 204, 205.

While there are a number of different embodiments of the control unit 206, a common feature of each embodiment is that a processor is employed to assert control over the amplification performance and/or the central wavelength of light provided by the Raman amplifier 200. While some embodiments include a signal monitoring feature in the control unit 206, it should be understood that the control unit 206 can receive a monitored output signal or other control information from an external source. For example, as shown in FIG. 2, a remote device controller 121 may provide control information via the network 122. Likewise, the control unit 206 may include a laser driver circuit, or simply an interface to a driver circuit that is external to the control unit 206. In each case, however, the control unit 206 is equipped with a processor that is able to execute a series of instructions (e.g., by way of a PAL, or ASIC) to interpret whether the output of the Raman amplifier 200 is within a predetermined tolerance of a target amplification performance and/or a central wavelength of light output, and take corrective action as appropriate. Furthermore, the control unit 206 is capable of implementing a change in the operational characteristics of the Raman amplifier 200 based on control information provided to the control unit 206.

U.S. patent application Ser. No. 09/775,632, cited above, describes several alternative structures and processes for how to control the output power of the Raman amplifier 200. It should be understood that the control unit 206 may include a software (or firmware/hardware equivalent) output power control mechanism as described in U.S. patent application Ser. No. 09/775,632. However, the remainder of the description herein will primarily focus on the control unit's 206 control over the central wavelength of the output pumping light of the Raman amplifier 200 through tuning of the tunable semiconductor lasers 202, 203, 204, 205.

The control unit 206 monitors the post-amplification signal and generates a control signal on a bus 120 that includes a sufficient number of control lines to control the semiconductor laser devices 202, 203, 204, 205 (e.g., including control lines to control the drive currents of the semiconductor laser devices 202, 203, 204, 205 and control lines to control the central wavelengths of the tunable semiconductor laser devices 202, 203, 204, 205). For example, when the control unit 206 is configured to control both the output power and the wavelength of a Raman amplifier 200 including four semiconductor laser devices 202, 203, 204, 205, at least eight control lines are included on the bus 120 (i.e., one drive current control line and one wavelength tuning control line for each of the four tunable semiconductor laser devices 202, 203, 204, 205). Alternatives are possible as well where the control unit 206 outputs a digital signal on a bus, which is interpreted by another processor (or firmware/hardware equivalent) located near the drive circuits and wavelength control circuits and converted into discrete control signals.

The control unit 206 performs the function of controlling the gain profile of the multimode Raman amplifier 200, and then monitoring the signal output from the Raman amplifier 200 to ensure the amplifier is actually operating within a predetermined tolerance of the target gain profile. The control unit 206 will initially identify and set the target central wavelengths of the tunable semiconductor laser devices 202, 203, 204, 205, but it is also configured to make adjustments to the target gain profile of the amplifier 200 if it is provided with additional information about the system-level performance that has not yet been taken into account when establishing the target gain profile. For example, if a failure in a pump laser of an adjacent downstream amplifier is reported to the control unit 206, the control unit 206 may be able to compensate for this failure, which would manifest itself by a less than ideal amount of amplification in a portion of the amplification band by increasing the amplification profile for that portion of the amplification band in the Raman amplifier 200.

A first functional feature of the control unit 206 is that it is configured to obtain a target Raman amplification performance and then monitor an actual output (Raman amplified) WDM signal to determine if the monitored amplification performance is within a predetermined tolerance of the target performance. The control unit 206 performs this monitoring operation by identifying deviations between the actual performance and the target performance. If the control unit 206 determines that the monitored amplification performance is within the allowable tolerance of the target amplification performance throughout the amplification band, the control unit 206 does not alter the conditions for the pumping device and continues monitoring the actual amplification performance. However, if the control unit 206 determines that the actual amplification is not within the allowable tolerance of the target amplification performance, the control unit may increase or decrease pumping power and/or tune the central wavelengths of one or more of the pumps so as to maintain the target amplification performance.

The control unit 206 includes a processor and digitizer that is configured to digitize the output spectrum (perhaps after down conversion) of the spectral attributes of the signal passing there through. The control unit 206 in one embodiment is configured to perform a Fast Fourier transform (FFT), which characterizes the levels of a signal that is output from the Raman amplifier, as a function of wavelength. The more FFT sample points, the greater the resolution of the monitoring process. On a FFT point-by-FFT point basis, or on groups of FFT points (bins) a comparison between the actual output levels as a function of wavelength is performed against target performance levels. Deviations by more than a predetermined amount (e.g., 1 dB) in any one bin, or in multiple bins of the FFT process, triggers the control unit 206 to make adjustments to the respective LD pump modules to provide an actual signal output that matches that more closely with the target performance. Moreover, the control unit 206 changes the central wavelength of the pump that most closely affects the bin (or sub-band) in which the deviation occurs so that the actual performance falls within the predetermined tolerance of the target performance.

Another feature of the control unit 206 is that it is configured to change the target performance as well as the conditions for a pumping device to produce a new target performance for Raman amplification. This function may be performed as a configuration function when the Raman amplifier 200 is initially installed, or may be performed in response to a change in system requirements. For example, a particular communication band may need to be expanded to accommodate additional channels on the network. To accommodate this change in system requirements, the control unit 206 may be configured to set another set of conditions for the pumping device, such as turning on or off or changing the output power or central wavelength of one or more of the semiconductor laser devices 202, 203, 204, 205 included in the Raman amplifier 200 so as to achieve a different target performance for increasing a communication bandwidth.

Still another feature of the present invention is that the control unit 206 is networked with other amplifiers (e.g., amplifiers 207, 208) in a cascaded arrangement, such that by coordinating amplification profiles between the cascaded amplifiers, the overall system performance remains optimum for WDM signals, despite the fact that the communication conditions may have changed in some way from an original system design. For example, by coordinating the amplification profiles between adjacent amplifiers, the failure of selected pumps may be compensated for by adjusting the amplification profile of one or more adjacent amplifiers. For example, the control unit 206 may adjust the amplification performances of pre-cascaded and/or post-cascaded Raman amplifiers to offset a problem that has arisen with a Raman amplifier connected there between. Other conditions may be compensated for as well, such as the use of a different fiber, with different attenuation characteristics than the original fiber, the insertion of another network component (e.g., switch or amplifier) between two Raman amplifiers, or drifts in a central wavelength of a Raman amplifier due to variations in temperature.

The patent documents cited previously include detailed descriptions of various tunable semiconductor laser devices using a variety of techniques to tune the wavelengths of the multimode light output and thus are not reproduced herein in full. Each of the tunable semiconductor laser devices includes a wavelength tuning control region configured to receive a control signal from the control unit 206 to tune the wavelength.

Figure 3:
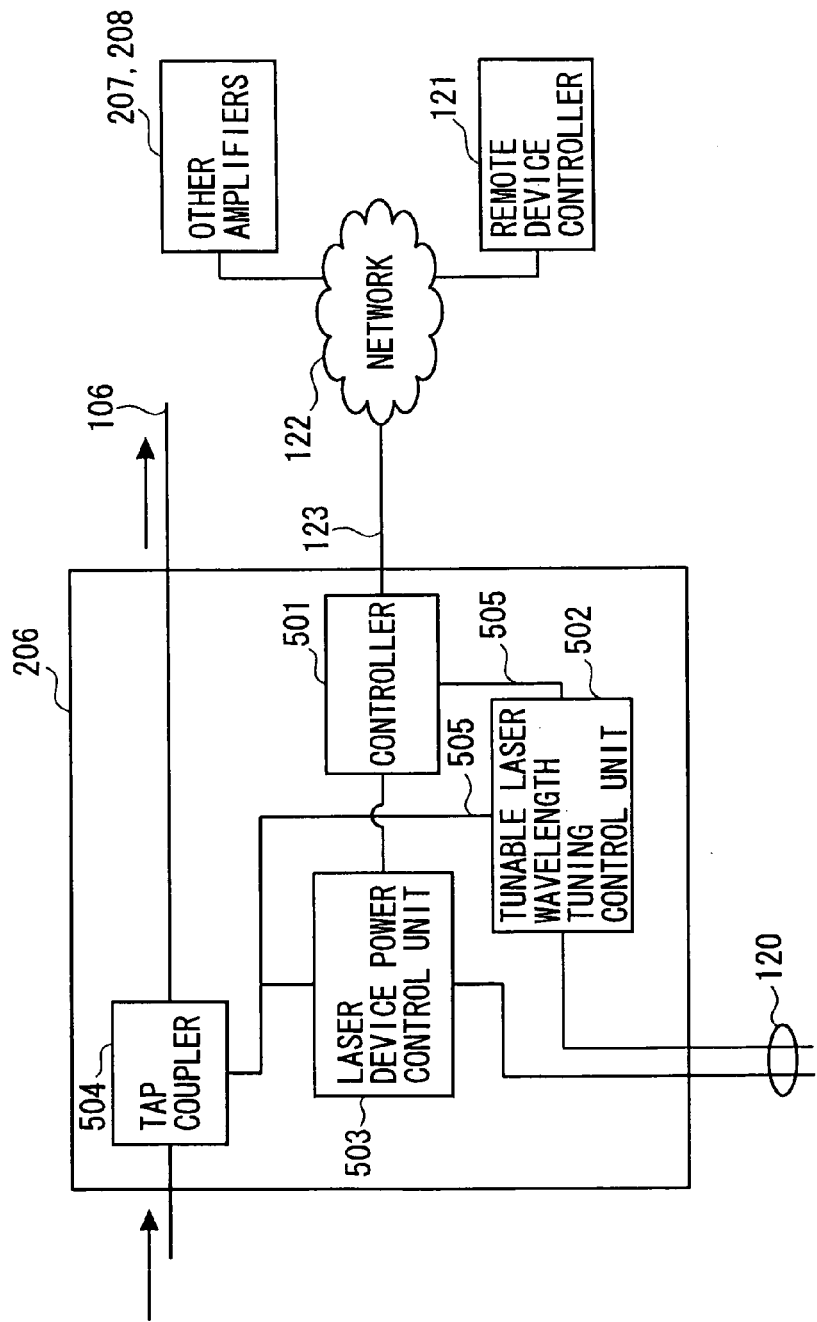
FIG. 3 is a block diagram illustrating the details of the control unit for a Raman amplifier according to one embodiment of the present invention.

FIG. 3 is a block diagram illustrating the details of the control unit 206 for a Raman amplifier according to one embodiment of the present invention. As shown in FIG. 3, the control unit 206 includes a tap coupler 504 that is connected to a tunable laser wavelength tuning control unit 502 and a laser device power control unit 503 through an optical fiber that carries a fraction of the WDM optical signal to both the tunable laser wavelength tuning control unit 502 and the laser device power control unit 503. While the tap coupler 504 is shown to be housed within the control unit 206, it may also be an external component that connects to the control unit 206. Furthermore, the separate components of the control unit 206 (i.e., the tunable laser wavelength tuning control unit 502, the laser device power control unit 503 and the controller 501) may be discrete components that need not be housed within a common control unit enclosure. Furthermore, the various components shown in FIG. 3 may be designed as either separate units, or as units made up of some combination thereof.

The tunable laser wavelength tuning control unit 502 and the laser device power control unit 503 demultiplex the WDM monitor signal (i.e., the portion of the amplified WDM signal provided by the tap coupler 504), and then convert the demultiplexed signals into electrical signals. Samples of the electrical signals are provided to the controller 501 for performing the amplification control processes (e.g., to adjust an amplitude and/or wavelength of the individual tunable semiconductor lasers 202, 203, 204, 205). Furthermore, the controller 501 may perform the FFT, and associated data analysis, or cooperate with an external circuit or ASIC to perform the data analysis task. Alternatively, or complementarily, the control unit 206 (FIG. 2) incorporates a spectrum analyzer to monitor the signal levels output by the Raman amplifier. The spectrum analyzer, or even a second spectrum analyzer, may also be used to monitor input signal levels as well, across the signal bandwidth (which may be a DWDM set of signals). With the second monitoring operation (input and output) gain and amplification profiles may be determined directly. Since one of the functions performed by the control unit 206 is to monitor the actual amplification performance of the Raman amplifier 200, the tunable laser wavelength tuning control unit 502 and the laser device power control unit 503 sample the electrical signals and compare this series of samples against a target amplification performance. The sampling process performed by the tunable laser wavelength tuning control unit 502, the laser device power control unit 503, and the controller 501 does not necessarily have to be performed on a WDM channel-by-WDM channel basis. Rather, these units may perform the control processes with greater or a lesser spectral resolution than one sample set per WDM channel. The tunable laser wavelength tuning control unit 502 and the laser device power control unit 503 provide output control lines 120 for controlling the wavelengths and optical output levels of each pump laser 202, 203, 204, 205, respectively. The tunable laser wavelength tuning control 502 and the laser device power control unit 503 also exchange sample data and control information with the controller 501. The controller 501 is configured to connect to a data communication network 122 such as the Internet for exchanging data and control information with, for example, a remote device controller 121 and other amplifiers 207, 208.

Figure 4:
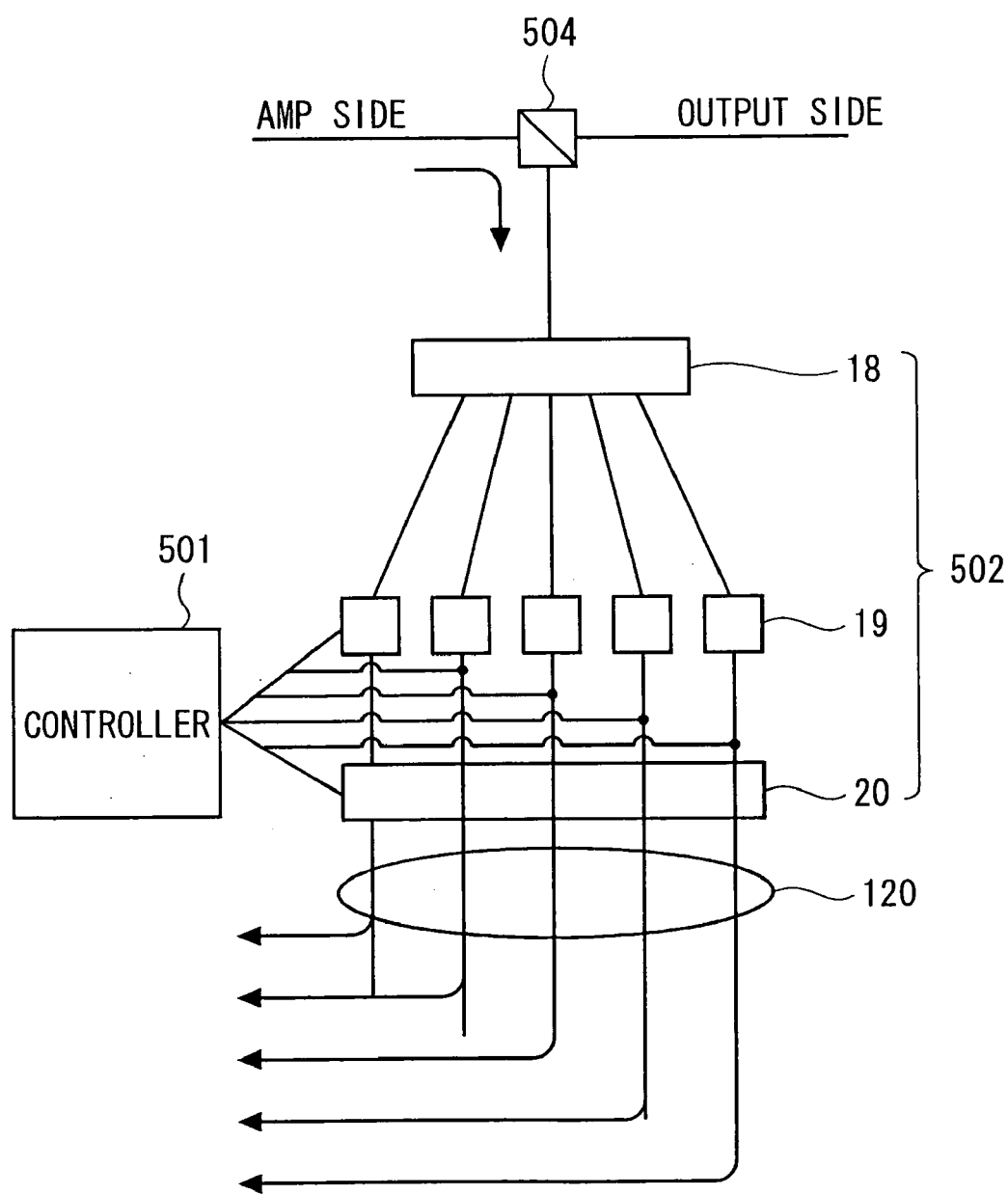
FIG. 4 is a schematic illustrating components included in the control unit according to the present invention.
Figure 5:
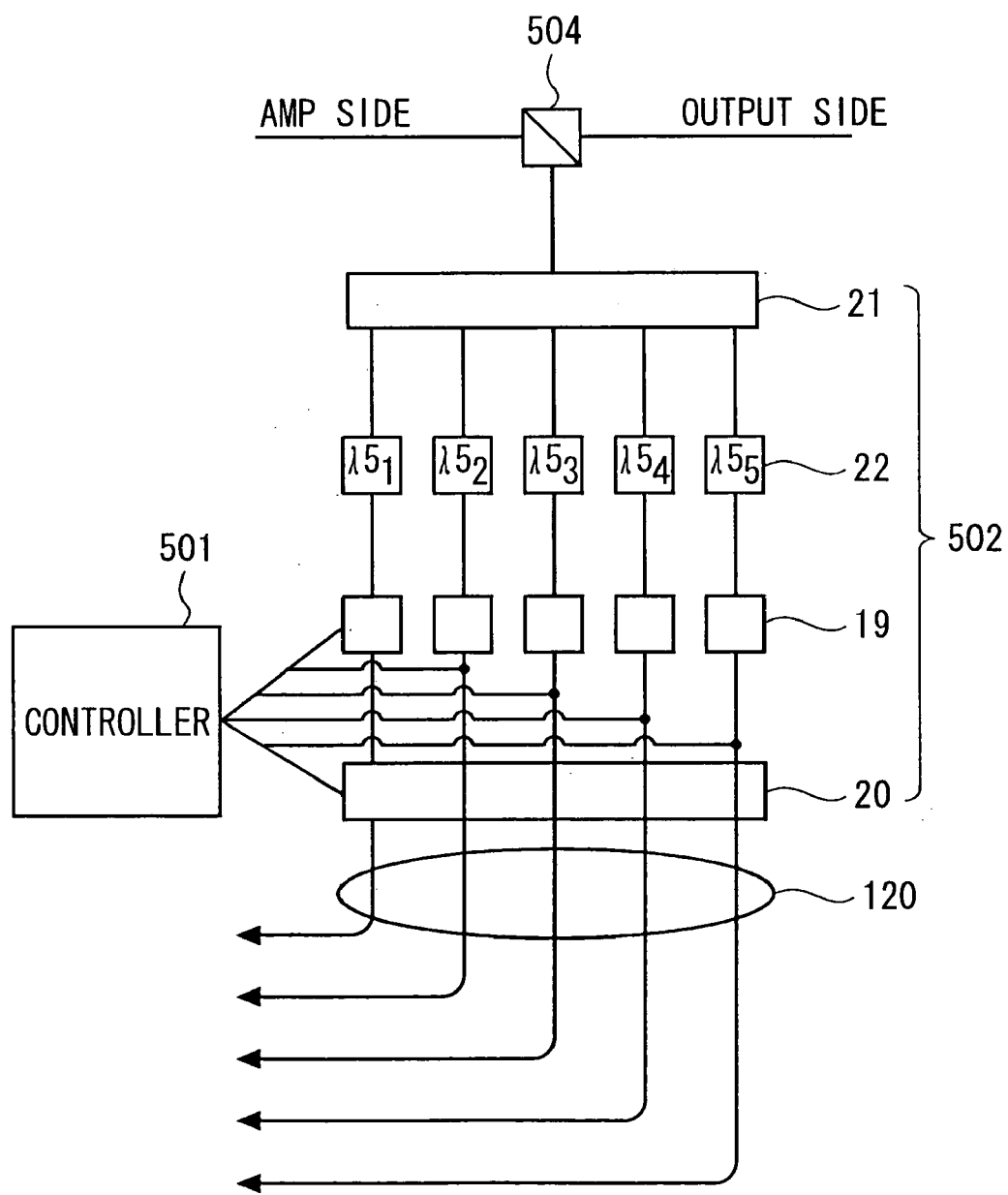
FIG. 5 is a schematic illustrating other components included in the control unit according to the present invention.

FIGS. 4 and 5 provide more detailed descriptions of subcomponents of the tunable laser wavelength tuning control unit 502. In FIG. 4, the tunable laser wavelength tuning control unit 502 includes a wavelength demultiplexer 18, an optical/electrical converting mechanisms 19 (e.g., photodiodes) and a tunable laser wavelength tuning control circuit 20 connected in series. The wavelength demultiplexer 18 separates the monitored WDM optical signal into a plurality of optical sample-signals, each having a different central wavelength. The demultiplexed optical sample may, for example, correspond to channels of the WDM signal, as discussed above. Once again, the function performed by the demultiplexer 18 is to isolate separate spectral components of the WDM signal that is being amplified by the Raman amplifier 200. For basic control schemes, the de-multiplexer 18 may only provide two sample-signals, perhaps one at shorter wavelengths within the amplification band and another at longer wavelengths in the amplification band. A limitation, however, with having too few sample-signals is that the resolution of the sampled signal is not sufficient to observe sub-bands where the gain profile of the Raman amplifier is not within a predetermined tolerance (e.g., 1 dB) of the target amplification performance. On the other hand, having too many sample-signals unnecessarily increases the expense and complexity of the processing resources in the control unit 206. Thus, as a practical guideline, the number of sample-signals to be developed is set to correspond with either a number of WDM channels to be handled by the Raman amplifier 200, or a number of tunable pump lasers 202, 203, 204, 205 employed in the Raman amplifier 200. Thus, typical numbers of sample-signals developed by the de-multiplexer for dense WDM signals will range between about 10 to 100. However, smaller numbers, such as 2 mentioned above, or up to, or exceeding, 1000 are possible as well.

The demultiplexer 18, detectors 19, and controller 501 (which maybe software controllable) as shown in FIG. 4, for example, perform the function of analyzing the output (or even input) signal levels of the Raman amplifier. The analysis is a spectral analysis in that it subdivides the spectrum of interest (which typically is 100 nm or less, based on the tuning range of the tunable LD pumping modules employed in the pump module). One mechanism for isolating the respective portions of the spectrum of interest is to use of band-isolation mechanisms that serve to separate the optical energy in different sub-bands of the spectrum on interest. While a spectrum analyzer, or FFT processor, may perform this function, a wavelength monitoring mechanism may also serve this role by including wavelength dependent filters. Such filters would include wavelength dependent films, semiconductor films and/or diffraction gratings for example. The filters would be used as a group so that the spectrum of interest (either the entire signal bandwidth or perhaps the tuning range of the tunable LD modules) would be subdivided into discrete sub-bands that could be separately monitored and analyzed. This way, the controller 501 can compare on a sub-band-by-sub-band basis, the actual Raman amplifier performance with a predetermined target performance.

The tunable laser wavelength tuning control unit 502 may also include in it a digitizing mechanism for digitizing the respective sample signals and performing FFT analyses on the respective sample signals. In this way, the burden of performing an FFT on the broadband optical signals may be accomplished more easily than simply through direct optical to electrical conversion and analysis. Furthermore, the respective "legs" in the tunable laser wavelength tuning control unit 502, may each include separate receivers, and/or digitizing circuits and spectral analysis mechanisms (such as FFT enabled circuits). Once again, these alternative techniques for performing FFT or spectral analysis on the monitored signal, enables the controller to determine whether the spectral output, as a functional wavelength, corresponds with a desired target performance and necessary adjustments can be made including the operational wavelength (or safe center wavelength) of different tunable pump lasers 202, 203, 204, 205.

The optical/electrical converting mechanisms 19 convert the demultiplexed optical sample signals into electrical signals. Output currents provided by the converting mechanisms 19 vary depending on the respective magnitudes of the demultiplexed sample-signals. The controller 501 receives the electrical currents via a bus 505, where the controller 501 then samples the respective currents to create a digital rendition of the sample-signals. Alternatively, the controller 501 receives the digital rendition of the sample-signals from the tunable laser wavelength tuning control circuit 20 which digitizes the sample-signals. Likewise, the converting mechanisms 19 provide a digitized output.

The tunable laser wavelength tuning control circuit 20 is shown to be a separate controller from controller 501, but the two can be incorporated into a single processor-based controller. As shown in FIG. 4, however, the controller 501 is configured to implement a digital signal processor based-embedded controller, while the main analog processing is performed in the tunable laser wavelength tuning control circuit 20. For example, in one embodiment of the present invention, the controller 501 holds in memory appropriate wavelength tuning region control current values for the separate tunable pump lasers 202, 203, 204, 205, based on the certain target central wavelength to be provided by the tunable pump lasers 202, 203, 204, 205. Once the wavelength tuning region control current values are identified, the controller 501 then informs the tunable laser wavelength tuning control circuit 20 (either via a digital message or separate analog signals), so the tunable laser wavelength tuning control circuit 20 may control laser wavelength tuning region circuits contained therein to produce the desired tunable pump laser wavelength tuning region control currents. However, in another embodiment, the tunable laser wavelength tuning control circuit 20 may operate digitally and may itself hold in memory the wavelength tuning region control current values that are associated with achieving the target output central wavelength. In this case, the tunable laser wavelength tuning control circuit 20 dispatches control signals to the tunable semiconductor lasers 202, 203, 204, 205, which contain their own wavelength tuning circuits that respond to the control signals or are interconnected with separate wavelength tuning circuits.

Figure 6:
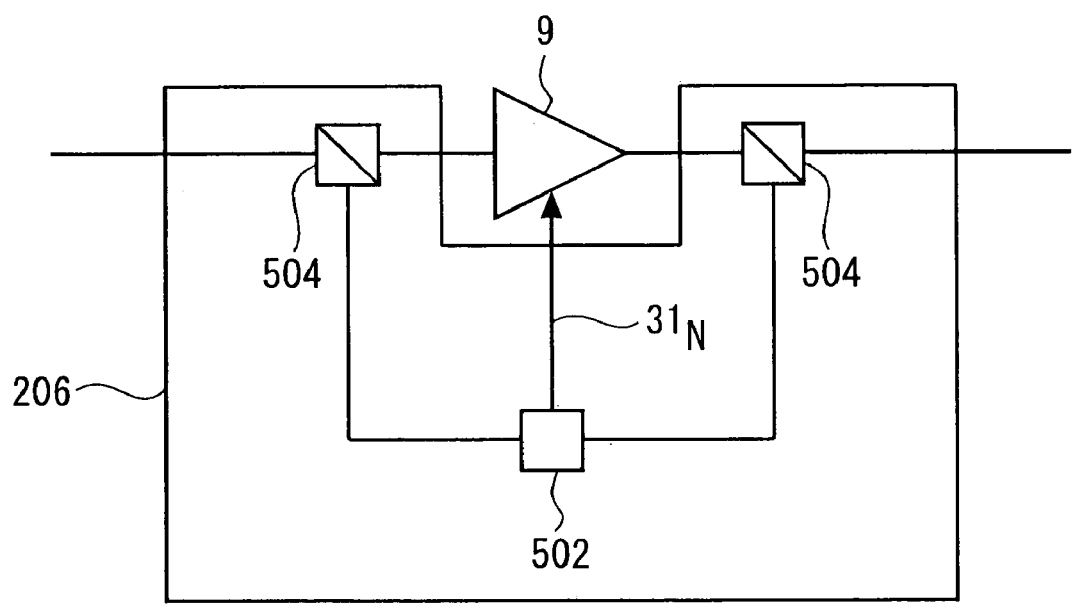
FIG. 6 is a schematic which illustrates controlling an output power from a Raman amplifier by monitoring optical signals input to and output from the Raman amplifier.

FIG. 5 illustrates another exemplary embodiment of the control unit 206. Unlike the embodiment of FIG. 4, the embodiment of FIG. 5 includes a power splitter 21 and bandpass filters 22. The power splitter 21 splits the monitored WDM optical signal branched by the tap coupler 504 into a plurality of sample-signals. For example, the power splitter 21 may be configured to divide the branched WDM signal into a corresponding number of channels of the WDM signal. The bandpass filters 22 have different central wavelengths and fixed-width passbands that only permit the portion of the respective sample-signals having optical energy within the specific passband to pass therethrough. The optical/electrical converters 19, controller 501 and tunable laser wavelength tuning control circuit 20 are like that described above in reference to FIG. 4. It should be noted that although the discussion has been primarily focused on sampling the amplified output from the Raman amplifier 200 to perform the control operation, the control unit 206 may also sample the input signal to the Raman amplifier 200, as shown in FIG. 6. By directly measuring the input optical signal and the output optical signal, the control unit 206 is able to establish a direct measurement of amplifier gain, and the profile of the amplification gain. As an alternative to measuring the profile of the amplification gain, the controller 501 may receive a message from a downstream Raman amplifier which describes an output level of the WDM signal as it leaves Raman amplifier. Since the fiber loss characteristics are generally known for the fiber that interconnects two amplifiers, the controller 501 in the downstream amplifier can calculate the apparent level of the WDM signal that is input to that downstream Raman amplifier.

Figure 7:
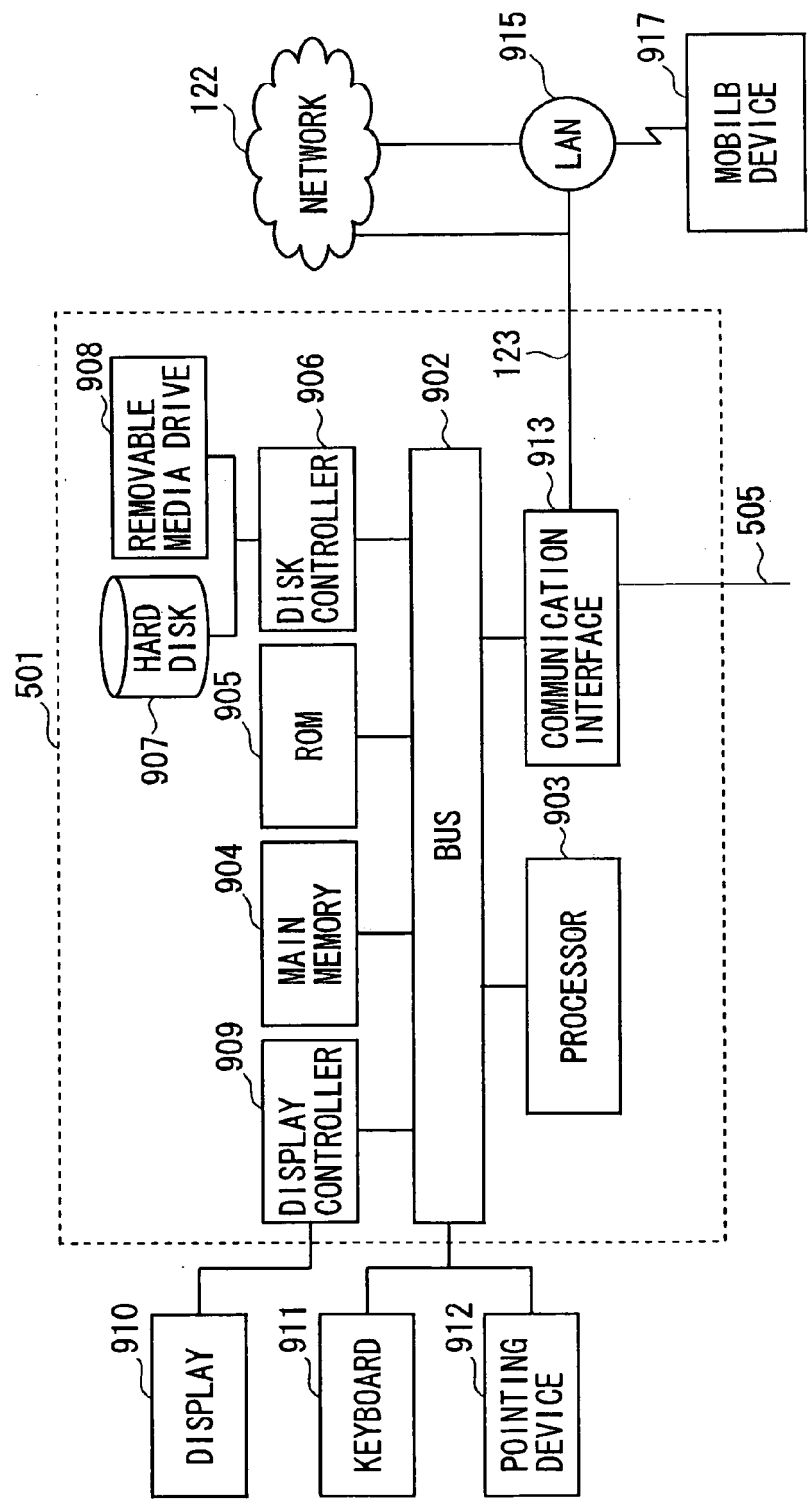
FIG. 7 is a schematic illustrating a computer system included in the control unit according to the present invention.

FIG. 7 illustrates an exemplary embodiment of a processor based controller 501. The controller 501 includes a bus 902 or other communication mechanism for communicating information, and a processor 903 coupled with the bus 902 for processing the information. The controller 501 also includes a main memory 904, such as a random access memory (RAM) or other dynamic storage device (e.g., dynamic RAM (DRAM), static RAM (SRAM), and synchronous DRAM (SDRAM)), coupled to the bus 902 for storing information and instructions to be executed by processor 903. In addition, the main memory 904 may be used for storing temporary variables or other intermediate information during the execution of instructions by the processor 903. The controller 501 further includes a read only memory (ROM) 905 or other static storage device (e.g., programmable ROM (PROM), erasable PROM (EPROM), and electrically erasable PROM (EEPROM)) coupled to the bus 902 for storing static information and instructions for the processor 903.

The controller 501 also includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the controller 501 using an appropriate device interface (e.g., small computer system interface (SCSI), integrated device electronics (IDE), enhanced-IDE (E-IDE), direct memory access (DMA), or ultra-DMA).

The controller 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The controller 501 may also include a display controller 909 coupled to the bus 902 to control a display 910, such as a cathode ray tube (CRT), for displaying information to a computer user. The computer system includes input devices, such as a keyboard 911 and a pointing device 912, for interacting with a computer user and providing information to the processor 903. The pointing device 912, for example, may be a mouse, a trackball, or a pointing stick for communicating direction information and command selections to the processor 903 and for controlling cursor movement on the display 910. In addition, a printer may provide printed listings of data stored and/or generated by the controller 501.

The controller 501 performs a portion or all of the processing steps of the invention in response to the processor 903 executing one or more sequences of one or more instructions contained in a memory, such as the main memory 904. Such instructions may be read into the main memory 904 from another computer readable medium, such as a hard disk 907 or a removable media drive 908, or downloaded from another processor, for example, the remote device controller 121. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the controller 501 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the controller 501, for driving a device or devices for implementing the invention, and for enabling the controller 501 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 903 for execution. A computer readable medium may take many forms, including but not limited to, non-volatile media, volatile media, and transmission media. Non-volatile media includes, for example, optical, magnetic disks, and magneto-optical disks, such as the hard disk 907 or the removable media drive 908. Volatile media includes dynamic memory, such as the main memory 904. Transmission media includes coaxial cables, copper wire and fiber optics, including the wires that make up the bus 902. Transmission media also may also take the form of acoustic or light waves, such as those generated during radio wave and infrared data communications.

Various forms of computer readable media may be involved in carrying out one or more sequences of one or more instructions to processor 903 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the controller 501 may receive the data on the telephone line and use an infrared transmitter to convert the data to an infrared signal. An infrared detector coupled to the bus 902 can receive the data carried in the infrared signal and place the data on the bus 902. The bus 902 carries the data to the main memory 904, from which the processor 903 retrieves and executes the instructions. The instructions received by the main memory 904 may optionally be stored on storage device 907 or 908 either before or after execution by processor 903.

The controller 501 also includes a communication interface 913 coupled to the bus 902. The communication interface 913 provides a two-way data communication coupling to a network link 123 that is connected to, for example, a local area network (LAN) 915, or to another communications network 122 such as the Internet. The communication interface 913 also provides a two-way coupling to the tunable laser wavelength tuning control unit 502 and the laser device power control unit 503 via the bus 505. The communication interface 913 may be a network interface card to attach to any packet switched LAN. As another example, the communication interface 913 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 913 sends and receives electrical, electromagnetic or optical signals that carry digital data streams representing various types of information.

The network link 123 typically provides data communication through one or more networks to other data devices. For example, the network link 123 may provide a connection to another computer through a local network 915 (e.g., a LAN) or through equipment operated by a service provider, which provides communication services through a communications network 122. The local network 123 and the communications network 122 use, for example, electrical, electromagnetic, or optical signals that carry digital data streams. The signals through the various networks and the signals on the network link 123 and through the communication interface 913, which carry the digital data to and from the controller 501, are exemplary forms of carrier waves transporting the information. The controller 501 can transmit and receive data, including program code, through the network(s) 915 and 122, the network link 123 and the communication interface 913. Moreover, the network link 123 may provide a connection through a LAN 915 to a mobile device 917 such as a personal digital assistant (PDA) laptop computer, or cellular telephone.

Figure 8:
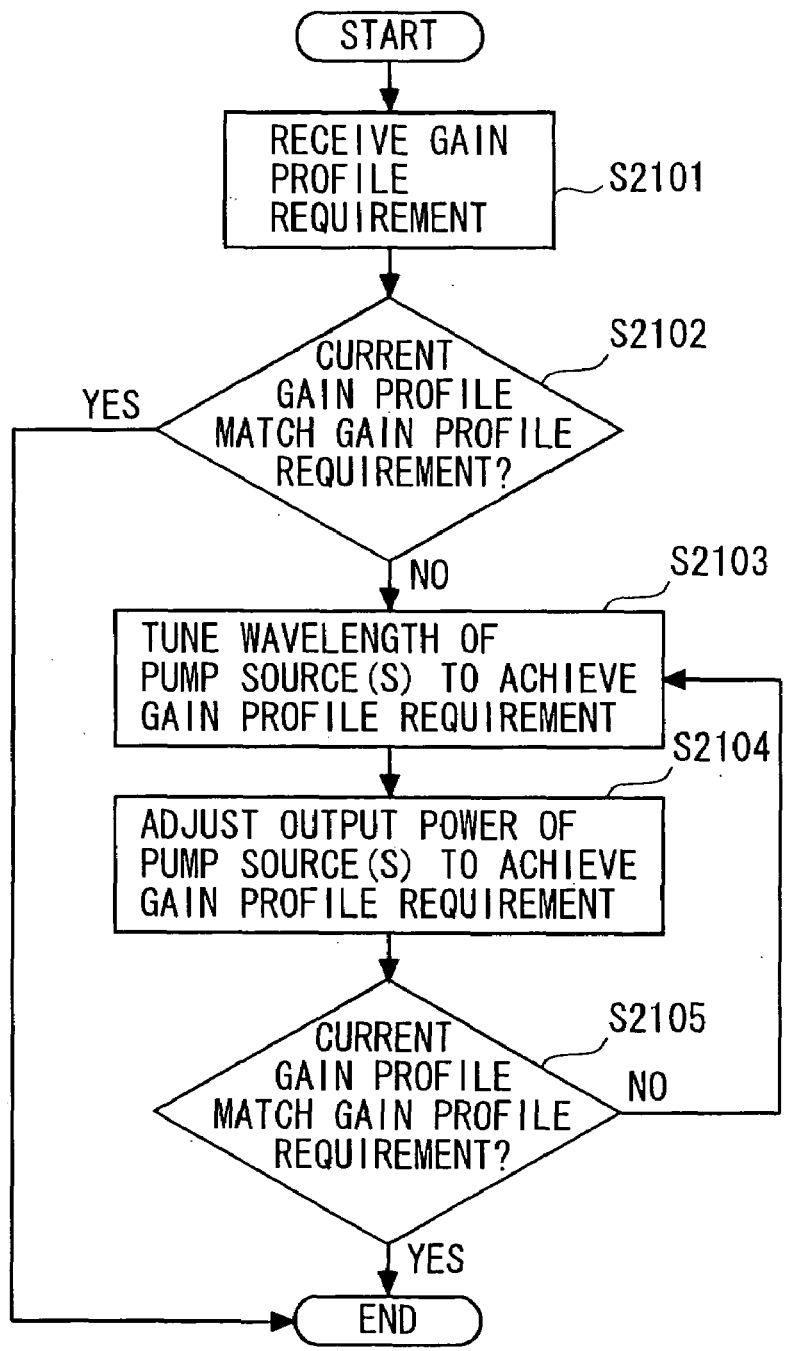
FIG. 8 is a flowchart illustrating an exemplary high level control process performed by a control unit according to one embodiment of the present invention.

FIG. 8 is a flowchart illustrating an exemplary high level control process performed by the control unit 206 according to one embodiment of the present invention. As shown in FIG. 8, the process begins with step S2101 where a gain profile (or signal level profile) requirement is received by the control unit 206. As discussed above, the gain profile may be stored locally in the control unit 206, or may be received, for example, from a remote device controller 121 via the network connection 123 to the network 122. The gain profile requirement may be an initial gain profile requirement, or may reflect a change in a current gain profile requirement. The gain profile requirement identifies a target performance for one or more pumping devices 201 under the control of the control unit 206.

Once the gain profile requirement has been received, the process proceeds to step S2102, where it is determined whether the current gain profile matches the gain profile received in step S2101. If it is determined that the current gain profile matches the received gain profile (i.e., "Yes" at step S2102), the process ends. If, on the other hand, it is determined that the current gain profile does not match the received gain profile requirement (i.e., "No" at step S2102), the process proceeds to step S2103. At step S2103, the control unit 206 generates control signals and transmits them via the bus 120 to one or more pumping devices 201 to tune the wavelengths of one or more of the tunable pump sources 202, 203, 204, 205 to achieve the required gain profile. If the pumping device 201 includes more than one tunable pump source 202, 203, 204, 205, the control signals generated by the control unit 206 will be directed to the appropriate tunable pump source 202, 203, 204, 205 to tune the wavelengths of those individual tunable pump sources 202, 203, 204, 205.

In one embodiment of the present invention, the tuning of the individual tunable pump sources 202, 203, 204, 205 provided by the control unit 206 is a continuous tuning capability. The tuning implemented in some cases is a "fine tuning" where, for example, a particular tunable pump source 202, 203, 204, 205 has drifted from its targeted central wavelength and is corrected to its proper wavelength. In other cases, the control unit 206 implements an entirely new gain profile that requires a significant change in the central wavelength of one or more of the tunable pump sources 202, 203, 204, 205.

Once the wavelengths have been tuned, the process proceeds to step S2104 where the control unit 206 similarly adjusts the output power of one or more tunable pump sources 202, 203, 204, 205 in order to achieve the required gain profile. As with the tuning of the wavelengths, the control signals will be provided to the appropriate tunable pump sources 202, 203, 204, 205 via the bus 120. After the wavelengths and output power of the appropriate tunable pump sources 202, 203, 204, 205 have been adjusted, the process proceeds to step S2105 where, as in step S2102, the current (i.e., adjusted) gain profile is compared with the required gain profile received in step S2101. If it is determined that the current gain profile matches the required gain profile (i.e., "Yes" at step S2105), the process ends. If, on the other hand, it is determined that the current gain profile does not match the required gain profile (i.e., "No" at step S2105), the process returns to step S2103 where the wavelengths and output power of appropriate tunable pump sources 202, 203, 204, 205 are further tuned and adjusted.

Figure 9:
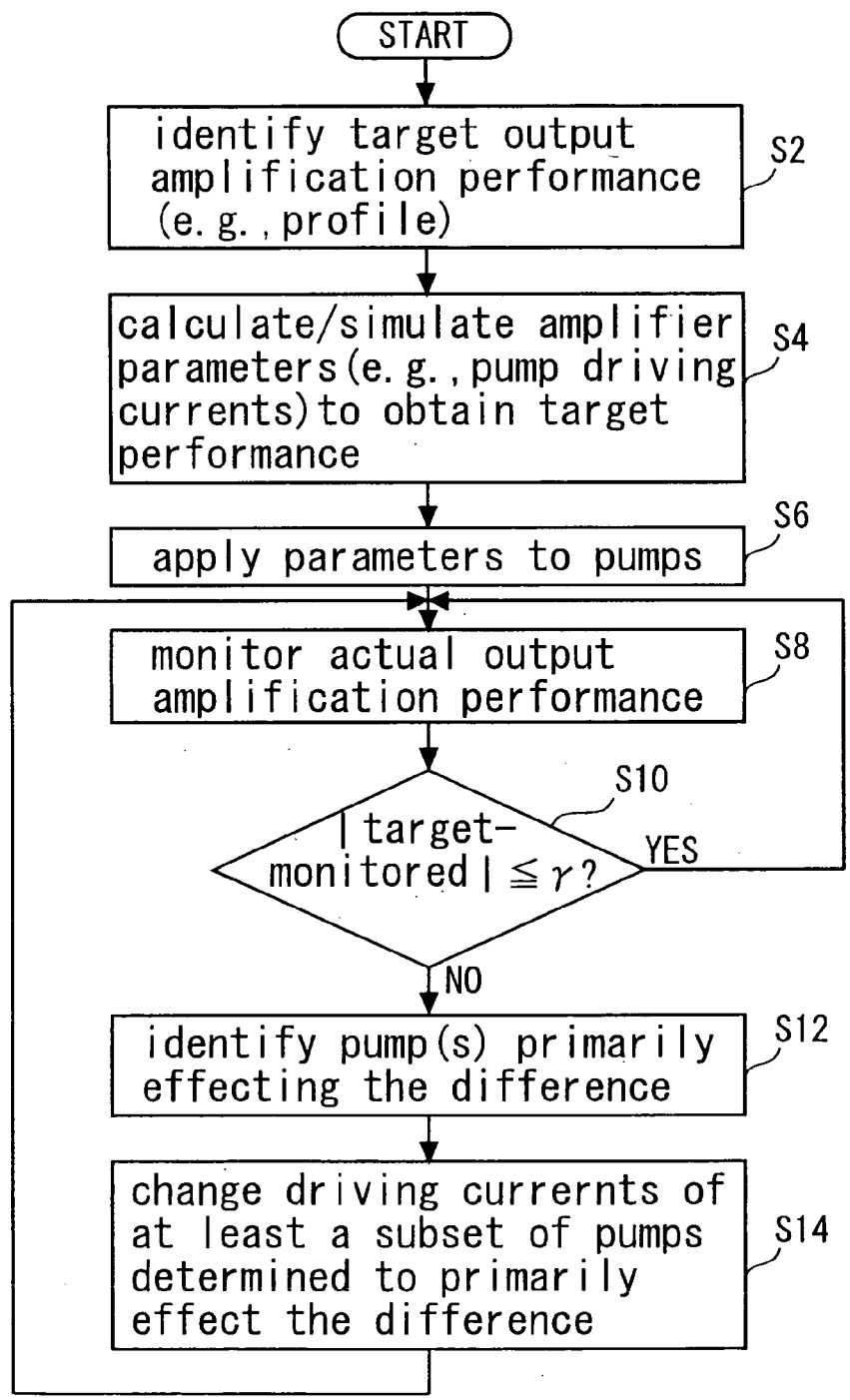
FIG. 9 is a flowchart illustrating a control operation of the Raman amplifier according to the present invention.

FIG. 9 is a flowchart illustrating an operational process performed by the control unit 206. This control process is followed for (1) establishing a predetermined target amplification performance (e.g., an amplification profile or output signal power profile over a predetermined amplification bandwidth), (2) monitoring whether an actual amplification performance is within a predetermined tolerance of the target amplification performance, and (3) taking corrective action when the actual amplification performance is not within the predetermined tolerance. In particular, steps S2, S4 and S6 respectively identify the target output amplification performance, determine the amplifier parameters (e.g., pump laser central wavelengths) that are used to achieve the target output amplification performance and apply the parameters to achieve the target performance. Steps S8, S10, S12, and S14 are directed to ensuring that the actual amplification performance stays within a predetermined tolerance of the target amplification profile and/or at least adopts an acceptable profile shape (such as a flat or tilted profile slope).

As shown in FIG. 9, the process begins with step S2 where an input WDM optical signal characteristic (e.g., a mean optical signal level measured in sub-bands of the amplification band) and an (initial) target amplification performance are provided to, and/or generated by, the control unit 206 and stored in a memory, for example, the main memory 904. The target amplification performance may be represented by a series of values indicative of a predetermined gain profile that is set by a system operator to achieve a desired system performance. As would be understood by those of ordinary skill in the optical communication art, the gain profile includes both wavelength and amplitude information. Since gain relates to the level of an output signal relative to an input signal, the input signal level is identified either directly or indirectly, as will be discussed below. Moreover, if the system operator intends to have the Raman amplifier operate with a predetermined gain profile, the input WDM optical signal characteristic is first determined in one of several ways, discussed below.

The WDM signal level may be measured directly at an input to the Raman amplifier 200. In this case, the control unit 206 can determine whether the target gain is achieved by comparing the target gain to a ratio of a measured output signal from the Raman amplifier 200 to the level of the optical signal applied to the Raman amplifier 200. As an alternative to a direct measurement of the input signal level, the signal level may be obtained from an output signal level reported to the Raman amplifier 200 from a downstream Raman amplifier (e.g., other amplifiers 207, 208), less an estimated, or measured, amount of attenuation due to fiber loss between the two Raman amplifiers. Still further, the input level may be inferred from a process employed by the control unit 206 in which a signal of known power is input to the Raman amplifier 200 and then an amount of driving current applied to respective pump lasers to produce a predetermined output level measured at the output of the subject Raman amplifier 200 is identified and saved in memory. Subsequently, the amount of amplification may be estimated from a change in the amount of driving current relative to the values stored in memory. This latter process may be performed as an initial step during a built-in test procedure or during a calibration operation, for example. As another alternative, a target output WDM optical signal characteristic may be provided from an external source and stored in memory instead of the target amplification performance. In this case, the target amplification performance is calculated from an input WDM optical signal characteristic and a target output WDM optical signal characteristic and stored in a memory of the controller 501. The target amplification performance and input WDM optical signal characteristic may be provided, stored, and read, for example, from the main memory in the control unit 206 during operational conditions.

After the target amplification performance, as well as associated parameters are obtained in step S2, the process then proceeds to step S4. In step S4, the amplifier parameters to achieve the target amplification performance are determined by contemporaneous calculation/simulation, or by referencing a look-up table that holds parameters that were previously determined and stored for various conditions. In the present discussion, the amplifier parameters will be described as tunable laser wavelength control values that are used to tune the tunable semiconductor lasers 202, 203, 204, 205, by, for example, providing a control current to a wavelength tuning region of the tunable semiconductor lasers 202, 203, 204, 205.

While the present discussion has focused on associating tunable laser wavelength tuning control values with a target amplification performance, there are additional operational conditions that the control unit 206 may consider, such as internal losses inherent in the optical signal measurement operation, fiber losses, pump-to-pump interaction or aging of the pump lasers. To compensate for these additional conditions, such as fiber loss (attenuation), sets of tunable laser wavelength tuning control values are pre-set and stored in memory. The sets of tunable laser wavelength tuning control values correspond with various gain profiles that are available for selection so as to compensate for the fiber loss, etc.

Figure 10:
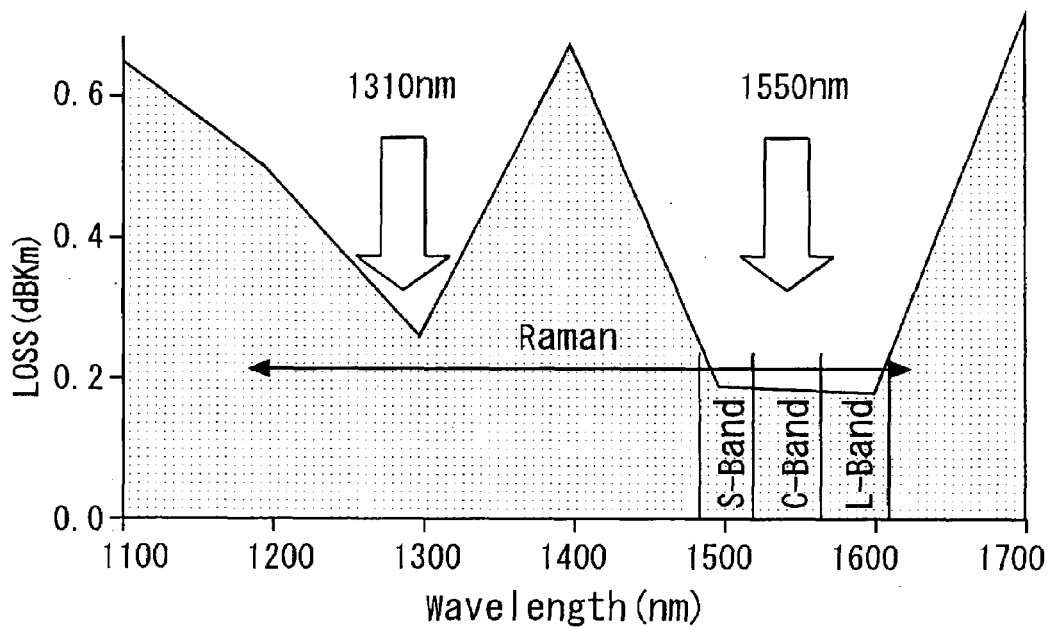
FIG. 10 is a graph illustrating a wavelength-dependency characteristic of fiber loss in an optical fiber.
Figure 11:
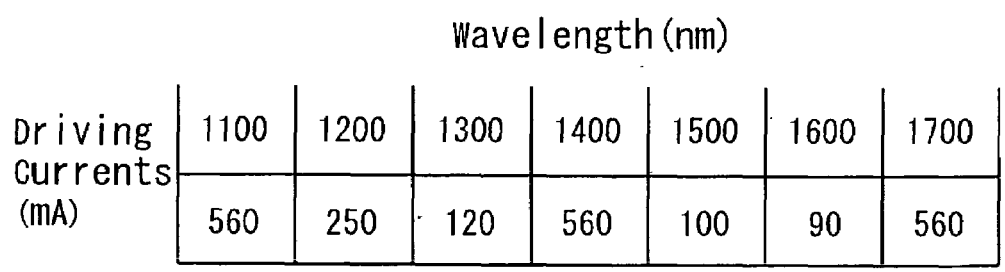
FIG. 11 is a fiber loss data table used by the control unit according to the present invention.

By way of example as shown in the Nov. 28, 2000 publication "Photonics" by CIBC World Markets, FIG. 10 shows that it is known that an amount of attenuation in an optical fiber at 1400 nm is much greater than at 1500 nm. The conventional approach for dealing with this difference in attenuation is to simply use the part of the spectrum that has minimal attenuation. The present inventors take a different approach by employing an amplification profile that compensates for the non-uniform attenuation characteristics in the transmission band. As seen in FIG. 11, the main memory 904 holds a greater driving current (560 mA) for the pump laser having a peak Raman gain at 1400 nm, than the driving current (100 mA) for the pump having a peak Raman gain at 1500 nm, where the fiber loss is much less. Thus, by using a table such as that shown in FIG. 11, the driving currents can be determined so as to achieve the target amplification performance. Other parameters that affect the target profile, such as the tunable semiconductor laser wavelength tuning region control values corresponding to, for example, an amount of control current to provide to the wavelength tuning region of a particular tunable semiconductor laser 202, 203, 204, 205, can also be stored in a data table in the memory of the controller 501.

There are simulation programs (e.g., OptSim by ARTIS Software) commercially available which can initially calculate the necessary tunable semiconductor laser wavelength tuning region control values to achieve the desired output profile. For example, the optical power around a particular frequency in a WDM system may be expressed by the following equation:

$$\frac{dP_v^\pm}{dv} = -\alpha_v P_v^\pm + \varepsilon_v P_v^\mp + P_v^\pm \sum_{\mu>v} \frac{g_{\mu v}}{A_\mu}(P_\mu^+ + P_\mu^-) + \quad (1)$$

$$2hv \sum_{\mu>v} \frac{g_{\mu v}}{A_\mu}(P_\mu^+ + P_\mu^-)\left[1 + \frac{1}{\exp\left[\frac{h(\mu-v)}{kT}\right]-1}\right] -$$

$$P_v^\pm \sum_{\mu<v} \frac{v}{\mu} \frac{g_{v\mu}}{A_v}(P_\mu^+ + P_\mu^-) - 4hvP_v^\pm \sum_{\mu<v} \frac{g_{v\mu}}{A_v}\left[1 + \frac{1}{\exp\left[\frac{h(v-\mu)}{kT}\right]-1}\right]$$

where subscripts μ and ν denote optical frequencies, superscripts "+" and "−" denote forward- and backward-propagating waves, respectively, $P_v$ is optical power around ν, which is the product of power spectral density at ν and infinitesimal bandwidth dν. $\alpha_v$ is attenuation coefficient, εν is Rayleigh backscattering coefficient, $A_v$ is effective area of optical fiber at frequency ν, $g_{\mu v}$ is a Raman gain parameter at frequency ν due to the pump at frequency μ, h is Planck's constant, k is Boltzmann constant, and T is temperature. This equation is expected to include almost all conceivable effects observable in real systems, such as pump-to-pump and signal-to-signal Raman interactions, pump depletions due to Raman energy transfer, Rayleigh backscattering, fiber loss, spontaneous emission noise and blackbody radiation noise. In one embodiment of the present invention, the main memory 904 of the controller 501 holds computer readable instructions that have the above equation (1) encoded therein. These instructions are executed by the processor 903 so as to simulate a target amplification performance based on the aggregate amplification effects provided by the different pump lasers 202, 203, 204, 205.

FIGS. 12, 13A, 13B, and 14 will now be referred to when explaining an exemplary process of how to set a target amplification performance including both amplitude and wavelength of step S4 in FIG. 9. FIGS. 12, 13A, 13B, and 14 illustrate a superposition principle that is used in one embodiment according to the present invention to determine the appropriate conditions (e.g., center wavelength of pumps, pump output powers) needed to obtain a flat (or arbitrarily shaped) Raman amplification performance.

FIG. 12 is a graph showing individual and composite Raman gain profiles versus wavelength for two pump lasers, operating at 1424.2 nm and 1451.8 nm. The pump lasers may be referred to as YYXX lasers (YY being in a range of 13 through 15 and XX being in a range of 00 through 99). As an example, for producing a Raman gain in the S-Band through L-band, the YYXX lasers may be referred to as 14XX pump lasers (e.g., 1400 nm to 1499 nm). The Raman amplification gain profile due to the single pump laser operating at a central wavelength of 1424.2 nm is shown as profile "a" in FIG. 12. Likewise, an amplification profile due to a single pump laser operating at a central wavelength of 1451.8 nm is shown as profile "b". The total Raman amplification profile due to the simultaneous operation of both pumps is shown as profile "c" and is determined via the superposition principle (i.e. the profiles are additive). That is, according to the superposition principle, the amplification profiles due to each of the pumps may be added to achieve a total amplification profile that corresponds to the addition of the two individual profiles.

FIGS. 13A and 13B illustrate another example of the superposition principle as applied to the present invention with regard to creating target amplification performances. As shown in FIG. 13A, four pump lasers are tuned to the shorter wavelengths (i.e., a first group) and set at a first predetermined gain level (or optical output level), and a fifth pump laser (i.e., a second group, having only one pump laser in this example, but more could be included) is set to a higher gain level. The fifth pump laser is tuned to be separated in wavelength from the closest of the pump lasers in the first group by a greater wavelength interval than between that of adjacent members in the first group. Moreover, the pump lasers in the first group are set to approximately equal gain levels and are tuned to be separated from one another by about 20 nm (although a range of 6 nm to 35 nm is a reasonable separate range to minimize appreciable inflection points in the gain profile). In this example, the fifth pump laser is tuned to operate at a central wavelength of 1495.2 nm (29.2 nm above the closest pump laser in the first group, which operates at 1466.0 nm), and is set to impart an effective gain that is almost 3 times higher than that of each of the first group of pumps.

FIG. 13B corresponds with FIG. 13A and illustrates how the superposition principle applies to the amplification profiles produced by the pump lasers in the first group and in the second group. Amplification profiles "a", "b", "c" and "d" correspond with the pump lasers in the first group, which were respectively tuned operate at 1424.2 nm, 1437.9 nm, 1451.8 nm and 1466.0 nm. Profile "g" corresponds with a composite profile for the first group and profile "e" corresponds with profile provided by the pump laser in the second group, namely 1500 nm (although a plurality of pumps, such as two or three, may be tuned to form the second group). Note that the respective amplification peaks occur at a wavelength that is about 100 nm longer than where the source pump operates.

Target amplification gain profiles "c" (in FIG. 12) and "f" (in FIG. 13B) are generated by applying the superposition principle. The resulting shape of the predicted amplification gain profiles may be made substantially flat, as shown, or set to any arbitrary shape, by adjusting the outputs of the pump lasers, and tuning them to have a specific spacing in the central wavelength at which the pump lasers operate. For example, the amplification profile "f" shown in FIG. 13B may be made to tilt so as to have a negative slope throughout the amplification band by reducing the gain of the second group, namely the pump tuned to operate at the central wavelength of 1500 nm. Likewise, the profile could also be tilted to assume a negative slope by increasing the output from group 1 (i.e., gain profile "g"). Conversely, target amplification profiles "c" (FIG. 12) and "f" (FIG. 13B) could be made to have a positive slope by either reducing the output from the first group, and/or increasing the output from the second group. Gain profiles "g" and "e" (FIG. 13B), which are provided by a group of pumps, may be referred to as "element gain profiles." Since there are generally a greater number of pump lasers operating in the group(s) at the shorter wavelengths, it is possible to impart a greater number of higher order gain shape features in the element gain profile for the shorter wavelengths than for the longer wavelengths.

After step S4 is completed, the process proceeds to step S6, where the control unit 206 may then assert control over the optical output of the pump lasers by applying the amplification parameters (e.g., amplitude and wavelength) previously determined to the pump lasers. As an example, when the simulated amplification performance matches the target amplification performance, within a predetermined tolerance, respective drive currents and wavelength tuning region control values for each pump laser are identified in a look-up table based on the peak amplification output level from each of the pump lasers determined in the simulation. Alternatively, or complementarily, the control unit 206 may be programmed to adjust an amount of attenuation exhibited by programmable attenuators, optically coupled to each of the pump lasers, so as to control the respective optical outputs of the pump lasers, consistent with obtaining the target amplification performance. Thus, the amplifier parameters are associated with an amount of optical energy applied to the optical fiber carrying the fiber as well as the wavelength of the optical energy applied, and need not only be the driving currents applied to the pump lasers.

The transition from step S6 to step S8 in the control process of FIG. 9 is a transition from initiating an amplification performance, that is presumably reasonably close to the target amplification performance, to monitoring and adjusting the actual amplification performance to be within a predetermined tolerance band of the target amplification performance. This monitoring and adjusting portion of the control process begins in step S8, where the control unit 206 monitors the output WDM signal, and perhaps also monitors the actual input WDM signal, as discussed above with regard to FIG. 6.

Step S8 may be accomplished in a variety of ways. One way is to take several measurements across the amplification band, such as one mean power measurement per pump laser. In this scenario, there would be a one-to-one correspondence between the amplifier sub-band and each pump laser. However, there is no restriction on the granularity with which the monitoring step is performed. The greater the resolution (i.e., number of sample points per Hz), the greater the ability to determine the degree to which the actual amplification performance matches that of the target amplification performance. However, after the resolution approaches a level that corresponds with the closest pump laser spacing (e.g., not closer than 6 nm for separate pump sources), little further benefit is achieved unless multiple laser outputs are combined so as to increase the optical output power. At the other extreme, if the resolution is restricted to only a few points, there is a limited ability to determine whether there are inflection points between sample points. Thus, having a resolution that generally corresponds with the pump spacing helps to ensure reliable conformance with the target amplification performance across the entire amplification band, while not wasting processing resources. After obtaining the sample points, the control unit 206 stores the sample points of the output WDM signal, for example in the main memory 904 for subsequent processing.

After step S8, the process proceeds to step S10, where an inquiry is made to determine if the actual (monitored) amplification performance is within a certain tolerance ($\gamma$, e.g., 0.5 dB for strict compliance, or 1 dB for less strict compliance) of the target amplification performance, throughout the amplification band. In one embodiment, this determination is made on a sample-by-sample basis, according to the following equation:

$$ABS[\text{target}-\text{monitored}] \leq \gamma(\text{a certain tolerance})$$

Alternatively, an average of the monitored samples may be combined to develop a mean amplification performance over a predetermined sub-band. In this case, it is possible to reduce the number of calculations required, but also permit the control unit 206 to measure for a compliance of "shape" with regard to the target amplification performance. For example, as will be discussed below, the control unit 206 may control groups of pump lasers to affect a desired amplification performance. Suppose the control of the pump lasers is handled by controlling the pump lasers as two groups. The control unit 206 can then calculate a mean output level for the shorter wavelengths (first group) and another mean output level for the longer wavelengths (second group). This allows the control unit 206 to (1) determine whether the mean amplification performance across the amplification band is within γ; and (2) to determine if an adjustment needs to be made to the slope (i.e., tilt) of the total amplification performance by some amount.

Now, referring to the flowchart of FIG. 9, if the response to the inquiry in step S10 is affirmative (yes) for all sample points (or alternatively, for a predetermined number of sample points or percentage of all sample points), the process returns to step S8. However, if the response to the inquiry in step S10 is negative (no), the process proceeds to step S12.

In step S12, the control unit 206 compares the amount of deviation observed for each of the sample points. If there is not a consecutive pattern of deviations (e.g., adjacent samples that are both outside the predetermined tolerance), then the control unit 206 implements an adjustment process that adjusts (up or down) an optical output from the pump laser and/or the central wavelength of the pump laser whose peak amplification profile is most closely aligned with where the deviation occurred. Moreover, if the control unit observes that the deviation is isolated to a small part of the amplification band, then the control unit 206 adjusts that optical output and/or central wavelength for the pump laser whose peak output most strongly influences that part of the amplification band.

However, if the control unit 206 determines in step S12 that a series of adjacent samples of the monitored amplification profile deviate by more than the predetermined tolerance from the target amplification performance, then the control unit 206 implements a different process. In this latter situation, the control unit 206 creates a "secondary target amplification profile." The shape of this secondary target amplification profile is formed from a difference between the target amplification performance and the monitored amplification profile. Much like with step S4, the control unit 206 then determines (e.g., through simulation or table look-up) a set of amplifier parameters (e.g., pump laser drive currents and/or wavelength tuning region control values) that can be applied to the pump lasers 202, 203, 204, 205 so as to have the monitored amplification profile more closely match the target amplification profile. Thus, the control unit 206 creates secondary target amplification profile that, when added to the monitored amplification profile, results in a new amplification profile that more reliably falls within the predetermined tolerance of the target amplification profile, across the amplification band.

Once step S12 is completed, the process proceeds to step S14, where the control unit 206 causes the optical outputs and/or the wavelength tuning region control values of the affected pump lasers to be adjusted by an amount necessary to implement the secondary target amplification profile. The process then returns to step S8 for continued monitoring and adjusting operations.

Setting and maintaining an amplification profile may be accomplished with the control unit 206 by adjusting individual pump laser outputs and/or the central wavelengths at which the individual pump lasers operate. However, control can also be accomplished by adjusting the element profiles of respective groups of pump lasers. As discussed above, each of the element profiles is realized by combining the respective gain profiles of the pump lasers in that group. Then, the element gains themselves may be adjusted to lessen the number of degrees of freedom in the control process when making changes to the total amplification performance. For example, the levels of two element profiles may be adjusted quickly to impart a slope change on the total amplification profile. As discussed above, a positive slope may be created by increasing the gain of the second element and/or decreasing the gain of the element profile for the first element. Conversely, a negative slope may be imparted on the total amplification performance if the profile for the first element is increased and/or the profile for the second element is decreased.

A computer-based simulation process, as discussed above, may be used to efficiently determine a magnitude by which each of the element profiles should be adjusted so as to realize the desired effect. For example, a two step simulation process may be employed where the element profiles are identified via an element analysis (i.e., performing simulations to determine the respective gain levels attributable to each of the pump lasers to achieve the desired element profile). Then, a second step would be performed where the levels of the element profiles are adjusted to provide a desired total amplification profile of a predetermined shape. As one example, the element profiles could be developed during an initial setup mode of operation (e.g., step S4 in FIG. 9) and then the second simulation step would be performed in step S12 to identify an amount by which respective element profiles should be adjusted to maintain the total amplification performance to stay within the predetermined tolerance.

With regard to initially establishing the element profiles, the present inventors observed that since a high effective gain is expected with a lower power required, an element gain profile for the longer wavelength band (second element profile) is temporally set based on the desired target amplification gain profile. Moreover, the second element profile is set at a sufficiently high gain to ensure that the second element profile substantially accounts for the gain required at the longer wavelength portion of the amplification band. When done this way, the burden is then shifted on the control unit 206 to set the first element gain profile to match the difference between the target amplification profile and the second element gain profile. Since there are more pump lasers in the shorter wavelength group (i.e., the first group), there are more pump lasers available to create a more complex shaped first element profile.

Moreover, since the pump lasers of the present invention are tunable, the central wavelengths of the individual pump lasers, as determined by the simulation, may also be tuned by the control unit 206. The present inventors have recognized that by having a tunable Raman amplifier, that generic amplifiers can be installed and tuned after they are installed in order to implement a desired amplification profile. As discussed above, this field tunability allows for a single module design to be used in a variety of systems, and greatly reduces the manufacturing, inventory, and cost problems associated with custom-built equipment.

Figure 14:
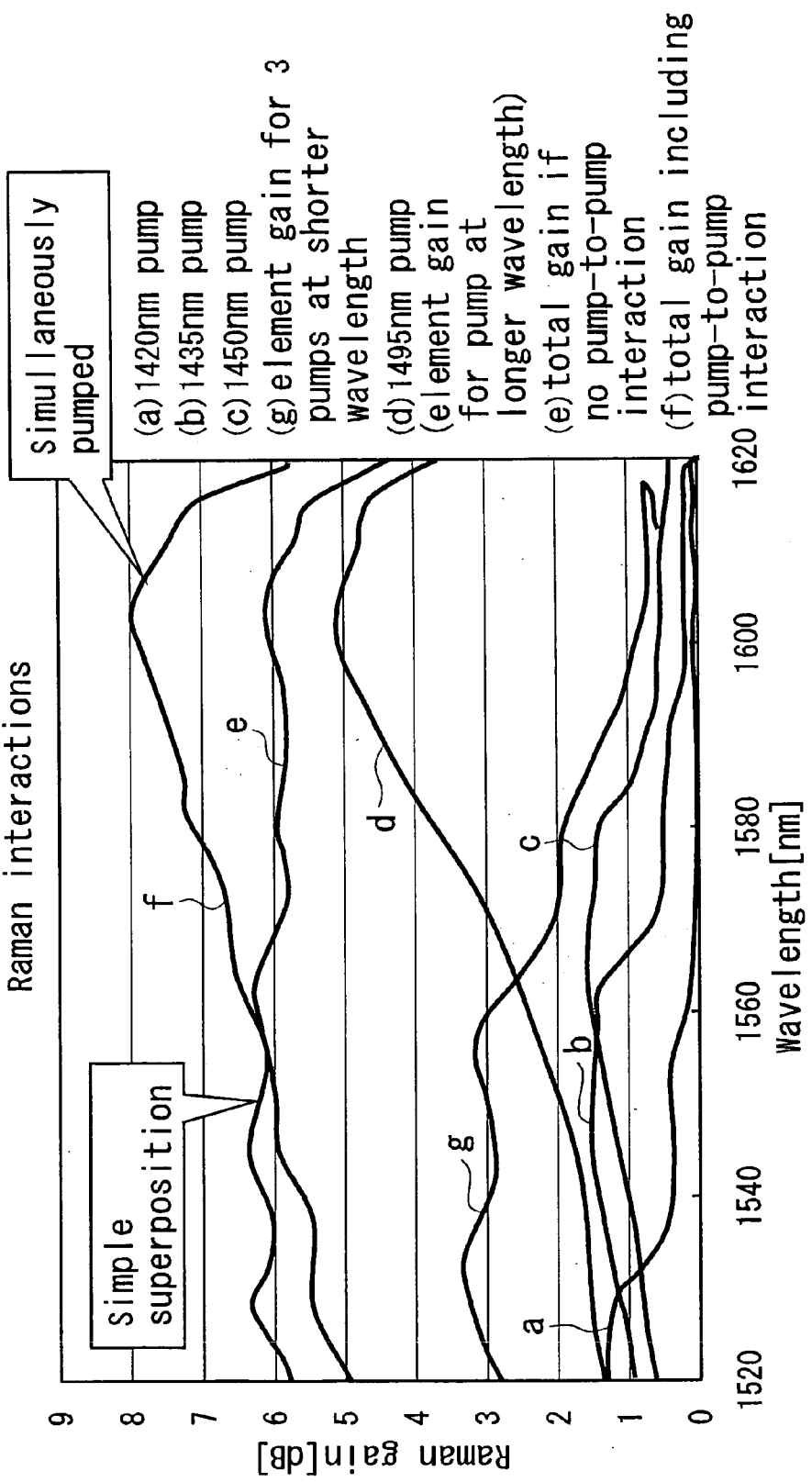
FIG. 14 is a graph illustrating a predicted Raman amplification profile based on the superposition principle and an actual Raman amplification profile.

When setting the shape for the first element profile, the control unit 206 may take into account additional conditions. For example, one of the additional conditions may be an amount of fiber loss in the optical fiber. This fiber loss may be determined at the time of installation of the Raman amplifier, and thus varies depending on the operational setting for that Raman amplifier. The fiber loss may change over time, perhaps based on a system operator adding another amplifier closer to the subject Raman amplifier, thus decreasing the distance over which the output optical signal must travel before being amplified again. As an example of a further "additional condition", the first element profile may be adapted to compensate for pump-to-pump interactions that may be experienced. FIG. 14 illustrates how pump-topump interactions will tend to inflate the total amplification performance at the longer wavelengths (profile "f"). By having the control unit 206 account for these additional conditions, it is possible to have the control unit 206 alter the shape of the respective element profiles, such that the total amplification performance is optimized, despite the existence of the additional conditions in which that Raman amplifier will operate.

As another example of how the control unit 206 may adjust the element profiles as a simplified control mechanism (as compared with simultaneously adjusting all of the pump lasers), suppose a tilted gain is observed when a flat gain is targeted. In this situation, the control unit 206 may correct for the tilted gain by adjusting the optical output of the first group of pumps and/or the second group of pumps. One adjustment process is to make incremental changes to the driving current for each pump until the total gain profile becomes readjusted to the relatively flat total gain profile "f" in FIG. 13B. The driving current increments are then stored in a memory, for example, the main memory 904 for quick retrieval when making adjustments to the total amplification profile in future situations. Alternatively, the Raman amplifier may have several "hot spare" pumps which can be activated and tuned to provide amplification at a particular wavelength to remove the tilt.

The control unit 206 may be purposefully configured to impart a tilted gain by adjusting the levels of the element profiles. For example, a flat gain across the amplification band may be appropriate if the communication parameters in the optical communication link are uniform across the spectral band. However, loss in an optical fiber is wavelength dependent, and thus, some channels of the WDM signal may be attenuated more than others when transiting between cascaded amplifiers. In this case, the control unit 206 may offset this operating condition by "pre-emphasizing" the optical signals that tend to be attenuated more by adjusting the element profiles to create a tilted total.

A numeric example will now be provided as a further explanation about how a simplified control process implemented in the control unit 206 can use groups of lasers to set and maintain an amplification gain performance within a predetermined tolerance of a target amplification performance. Assume a power level of respective WDM optical signals, e.g., channels 1–10, is uniform at –20 dBm. Also assume a net target gain applied by the Raman amplifier is about 10 dB, considering the internal losses imparted by the tap coupler and the WDM coupler. Consequently, the actual per channel output power level from the Raman amplifier should be uniform and have a value of about –10 dBm (i.e., –20 dBm+10 dB). The control unit 206 may keep as a stored value an indication that the output signal level, per channel is –10 dBm. Thus, if the control unit 206, during its monitoring operation determines that the output signal per channel is above or below that –10 dBm signal level by more than a specified amount, the control unit 206 can increase or decrease the element profile by an appropriate amount to counteract the deviation from the expected output level. For example, the control unit 206 may determine the following actual output power levels and corresponding deviations from the target value of –10 dBm:

| Channel # | Actual output power level | Deviation from target |
|---|---|---|
| Channel 1: | –15.0 dBm | 5.0 dBm |
| Channel 2: | –14.5 dBm | 4.5 dBm |

-continued

| Channel # | Actual output power level | Deviation from target |
|---|---|---|
| Channel 3: | –14.0 dBm | 4.0 dBm |
| Channel 4: | –13.5 dBm | 3.5 dBm |
| Channel 5: | –13.0 dBm | 3.0 dBm |
| Channel 6: | –12.5 dBm | 2.5 dBm |
| Channel 7: | –12.0 dBm | 2.0 dBm |
| Channel 8: | –11.5 dBm | 1.5 dBm |
| Channel 9: | –11.0 dBm | 1.0 dBm |
| Channel 10: | –10.5 dBm | 0.5 dBm |

The control unit 206 will then make the determination that a series (i.e., more than one) deviations exist between sample points and thus will adjust an element profile up or down in gain level. By observing the series of deviations, the control unit 206 has in effect determined the "secondary target amplification profile." The control unit may thus compensate for this deviation by increasing the element gain of the first group so as to create a more tilted total amplification profile that more closely matches the target amplification profile. Further adjustments to the first element profile may then be made by adjusting optical outputs of the pump lasers within the first group, if necessary.

Alternatively, the control unit 206 may refer to the memory to identify drive current adjustments that have previously been associated with the secondary target amplification profile that is presently observed. Moreover, the memory holds sets of drive current adjustment values for the respective pumps in the first and second groups that are prearranged to create particular secondary target amplification profiles. Since only a limited number of pre-stored secondary target amplification profiles can be held in memory, the control unit 206 performs a least-squares analysis, based on the observed secondary target amplification profile to select a "closest" pre-stored secondary target amplification profile. Other pattern recognition processes may be used as well to select appropriate pre-stored secondary target amplification profiles, for the purpose of retrieving the drive current settings, or, alternatively the tunable semiconductor laser wavelength tuning region control value settings, associated with the pre-stored secondary target amplification profiles.

Alternatively, the control unit 206 can be configured to determine an average or mean value of the deviations and verify if this average or mean value is within an allowable tolerance. For example, the control unit 206 may determine that the average value of the deviations is zero, which in some instances may indicate that the amplification performance has been satisfied. If it is not within tolerance however, the control unit 206 would increase/decrease the element gains as appropriate to more closely close the gap between the actual output level profile and the target level profile (i.e., –10 dBm in this example).

Further, the deviations shown above correspond to a difference between the actual output power level and the target output power level. Note, however, the control unit 206 may determine the drive currents from the superposition principle, as discussed above.

Raman amplifiers will be placed in service in a variety of different operational conditions that may influence how an optimum target gain profile is identified for that operational environment. Information about the operational conditions (such as the pump-to-pump interaction shown as the difference between profiles "f" and "g" in FIG. 14) is provided to the control unit 206 at step S2 (FIG. 9) for selecting the optimum target profile. The source of this information may be found during equipment installation, or periodic recalibration. When a target gain profile "g" is initially given in step S2, yet an actual gain profile is observed like "f", this difference in actual from predicted performance is found in steps S8 and S10. The control unit 206 may observe this deviation as being attributable to the existence of pump-to-pump interaction, that had not originally been considered in steps S2 and S4 when establishing the target amplification performance. Once this observation is made, the process of FIG. 9 may reestablish a new target profile in steps S2 and S4 that consider the existence of pump-to-pump interaction, rather than just simple superposition. In this case, with the modified process for developing the target amplification performance, the observed variation from target amplification performance to the monitored amplification performance should narrow, thus requiring less adjustment to maintain the predetermined gain profile.

This additional condition information (which in this case is the realization that there is pump-to-pump interaction) is also considered in steps S10 and S12 (FIG. 9) when performing the monitoring and analyzing process steps. The information is useful since the additional conditions will be reflected in the target amplification profile, or in observed, consistent deviations from the target amplification profile. The output level or central wavelengths of the pumps in each group may then be changed as necessary so as to maintain the target amplification performance (step S14).

For example, the control unit 206 may incrementally increase or decrease an output power or tune the central wavelength of each pump in the first group so as to affect the element amplification profile of the first group. If the observed total gain profile is still not within the allowable tolerance of the target gain profile after this incremental increase or decrease, the control unit 206 may again incrementally increase or decrease the output power or tune the central wavelength of each group of pumps.

A look-up table, such as that shown in Table 1, may be used to implement this incremental approach. That is, the control unit 206 may select a first profile #1 for the set of four pumps in the first group and read the driving currents from the table for each pump (i.e., a driving current of 500 mA for each pump). If the actual amplification profile does not equal the target amplification profile, the control unit may select profile #2 for the four pumps in the first group. This incremental approach may be continued until the actual amplification profile is within the allowable tolerance of the target amplification profile.

TABLE 1

| Group 1 (four pumps) | | | | |
|---|---|---|---|---|
| Pump 1 | Pump 2 | Pump 3 | Pump 4 | Profile Number |
| 500 mA | 500 mA | 500 mA | 500 mA | #1 |
| 490 mA | 490 mA | 490 mA | 490 mA | #2 |
| 480 mA | 480 mA | 480 mA | 480 mA | #3 |

In addition, the look-up Table 1 may also be modified to store different drive currents and/or different wavelength tuning region control values corresponding to different types of amplification profiles.

For example, the look-up Table 2 shown below may be used by the control unit 206 to provide various element gain profiles for a specified group of pumps. The values in Table 2 were selected as examples to show that different sets of values may be selected.

TABLE 2

| Group 1 (four pumps) | | | | |
|---|---|---|---|---|
| Pump 1 | Pump 2 | Pump 3 | Pump 4 | Profile Number |
| 560 mA | 311 mA | 122 mA | 244 mA | #1 |
| 560 mA | 500 mA | 440 mA | 330 mA | #2 |
| 480 mA | 480 mA | 480 mA | 480 mA | #3 |

In this example, the control unit 206 may determine that the gain profile #2 is suitable to offset a fiber loss characteristic (i.e., another "additional" condition"). The control unit 206 may then read the necessary driving currents from the table to achieve a desired amplification profile for the first group of pumps. The control unit 206 may select the best profile (i.e., one that minimizes a difference between an actual output signal level and a target output signal level, considering the effects of any additional conditions such as fiber loss) from the table based on a variety of factors. For example, the control unit 206 may select profile #3 that provides the actual amplification performance, due to both the first and second groups having a profile 5 dB below a target gain profile. The control unit 206 may also determine this drop in gain occurs in the wavelengths corresponding to the pumps in the first group. The control unit 206 may then select profile #1 from Table 2 (which has previously been determined as the best profile to offset a loss of 5 dB or less, for example). Once profile #1 is selected, the driving currents associated with profile #1 are then retrieved from memory and applied to the respective pump lasers.

Using the control unit 206 and a special arrangement of the pumping device, the target amplification performance may be changed. h the examples that follow, the change of target amplification performance is explained in the context of attempting to provide a same system-level performance for an input WDM signal even though a system parameter has changed. FIGS. 15–33 illustrate different examples of the control unit 206 exerting control over the pump lasers so as to produce a target amplification gain profile that yields a same overall system performance for an input WDM signal, even though the communication conditions may have changed.

Figure 15:
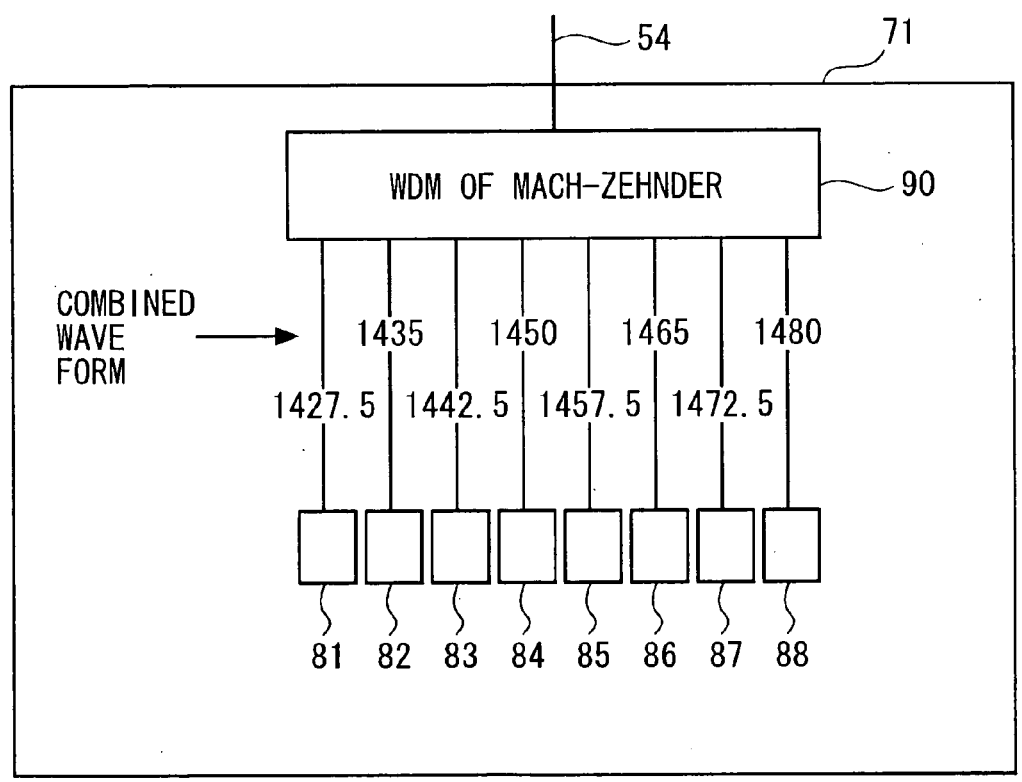
FIG. 15 is a schematic of another pumping device according to the present invention.

FIG. 15 is a schematic of another pumping device 71 according to the present invention, which includes "slots" for eight pump lasers 81–88 coupled by a Mach-Zehnder interferometer 90. Each of the pumps 81–88 may have their central wavelength and driving current set by the control unit 206. Alternatively, the control unit 206 may simply not apply driving currents to one or more of the pumps 81–88. This alternative embodiment enables the production of a "generic pumping device" that may be fully configured/reconfigured after it is placed in a particular operational situation. In this way, each amplifier need not be custom fit to a particular place in a communication network, but rather the generic amplifier may be remotely configured by, for example, the remote device controller 121 that downloads operational parameters to the Raman amplifier. In this case, it is possible that at least some fraction of the pump lasers will not be used by the control unit 206 to create the target amplification performance. Although not shown in FIG. 15, the control unit 206 asserts control over the pump lasers 81–88 by way of the bus 120 so as to tune the central wavelengths and set the drive currents of the pump lasers 81–88.

In this example, pumps 85 and 87 are turned off, and the total power of the pumps included in the first group, tuned by the control unit 206 to operate at the shortest wavelength side (i.e., the total power due to pumps 81, 82, 83 and 84) is greater than a total power due to the pumps in the second group tuned by the control unit 206 to operate at the longer wavelength side (i.e., the total power due to pumps 86 and 88). This provides a flat amplification profile since the control unit 206 adjusts the levels of the pump lasers in the first group and the second group to form element profiles that result in a flat profile when combined. In FIG. 15, the pumps in each of the respective groups produce the same output power, but the total output power due to the pumps tuned by the control unit 206 to operate at the longer wavelength side is set to be sufficiently high to maintain the flat gain profile even though only a subset of the pumps is used.

After the element profiles are established, the control unit 206 may monitor the actual WDM signal and control each operating pump by tuning the central wavelength and/or setting the drive current so as to maintain the target amplification gain profile. Alternatively, the control unit 206 may monitor and control the actual amplification profile with respect to two groups of pumps.

Figure 16:
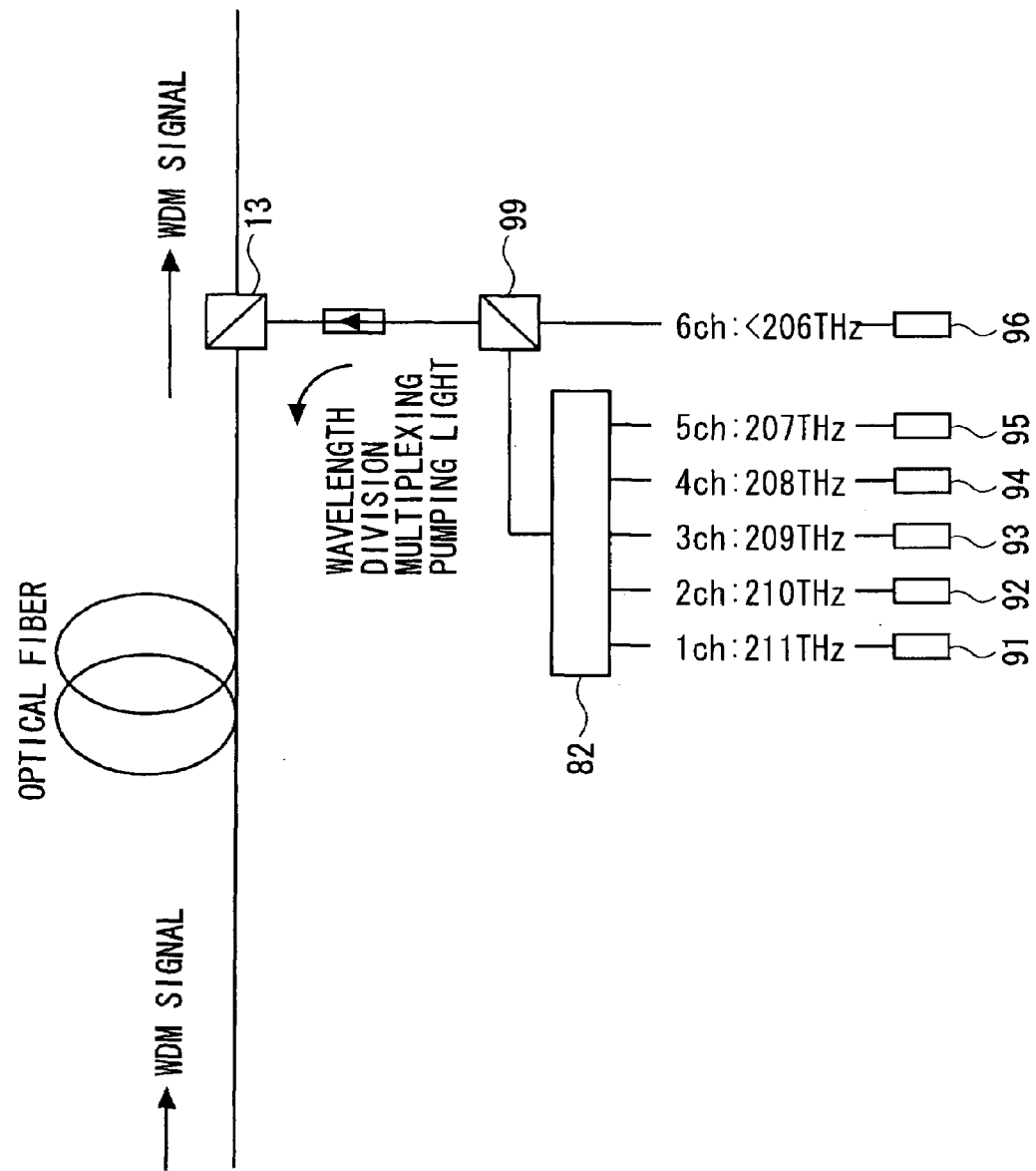
FIG. 16 is a schematic for explaining another Raman amplification example according to the present invention.

The amplification bandwidth can be expanded or contracted by tuning the central wavelengths and/or changing the contributions from pump lasers tuned to operate at the shortest and longest wavelengths in the group of pump lasers. FIG. 16 illustrates another example in which this can be accomplished. It should be noted that in FIG. 16, the center frequencies of the pump lasers are shown, rather than the central wavelengths. As shown, the center frequency of the first pump 91 is tuned to operate at 211 THz (a wavelength of 1420.8 nm) and the center frequency of the fifth pump is tuned to operate at 95 is 207 THz (a wavelength of 1448.3 nm). The pumps 91–95 are tuned by the control unit 206 to be spaced apart from each other at an interval of 1 THz and the light output from the pumps 91–95 are combined via the WDM combiner 82 to form a shorter wavelength group. This combined light is then combined via a coupler 99 with light output from the longer wavelength group that includes a pump 96 operating at a frequency of 205 THz (a wavelength of 1462.4 nm), which is spaced apart from the fifth pump 95 by 2 THz.

Figure 17:
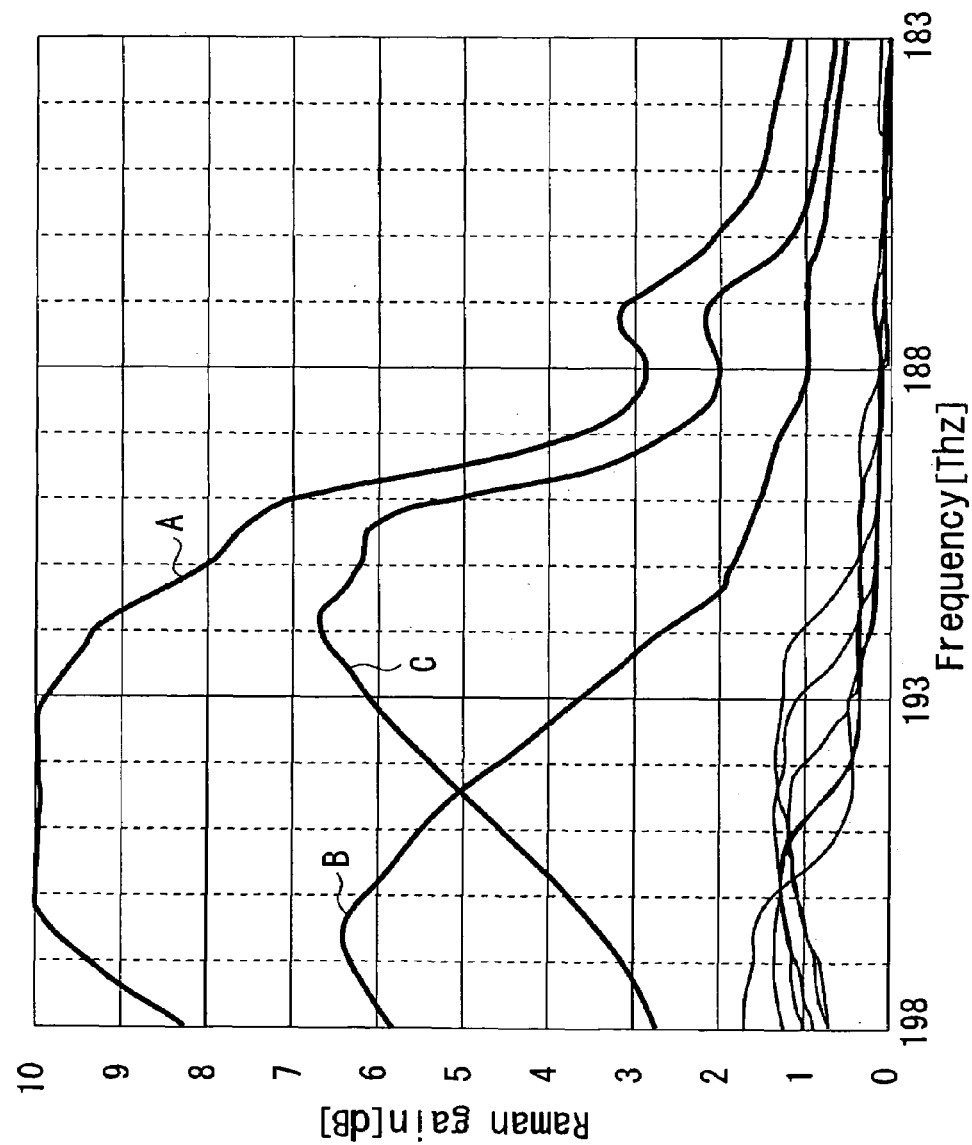
FIG. 17 is a graph illustrating amplification profiles of the pumping device in FIG. 16.

FIG. 17 illustrates Raman amplification profiles for the pumps 91–96 shown in FIG. 16. The curve "A" represents a total amplification profile due to all of the pumps 91–96, the curve "B" represents a sum of the amplification profiles due to a group of shorter wavelengths of the first five pumps 91–95, and the curve "C" represents an amplification profile due to the sixth pump 96. The thin lines in FIG. 17 correspond to amplification profiles for each of the first five pumps 91–95. By multiplexing the light output from the pumps 91–95 spaced at intervals of 1 THz, a smooth curve extending rightwardly and downwardly is formed (i.e., curve "B"). In addition, by adding the curve "B" to an amplification profile extending rightwardly and upwardly (in FIG. 17) due to the light output from the sixth pump 96 (i.e., curve "C"), a total Raman amplification profile is substantially flat as shown by the curve "A". Further, as shown by the thin lines in FIG. 17, a projection of a first amplification curve and a recess of another amplification curve mutually cancel each other when the interval is 1 THz.

Figure 18:
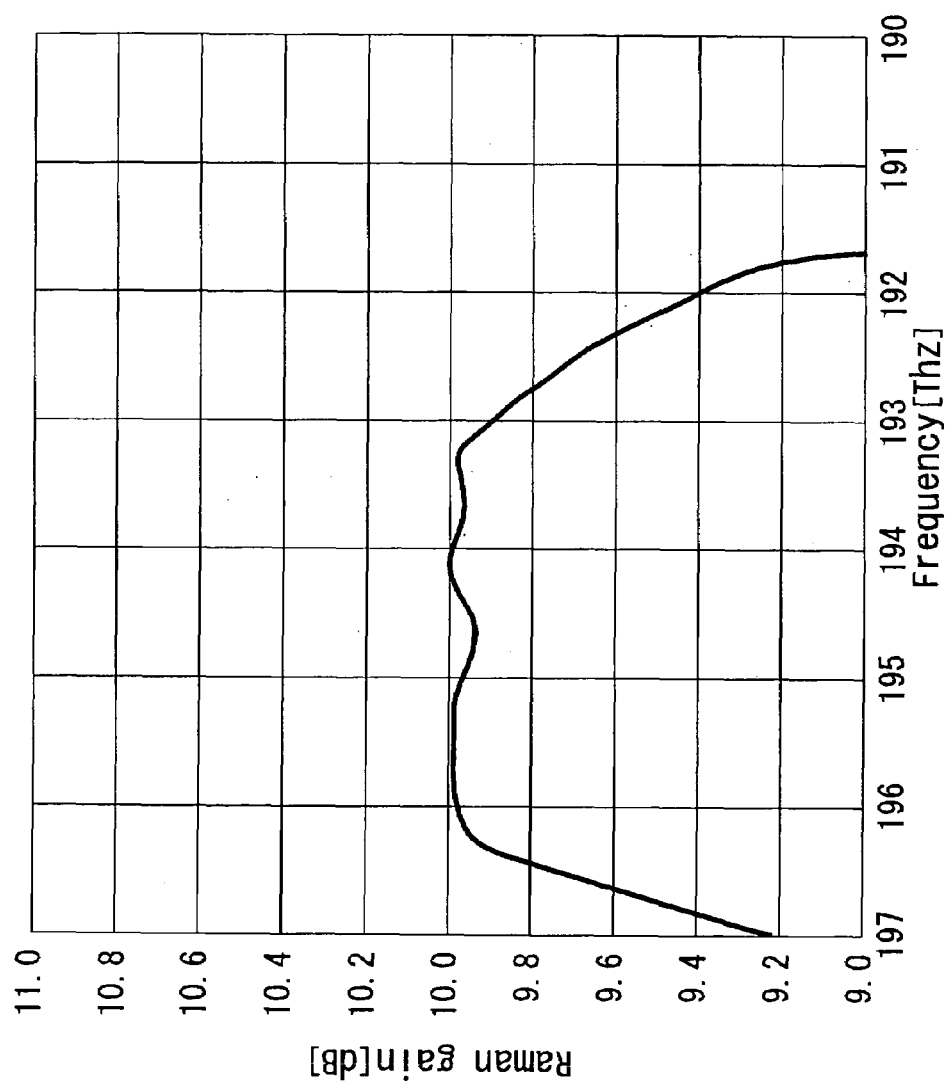
FIG. 18 is a graph illustrating an enlarged view of a total amplification profile of the pumping device in FIG. 16.

FIG. 18 is a graph illustrating an enlarged view of the total amplification curve "A" shown in FIG. 17. As shown, the amplification bandwidth at 10 dB extends from about 196 THz (a wavelength of 1529.6 nm) to about 193 THz (a wavelength of 1553.3 nm) and a gain deviation of about 0.1 dB is achieved.

Figure 19:
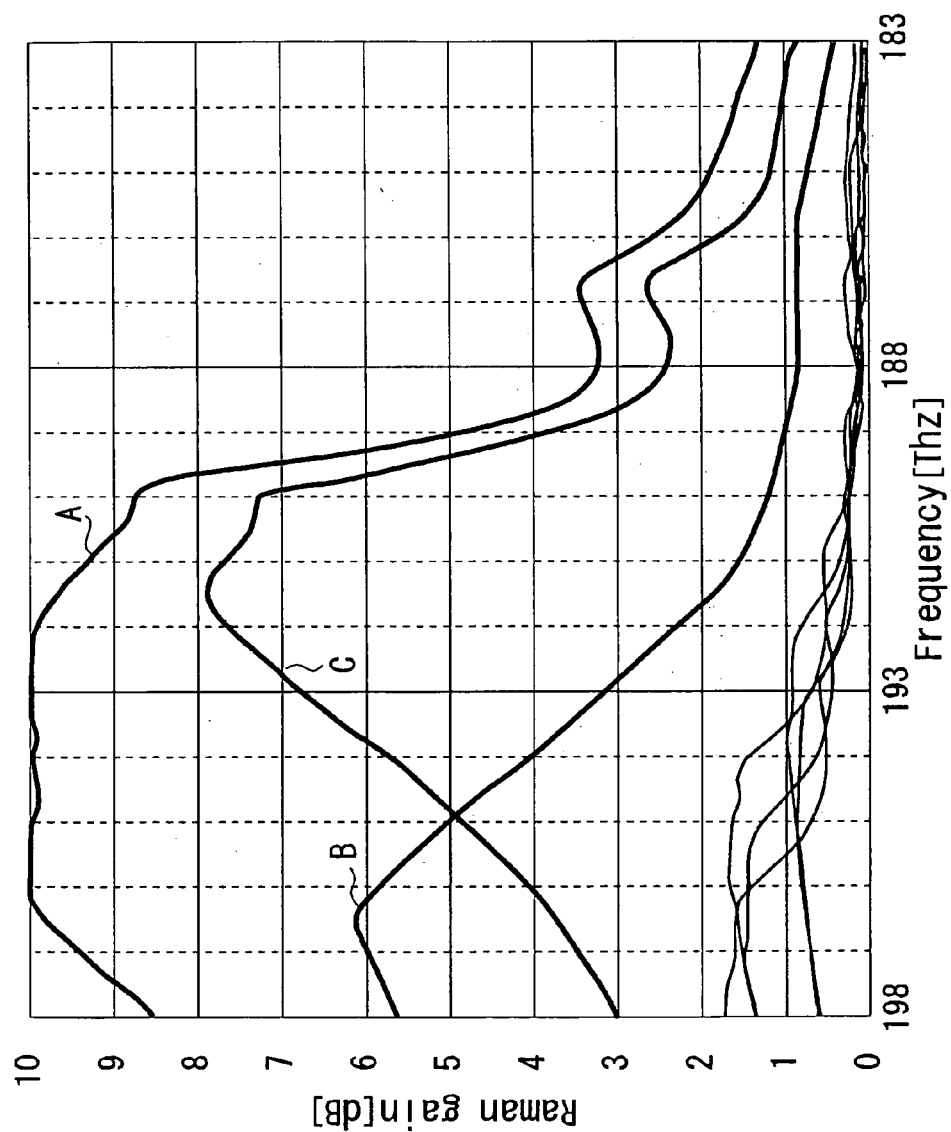
FIG. 19 is a graph illustrating amplification profiles for a variation of the pumping device in FIG. 16.

FIG. 19 shows amplification profiles when the center frequency of the pump 96 in FIG. 16 is tuned by the control unit 206 to be spaced apart from the fifth pump 95 by 2.5 THz (rather than being spaced apart from the fifth pump 95 by 2.0 THz as in FIG. 16). Similar to FIG. 17, the curve "A" represents the total amplification profile, the curve "B" represents the sum of amplification profiles due to the first five pumps 91–95, and the curve "C" represents an amplification profile of the sixth pump 96. Further, the thin lines represent individual amplification profiles of the first five pumps 91–95.

Figure 20:
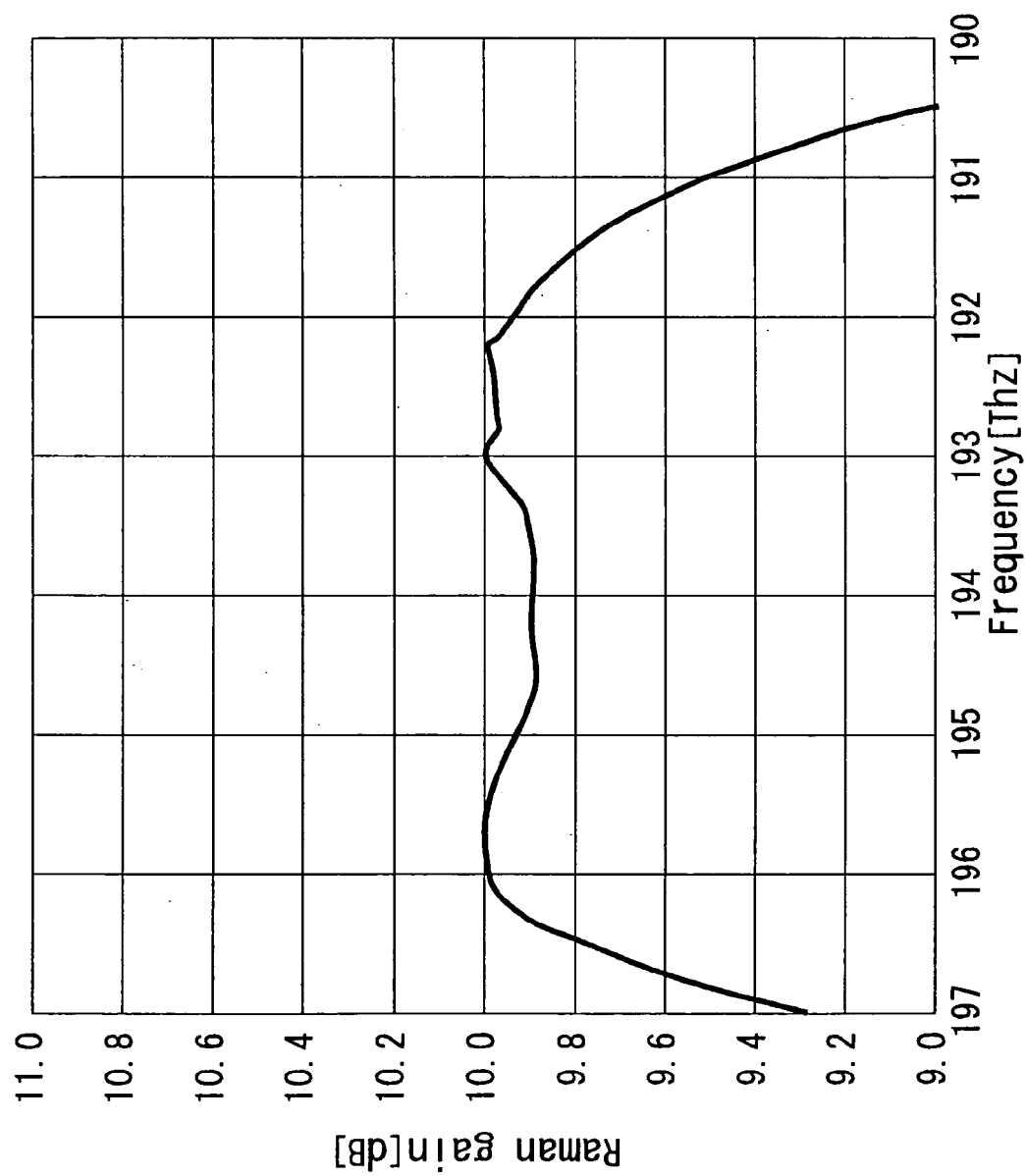
FIG. 20 is a graph illustrating an enlarged view of a total amplification profile of the pumping device shown in FIG. 16.

FIG. 20 is an enlarged view of the total amplification curve "A" shown in FIG. 19. As shown, the peak amplification is at 10 dB, the amplification bandwidth extends from about 196 THz (a wavelength of 1529.6 nm) to about 192 THz (a wavelength of 1561.4 nm) and an amplification deviation of about 0.1 dB is achieved. Further, the amplification bandwidth is wider than that in FIG. 18, but a larger ripple occurs at a middle portion of the bandwidth. The ripple is caused because the interval between the fifth pump 95 and the sixth pump 96 is larger (i.e., 2.5 THz rather than 2.0 THz). Thus, in FIG. 20, a larger amplification bandwidth is achieved, but there is a larger ripple at a middle portion of the bandwidth. The expansion in bandwidth can be controlled by tuning spare pump lasers to intervals below the center frequency of the pump laser that produce the shortest wavelength used to develop profile "B", and above a center frequency of longest wavelength used to develop profile "C" in FIG. 17. While having spare pumps available is more expensive than not including spare pumps, the Raman amplifier is quickly and easily reconfigured from, for example, a remote device controller 121 to adjust an amplification bandwidth.

Figure 21:
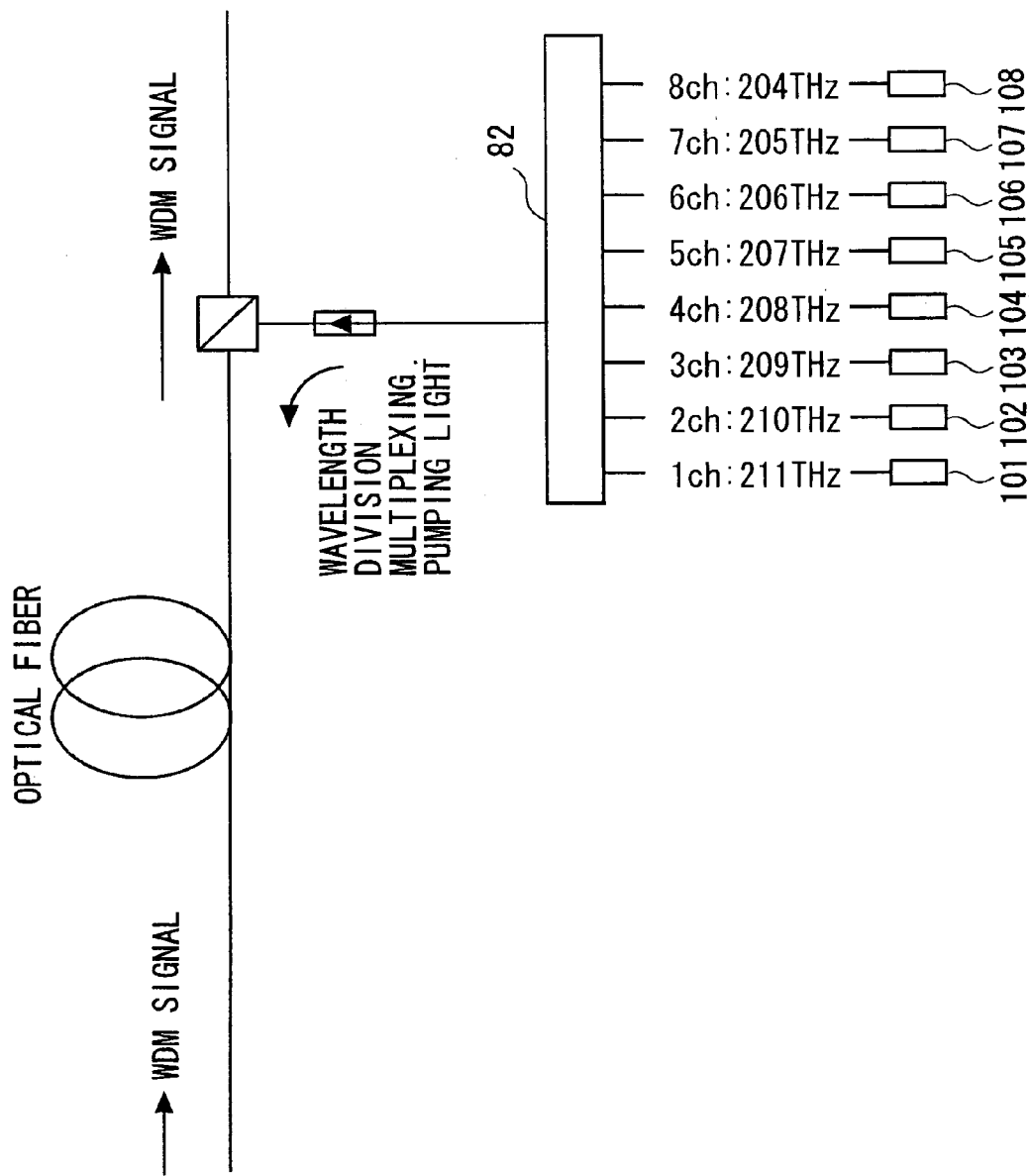
FIG. 21 is a schematic for illustrating yet another Raman amplification example according to the present invention.

FIG. 21 is a schematic illustrating yet another Raman amplifier example according to the present invention. In this example, the frequency of the first pump 101 is tuned by the control unit 206 to operate at 211 THz (a wavelength of 1420.8 nm) and the frequencies of the second to eighth pumps 102–108 are tuned by the control unit 206 to operate from 210 THz. (a wavelength of 1427.6 nm) to 204 THz (a wavelength of 1469.6 nm). Each of pumps 101–108 is tuned by the control unit 206 to be spaced apart from each other by an interval of 1 THz. Note again, however, that one or more of the pumps (e.g., pumps 106, 107) may not used (although they may remain in the Raman amplifier to enable for dynamic reconfiguration of the amplification bandwidth, discussed above). In addition, the wavelength interval between adjacent operating pumps is tuned by the control unit 206 to be within an inclusive range from 6 nm to 35 nm. Further, the number of pumps tuned to operate at the shorter wavelength side (with respect to the middle wavelength between the shortest and longest center wavelengths) is greater than the number of pumps tuned to operate at the longer wavelength side. That is, the pumps are tuned such that the central frequency between the first pump 101 and eighth pump 108 is at about 207.5 THz. Thus, pumps 101–104 (i.e., four pumps) are tuned to operate on the shorter wavelength side and pumps 105 and 108 (i.e., two pumps) are tuned to operate on the longer wavelength side.

Figure 22:
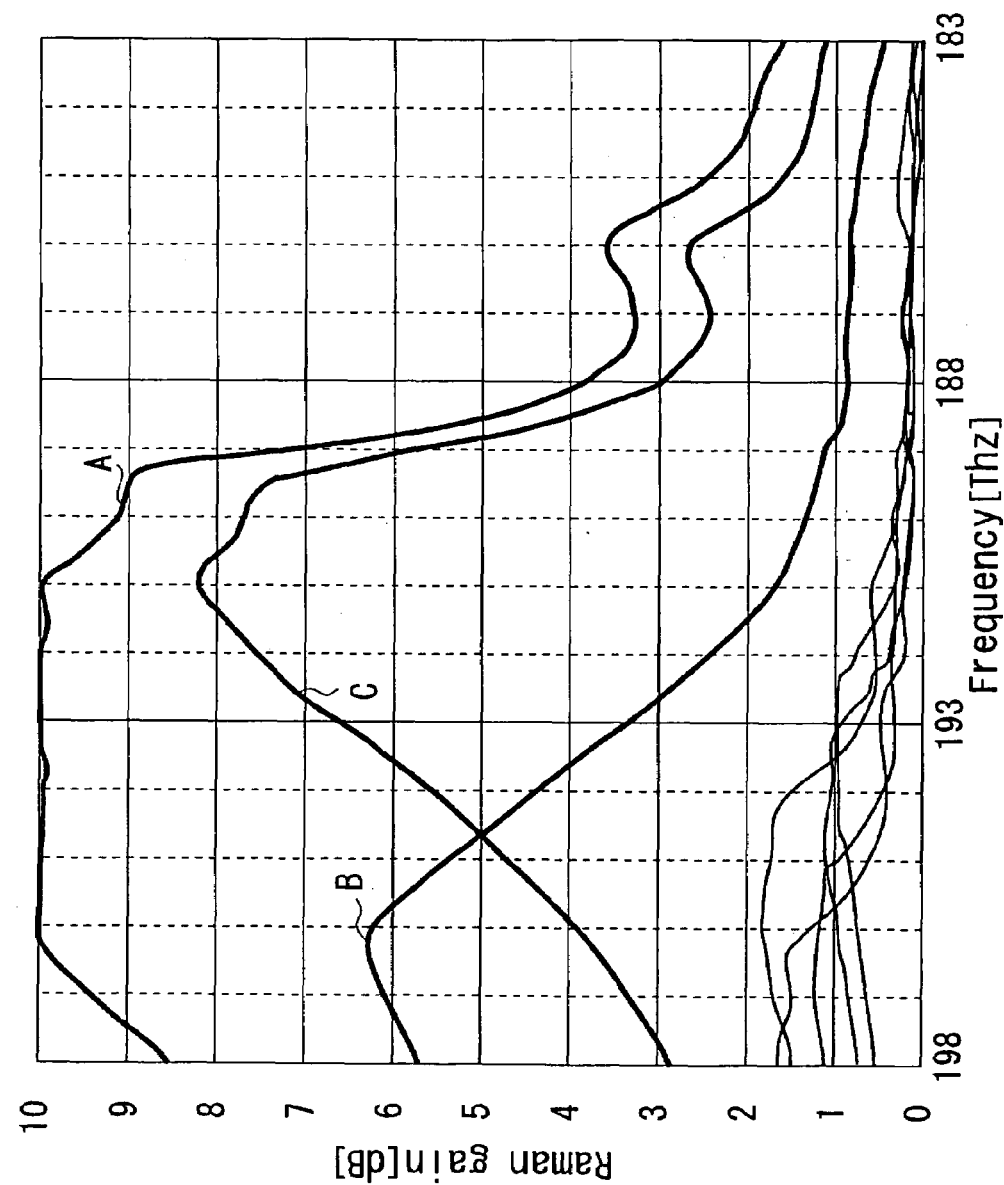
FIG. 22 is a graph illustrating amplification profiles of the pumping device in FIG. 21.

FIG. 22 illustrates Raman amplification profiles that are produced when the pumps 101–105 and 108 shown in FIG. 21 are used. The curve "A" represents the total amplification profile, the curve "B" represents the sum of amplification profiles due to the first five pumps 101–105, and the curve "C" represents an amplification profile due to the eighth pump 108. In addition, the thin lines represent individual amplification profiles of the first five pumps 101–105.

Figure 23:
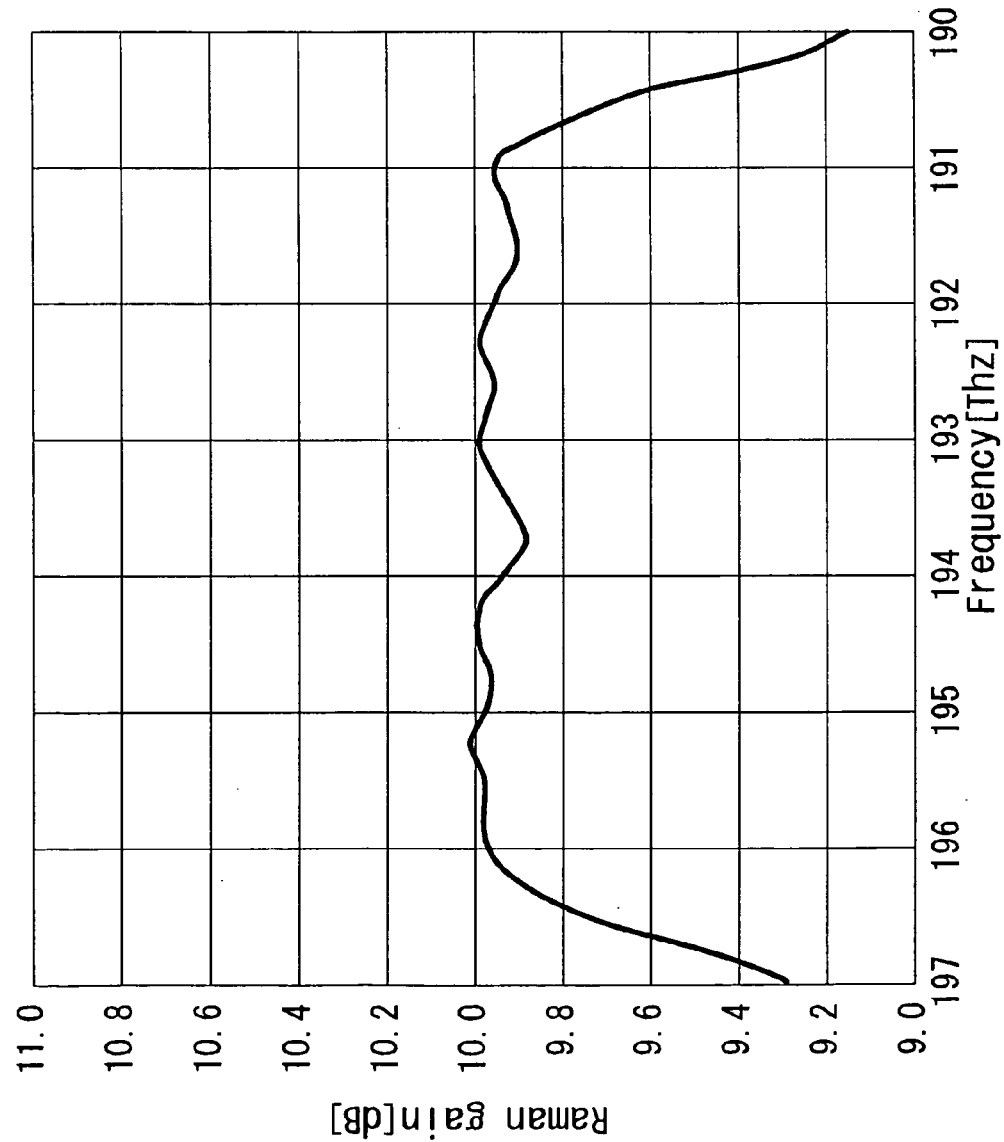
FIG. 23 is an enlarged view of the total amplification profile shown in FIG. 21.

FIG. 23 is an enlarged view of the total amplification curve "A" in FIG. 22. As shown, the peak amplification is at 10 dB, the amplification bandwidth extends from about 196 THz (a wavelength of 1529.6 nm) to about 191 THz (a wavelength of 1569.6 nm) and the amplification deviation is about 0.1 dB. Note the amplification bandwidth is wider than the amplification bandwidths shown in FIGS. 18 and 20. The reason is because the eighth pump 108 is tuned to be spaced at a larger interval (i.e., 3 THz) from the adjacent operating pump 105.

Figure 24:
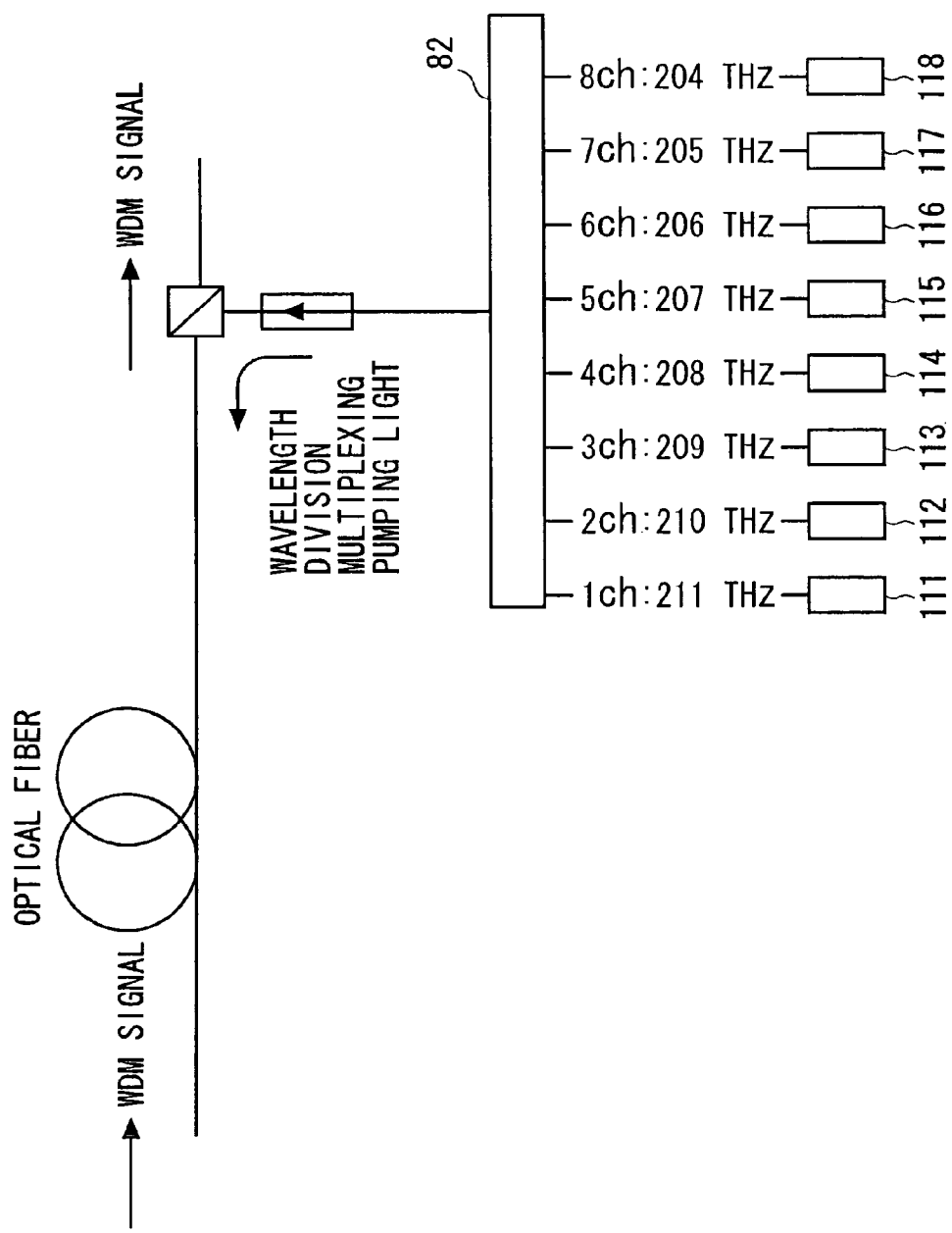
FIG. 24 is a schematic for explaining still another Raman amplification example according to the present invention.

FIG. 24 is a schematic illustrating still another Raman amplification example according to the present invention. The frequency of the first pump 111 is tuned by the control unit 206 to operate at 211 THz (a wavelength of 1420.8 nm) and the frequencies of the second to eighth pumps 112 to 118 are tuned by the control unit 206 to operate from 210 THz (a wavelength of 1427.6 nm) to 204 THz (a wavelength of 1469.6 nm). In addition, each of the pumps is tuned to be spaced at an interval of 1 THz. In this example, the fifth and sixth pumps 115 and 116 are not used. Further, the interval between operating adjacent pumps is tuned to be within an inclusive range of 6 nm to 35 nm, and the number of pumps tuned to operate on the shorter wavelength side is greater than the number of pumps tuned to operate on the longer wavelength side.

Figure 25:
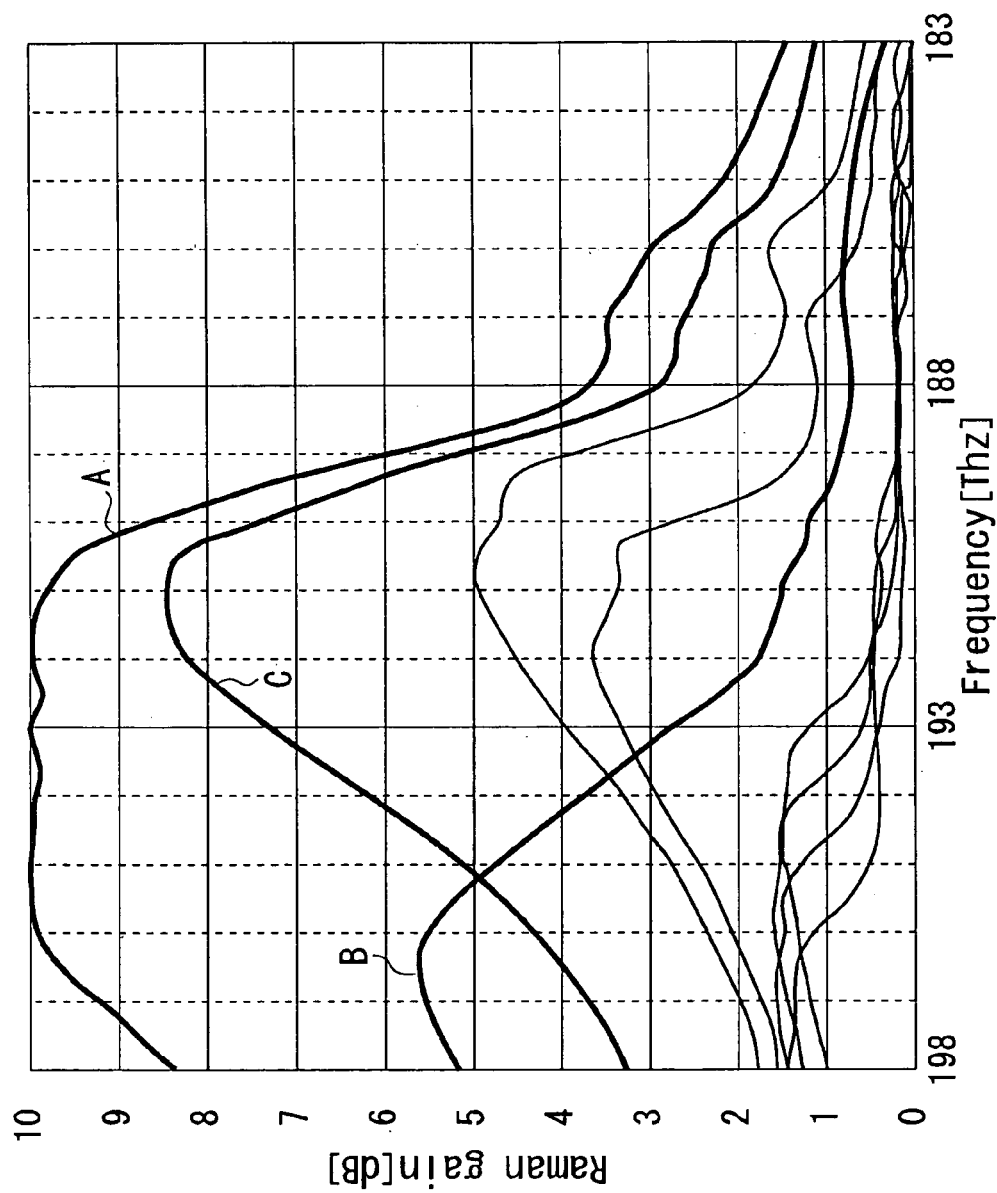
FIG. 25 is a graph illustrating amplification profiles of the pumping device in FIG. 24.

FIG. 25 illustrates Raman amplification profiles for the pumps 111–114 and 117–118 shown in FIG. 24. The curve "A" represents the total amplification profile, the curve "B" represents the sum of the amplification profiles due to the first four pumps 111–114, and the curve "C" represents the sum of the amplification profiles due to the seventh and eighth pumps 117 and 118. The thin lines represent the amplification profiles due to each of the operating pumps 111–114 and 117–118.

Figure 26:
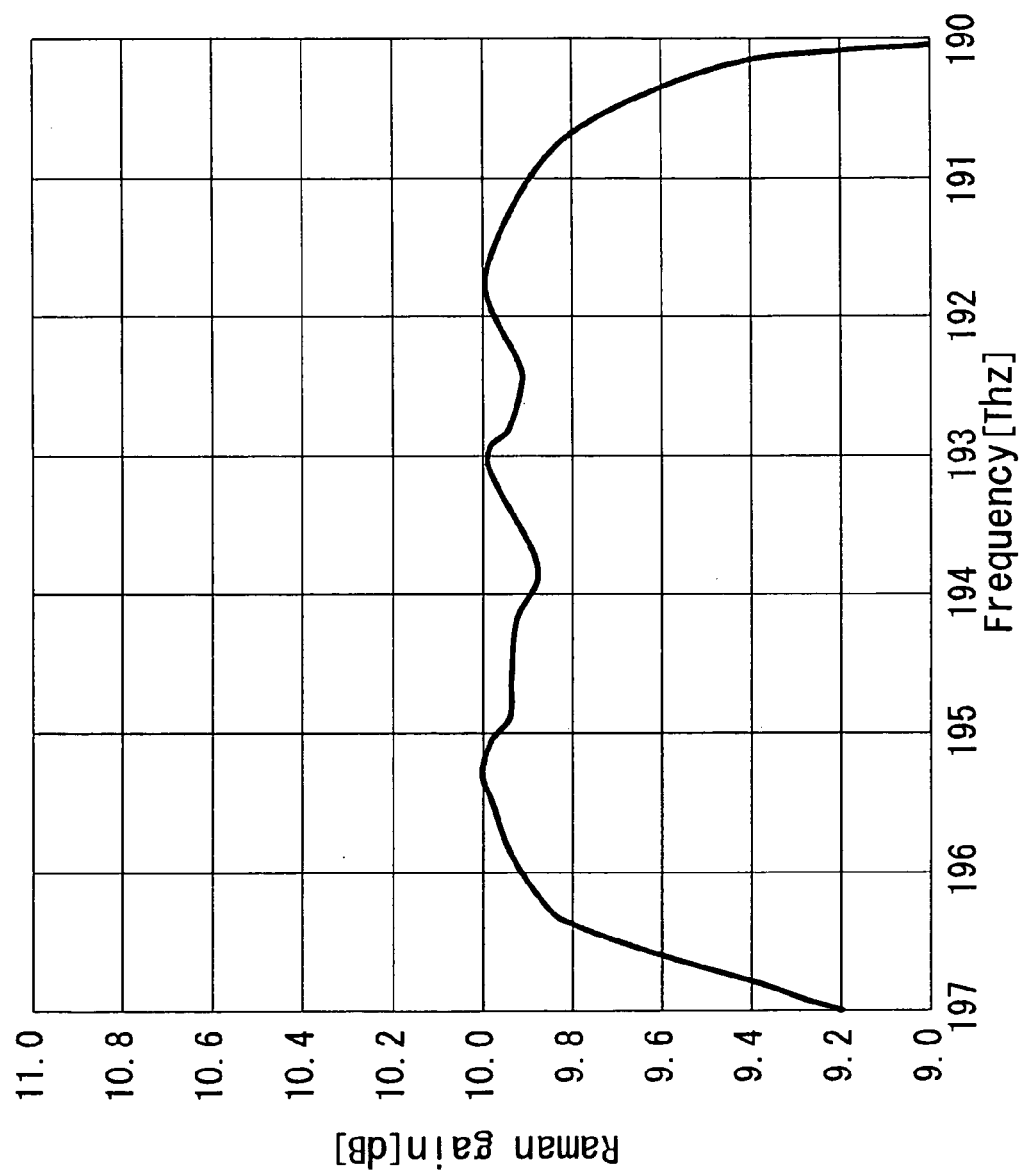
FIG. 26 is a graph illustrating an enlarged view of a total amplification profile shown in FIG. 25.

FIG. 26 is an enlarged view of the total amplification curve "A" in FIG. 25. As shown, the peak amplification is at 10 dB, the amplification bandwidth extends from about 196 THz (a wavelength of 1529.6 nm) to about 191 THz (a wavelength of 1569.6 nm) and the amplification deviation is about 0.1 dB. Further, in this example, note the amplification curve "C" in FIG. 25 is formed from the individual amplification profiles of pumps 117 and 118, whereas the amplification curve "C" in FIG. 22 is formed from the single pump 108. In addition, the maximum gain created by the pumps 117 and 118 is about 5 dB (see FIG. 24), whereas the maximum gain created by the single pump 108 is about 8 dB. Thus, in FIG. 25, the two pumps 117 and 118 can be driven at a smaller output power compared to driving a single pump.

Figure 27:
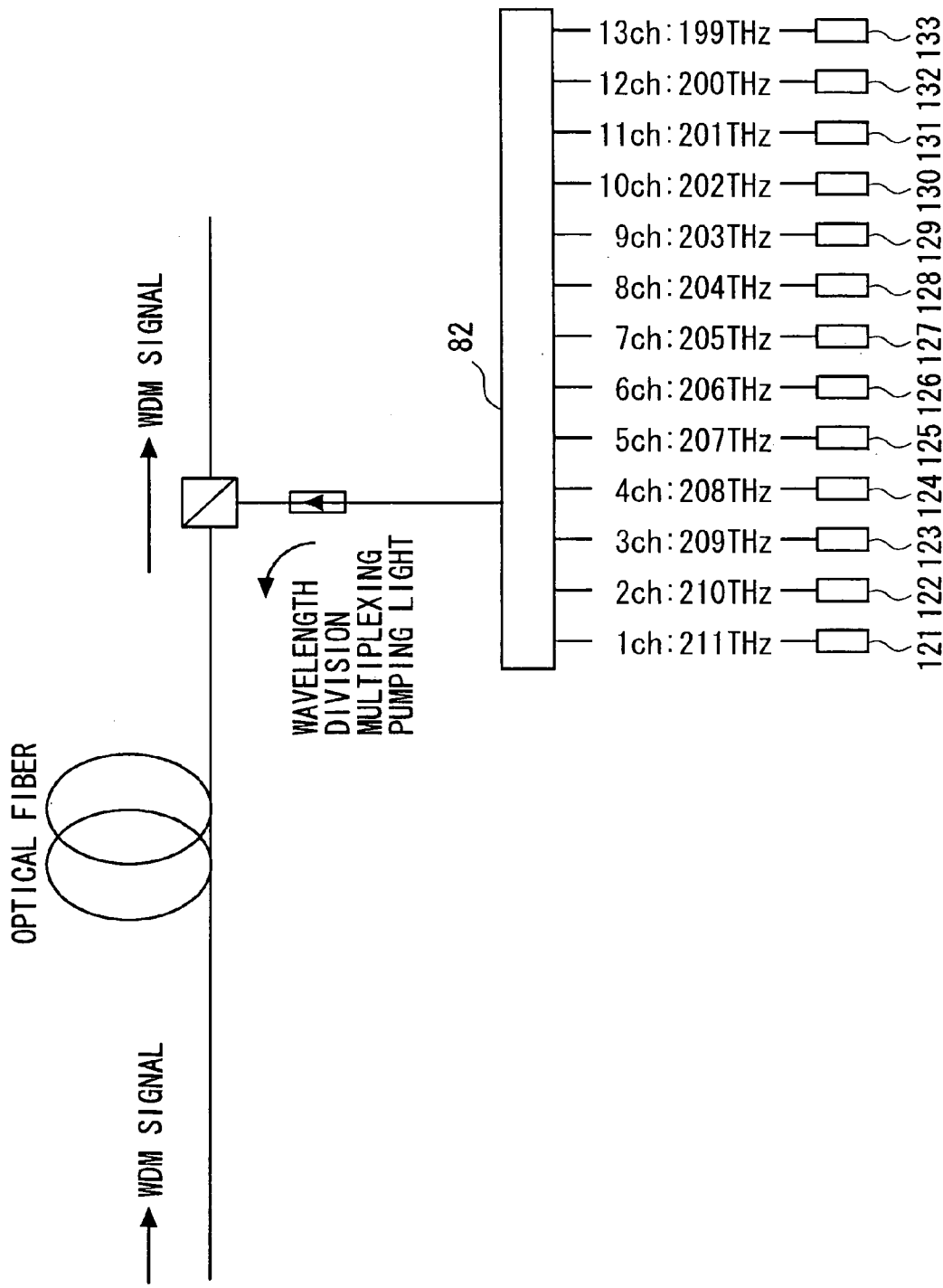
FIG. 27 is a schematic for explaining another Raman amplification example according to the present invention.

FIG. 27 is a schematic illustrating still another Raman amplification example according to the present invention. In this example, the pumping device includes a set of thirteen pumps 121–133. Each of the pumps is tuned by the control unit 206 to be separated by 1 THz and the first pump 121 is tuned to have a center frequency of 211 THz (a wavelength of 1420.8 nm) and the thirteenth pump 133 is tuned to have a center frequency of 199 THz (a wavelength of 1506.5 nm). The eleventh and twelfth pumps 131 and 132 are not used (e.g., the control unit 206 does not apply a driving current to the pumps 131 and 132). In addition, the interval between adjacent operating pumps is tuned to be within an inclusive range of 6 nm to 35 nm, and the number of pumps tuned to operate on the shorter wavelength side is greater than the number of pumps tuned to operate on the longer wavelength side.

Figure 28:
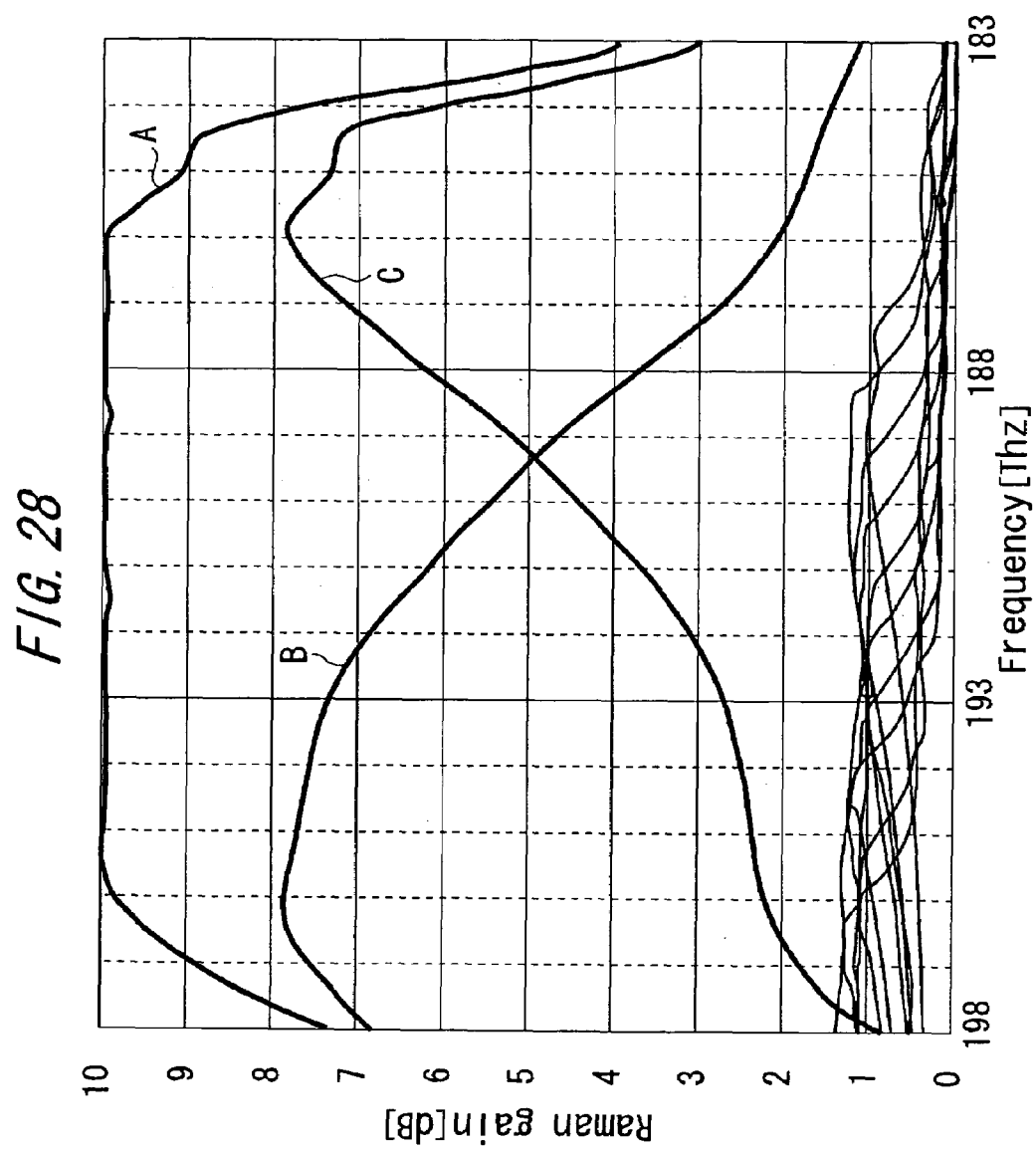
FIG. 28 is a graph illustrating amplification profiles for a pumping device including a bank of thirteen pumps.
Figure 29:
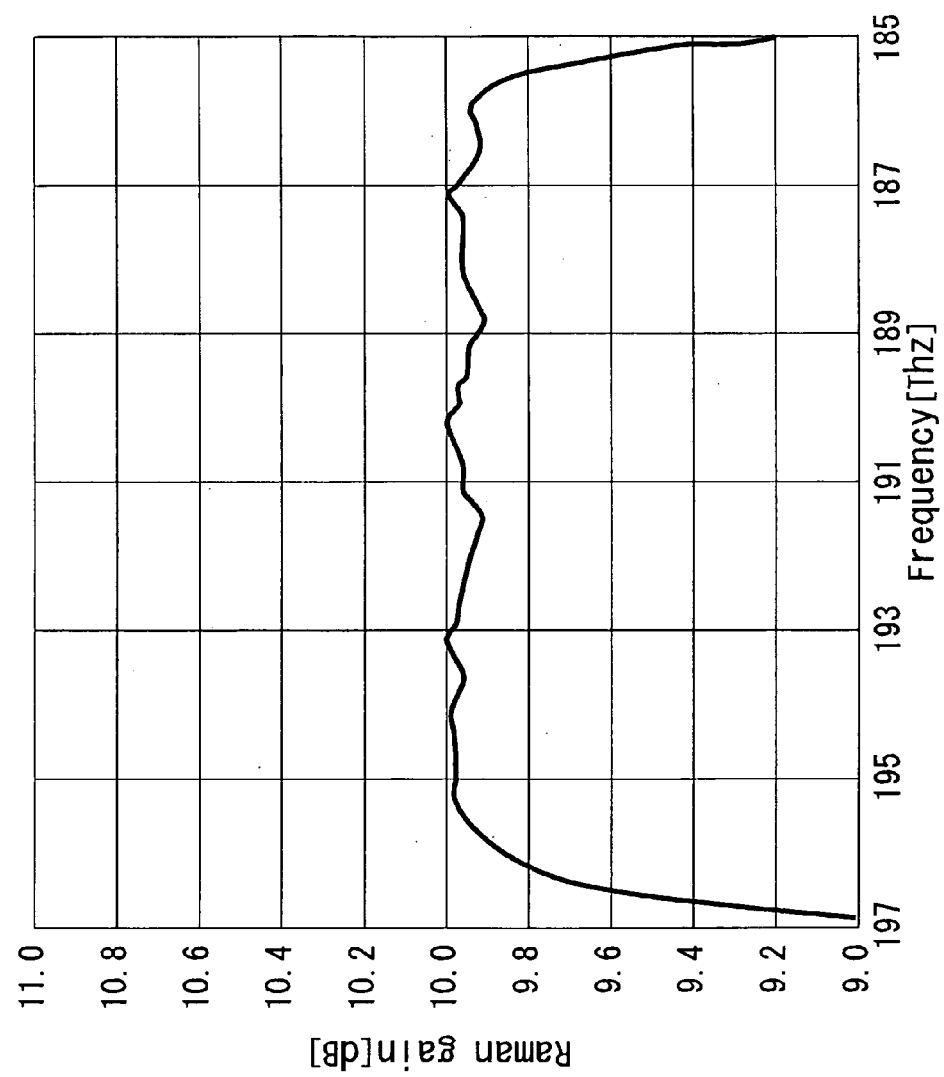
FIG. 29 is a graph illustrating an enlarged view of a total amplification profile shown in FIG. 28.

In FIG. 28, the curve "A" represents the total amplification profile, the curve "B" represents the sum of the amplification profiles due to the first to tenth pumps, and the curve "C" represents the amplification profile of the thirteenth pump. Further, the thin lines represent the individual amplification profiles of the first to tenth pumps. FIG. 29 is an enlarged view of the total amplification curve "A" in FIG. 28. As shown, the peak amplification is at 10 dB, the amplification bandwidth extends from about 196 THz (a wavelength of 1529.6 nm) to about 186 THz (a wavelength of 1611.8 nm) and the gain deviation is about 0.1 dB. Thus, by tuning additional pumps to operate toward the longer wavelength, the gain profile can be expanded. When target performance is changed from the one in FIGS. 22 to 25, the pump configuration should be changed from FIG. 21 to FIG. 24. The change in bandwidth, as discussed with regard to the embodiments of FIGS. 15, 16, 21, 24 and 27 can be accomplished by the control unit 206 (not shown in these figures) switching spare pumps into/out-of the pumping circuit and tuning their center frequencies accordingly. The control unit 206 may implement the change in bandwidth in response to a command message sent from, for example, the remote device controller 121, by way of the network 122.

Figure 30:
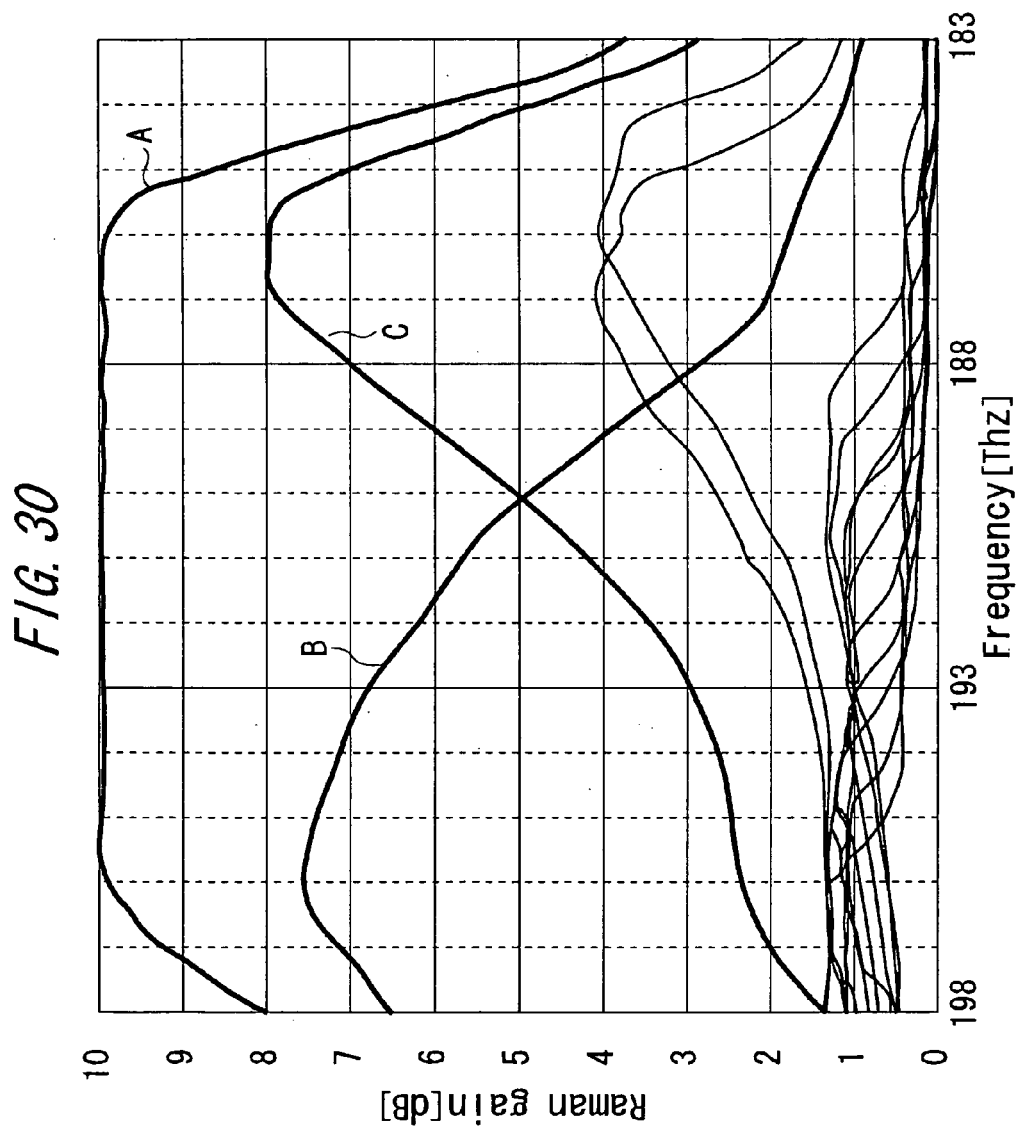
FIG. 30 is a graph illustrating amplification profiles for a variation of the pumping device in FIG. 27.

FIG. 30 illustrates amplification profiles for an example in which the pumps 130 and 131 are not used (rather than the pumps 131 and 132), as determined by the control unit 206. In addition, the interval between the adjacent operating pumps is tuned to be within an inclusive range of 6 nm to 35 nm, and the number of pumps tuned to operate on the shorter wavelength side is greater than the number of pumps tuned to operate on the longer wavelength side. In FIG. 30, the curve "A" represents the total amplification profile, the curve "B" represents the sum of amplification profiles due to the first to ninth pumps, and the curve "C" represents the sum of the amplification profiles of the twelfth and thirteenth pumps. The thin lines represent the individual amplification profiles of the operating pumps.

Figure 31:
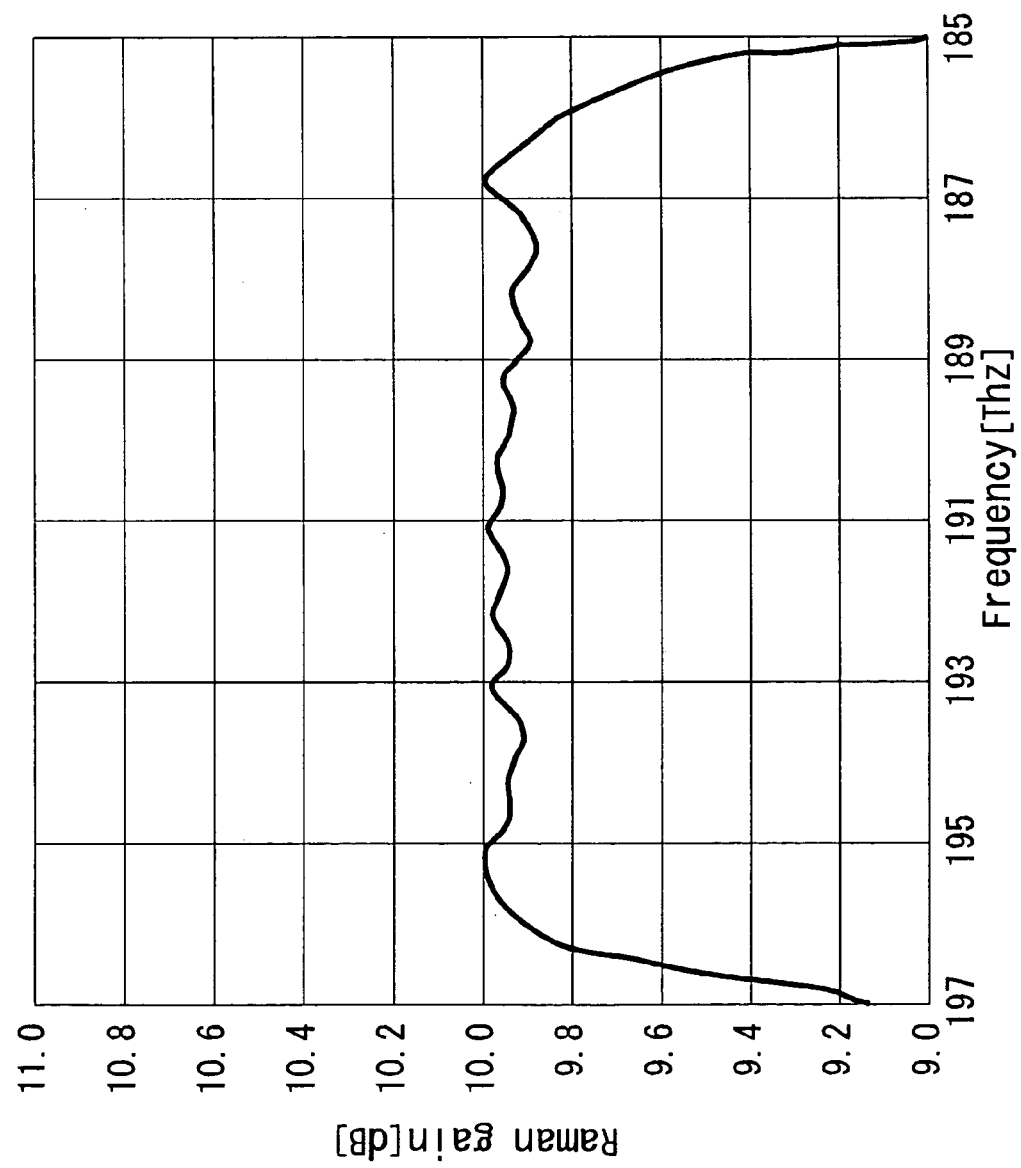
FIG. 31 is a graph illustrating an enlarged view of a total amplification profile illustrated in FIG. 30.

FIG. 31 is an enlarged view of the total amplification curve "A" in FIG. 30. As shown, the peak amplification is at 10 dB, the amplification extends from about 196 THz (a wavelength of 1529.6 nm) to about 186 THz (a wavelength of 1611.8 nm) and the amplification deviation is about 0.1 dB. Further, as evident from a comparison of the curves "C" in FIGS. 28 and 30, two pumps can be driven at a lower output value (as in FIG. 30), rather than by driving a single pump at a higher output power (as in FIG. 28).

Figure 32:
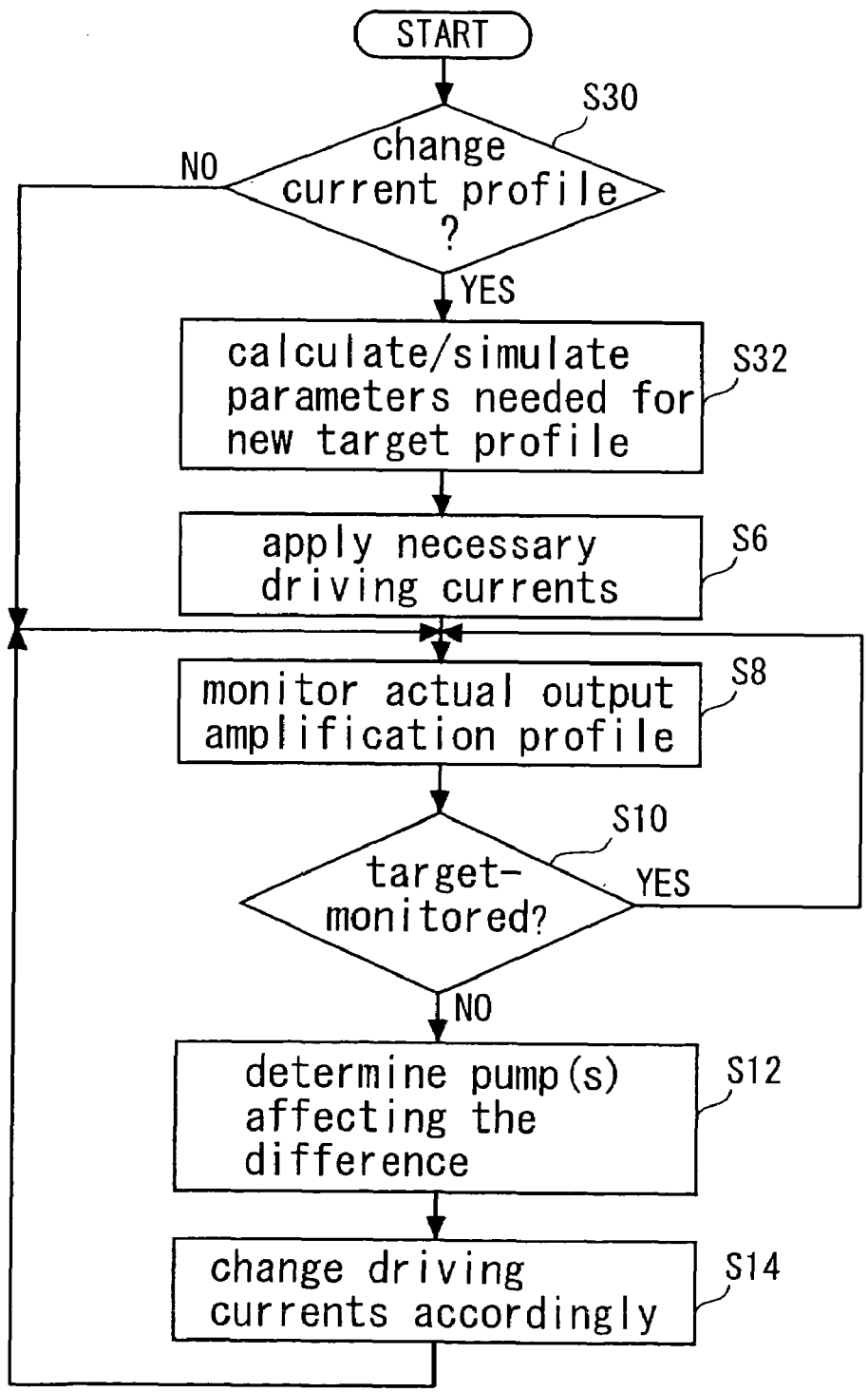
FIG. 32 is a flowchart illustrating yet another control operation according to the present invention.

FIG. 32 is a flowchart illustrating an operational procedure of the control unit 206 according to the second aspect of the present invention. Steps S6, S8, S10, S12 and S14 are the same as that described in FIG. 9, and accordingly a detailed description of these steps will be omitted. The difference between the operational procedure shown in FIG. 32 and that shown in FIG. 9 is the control unit 206 changes an existing amplification profile (step S30) to a new target amplification performance with a different amplification bandwidth. For example, an amplification bandwidth may need to be increased so as to accommodate additional channels (e.g., as the network grows in capacity). In this instance, a network engineer may instruct the control unit 206 (e.g., via the keyboard and mouse, or remotely via the remote device controller 121) to increase (or decrease) the amplification bandwidth.

The control unit 206 then determines the parameters to produce the new target profile (step S32). For example, as discussed above with reference to the total amplification profiles shown in FIGS. 18, 20, 23, 26, 29 and 31, an amplification bandwidth may be increased by tuning the pumps to increase the wavelength separation of the pump having a largest central wavelength from the pump having the next largest central wavelength. That is, the amplification bandwidth in FIG. 18 is produced by the arrangement shown in FIG. 16 (in which the pump 96 is tuned to be separated by 2 THz from the pump 95), the amplification bandwidth in FIG. 19 is produced by tuning pumps 96 and 95 so as to separate the pump 96 from the pump 95 by 2.5 THz, and the amplification bandwidth in FIG. 23 is produced by tuning pumps 108 and 105 so as to separate the pump 108 (see FIG. 21) from the pump 105 by 3 THz. Thus, the control unit 206 may dynamically change the wavelength spacings between pumps by tuning the center wavelengths of the pumps so as to change an existing amplification profile. For example, assume a pumping device includes seven pumps each tuned to be separated at a wavelength interval of 1 THz. Then, according to the second aspect of the present invention, the control unit 206 may only apply driving current to the first through fifth pumps and the seventh pump. This would result in a similar arrangement as that shown in FIG. 16.

In another example, the control unit 206 may determine a certain pump is not operating at a required output power, and then turn on or off certain pumps to offset the failing pump. For example, with reference to FIG. 21, assume the eighth pump 108 is not properly producing a gain of 8 dB, but rather is producing a gain of 5 dB. In this instance, the control unit 206 may apply a driving current to seventh pump 107 (which was previously turned off) so the pump 107 produces a gain of 5 dB. Note this example is similar to that shown in FIG. 24, in which two adjacent pumps may be operated to produce a gain of 5 dB each, rather than one pump operating at a gain of 8 dB. That is, the fifth pump 105 may be turned off in order to operate like the pumping device shown in FIG. 24.

Thus, the control unit 206 may be configured to change an existing Raman amplification profile to have a different amplification bandwidth. This change may be initiated via an external command from a network engineer (locally or remotely) or may be requested by the control unit 206 itself. That is, as discussed above, the control unit 206 may determine a certain pump is not producing the required gain (i.e., via the monitoring capabilities of the control unit 206) and then change an existing amplification profile.

Figure 33:
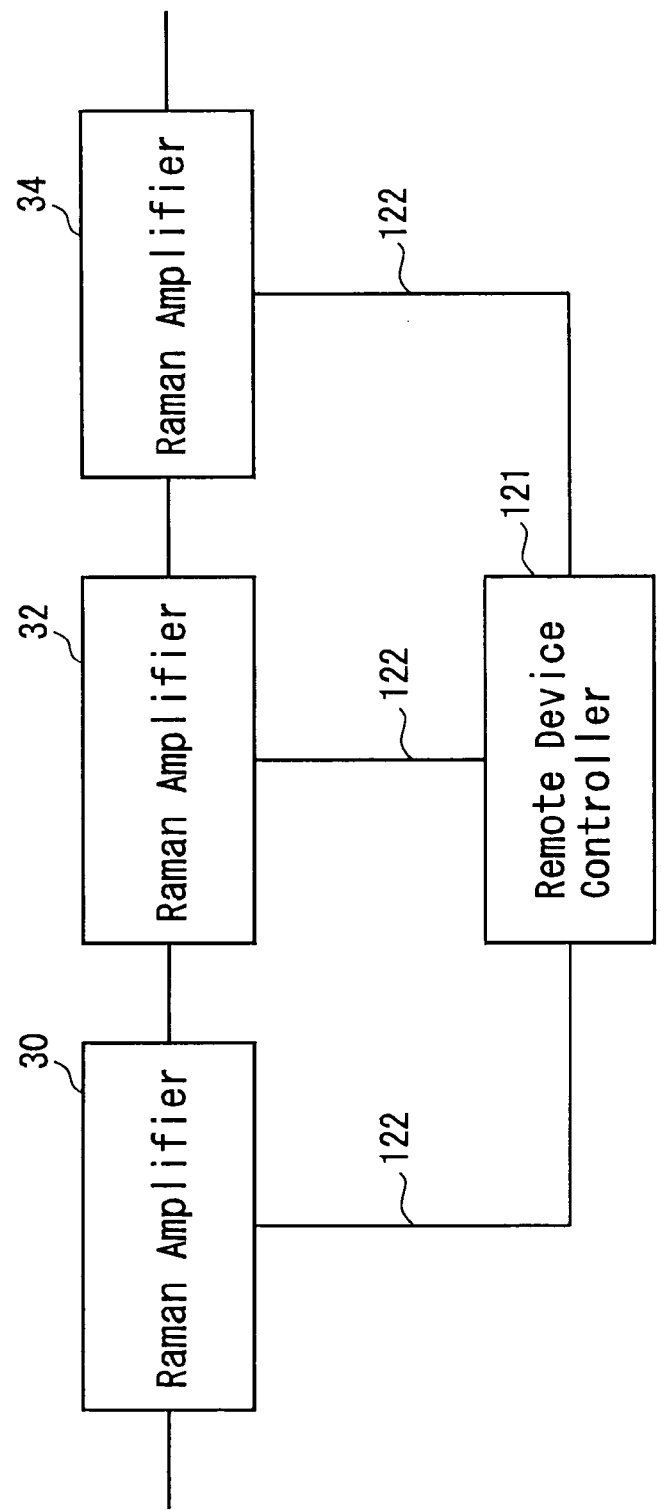
FIG. 33 is a schematic of cascaded Raman amplifiers and an associated control unit according to the present invention.

Turning now to FIG. 33, which is a schematic for illustrating an operational procedure according to the another aspect of the present invention. In more detail, FIG. 33 illustrates three cascaded Raman amplifiers 30, 32 and 34, which are remotely controlled by the remote device controller 121. In this example, the remote device controller 121 may change a total amplification profile in a first Raman amplifier to effect changes in a next Raman amplifier. For example, the remote device controller 121 may determine a pump (or pumps) in the Raman amplifier 32 is not operating. The remote device controller 121 may then increase a corresponding pump output power (or tune the center frequency) operating in the Raman amplifier 30 to offset the effect caused by the pump which does not operate in the Raman amplifier 32. Note that the remote device controller 121 may also increase a corresponding pump output power (or tune the center frequency) in the Raman amplifier 34 to offset the effect caused by the pump not operating in the Raman amplifier 32. That is, the remote device controller 121 is capable of controlling an entire operation of a plurality of cascaded Raman amplifiers such that an overall operation of the network is enhanced.

In addition, the remote device controller 121 may be connected to each of the Raman amplifiers via an Internet connection (as discussed previously). Thus, a network engineer may effectively monitor the network via the remote device controller 121. The remote device controller 121 may include a web site that is accessible from other locations as well, via an Internet Browser, such as MICROSOFT EXPLORER. In this case, the operational status of each Raman amplifier 30, 32, and 34 may be monitored continuously. Each Raman amplifier 30, 32, and 34 may include a built-in reporting mechanism that provides periodic status messages to the remote device controller 121. Alternatively, the remote device controller can download a Java, ActiveX, or other executable file to each of the Raman amplifiers 30, 32, and 34, which may then operate to collect status data for automatic report-back to the remote device controller 121. In this way, a network operator may observe the different target amplification profiles being employed in the respective Raman amplifiers 30, 32, 34 and take corrective action to help balance operations at a system level, to optimize performance at the system level.

The remote device controller 121 and respective Raman amplifiers each employ communications interfaces and processing software to enable the uploading and downloading of active content for inspection by network operators and technicians located at any of amplifiers or controller 121, but also at remote locations via the world wide web. How the world wide web operates, including communication tools such as web browsers and web pages is discussed at pages 122–166 of Gralla, P., "How The Internet Works", Que, 1999, the entire contents of which are incorporated herein by reference. Similarly, the transfer of active content between network resources in discussed in Gralla, pages 170–210, the entire contents of which are incorporated herein by reference.

In another embodiment, a tunable Raman amplifier may be used to compensate for excess loss in an EDFA system. In particular, some of the gain may fall outside of an EDFA's bandwidth, thus requiring amplification outside of that bandwidth. Furthermore, the EDFA gain may not be perfectly uniform, or require some modification to compensate for loss in the EDFA. In this situation, the controller may tune the tunable Raman amplifier so as to provide a Raman amplification that compensates for the excess loss from the EDFA.

Figure 34:
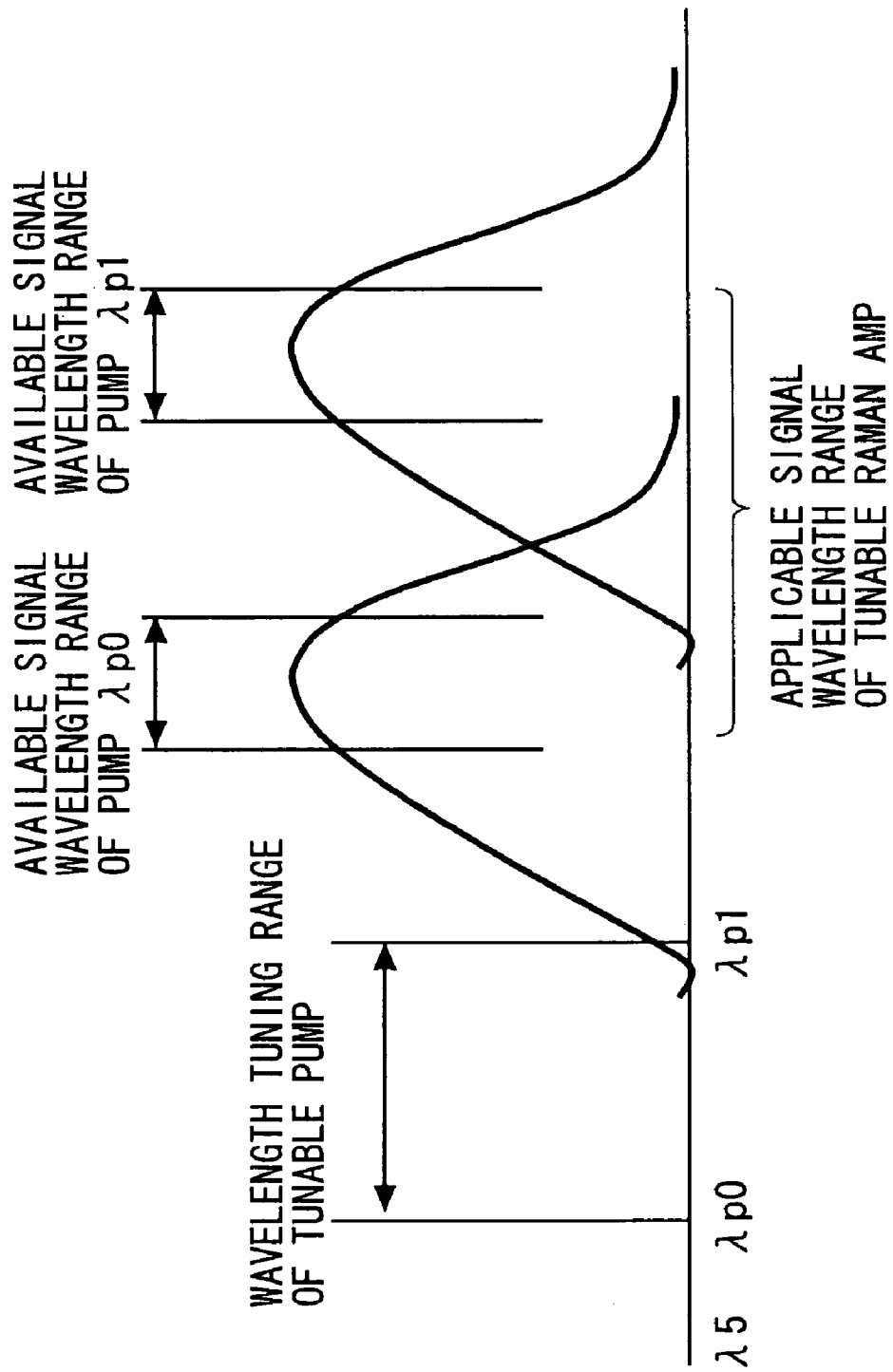
FIG. 34 is a spectral view showing a range of coverage available for a Raman amplifier that employs a tunable LD pump module.

FIG. 34 is a graph showing a correspondence between tuning range, between $\lambda p0$ through $\lambda p1$, of a tunable pump and amplification bandwidth range when the pump is used to amplify signals in a Raman amplifier. In particular, the tunable amplifier serves as a narrowband amplifier that may be tuned to $\lambda p0$ to provide amplification for an available signal at a relatively short wavelength. On the other hand, the tunable amplifier may be tuned to operate at a longer wavelength, namely $\lambda p1$, so as to provide amplification for signals in the wavelength range that corresponds with the pump for $\lambda p1$. In this way, only one type of tunable Raman amplifier need be applied to cover anywhere over a 100 nm wavelength range. An advantage with this tunable narrow band amplifier is that the amplifiers may be mass produced and field-programmed, or even adaptively controlled so as to provide "on-demand" signal gains at a predetermined wavelength band.

Figure 35:
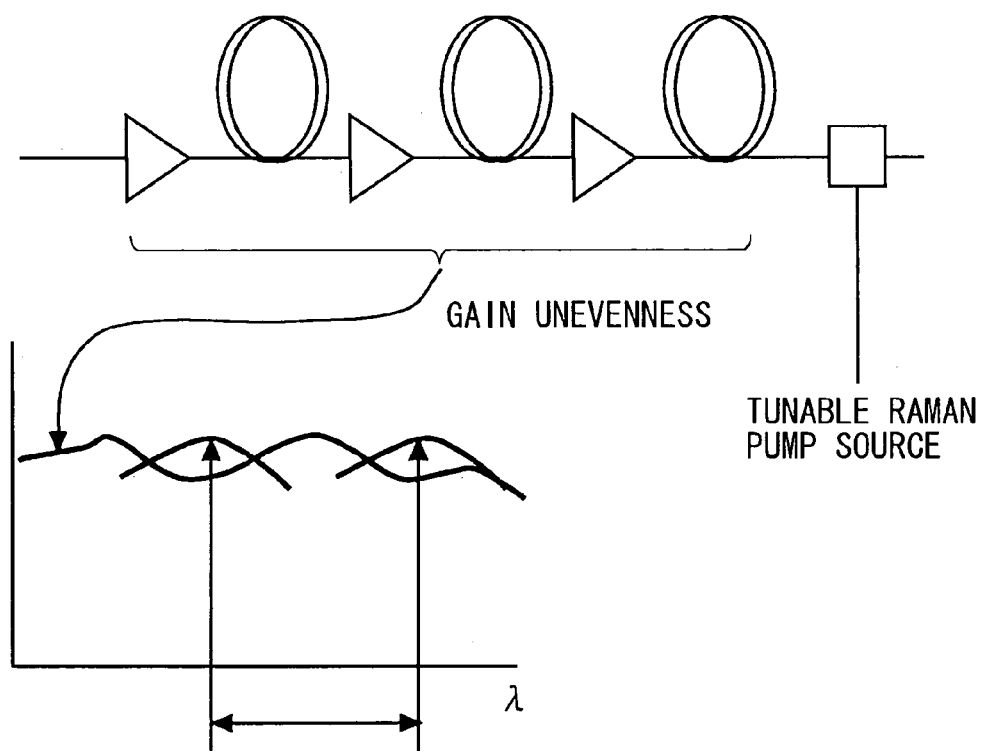
FIG. 35 is a diagram showing a tunable Raman pump source that may be used to adjust for gain unevenness in WDM amplifiers.

FIG. 35 is directed to another application of the present invention, namely the use of a tunable Raman pump source that provides Raman amplification so as to compensate for unevenness in a transmission system. As seen in FIG. 35, an exemplary gain curve is shown, where dips in the gain curve may be compensated for by tuning the Raman pump source to a wavelength such that a corresponding amplification gain peak fills a dip in the gain curve. The dips in the gain curve may be identified through FFT analysis discussed previously. Once a dip is identified, the control unit "tunes" the tunable Raman pump source so as to produce a Raman gain peak that is centered over the dipsuch that the superposition of the Raman gain with the system gain at that particular wavelength sum to be equal to, or within a predetermined range (e.g. 1 dB) of a target performance requirement.

Figure 36:
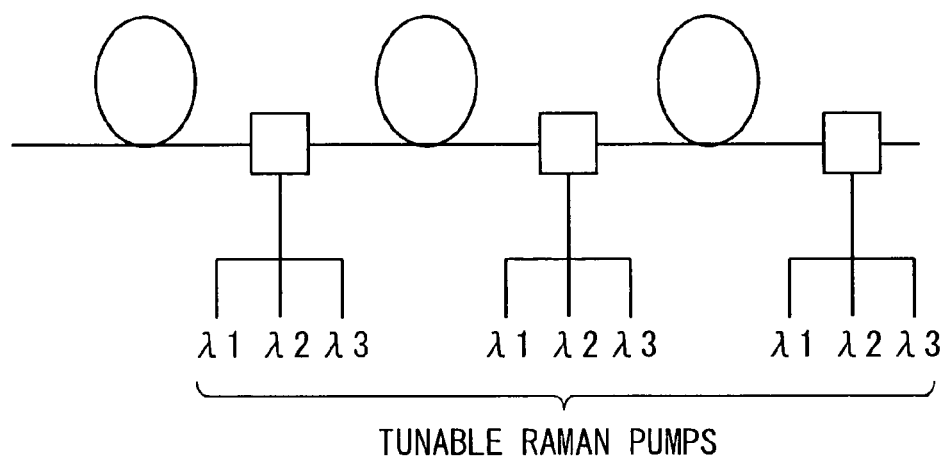
FIG. 36 is a multi, cascaded WDM amplifier system that includes tunable Raman amplifier pumps A, B, and C.
Figure 37:
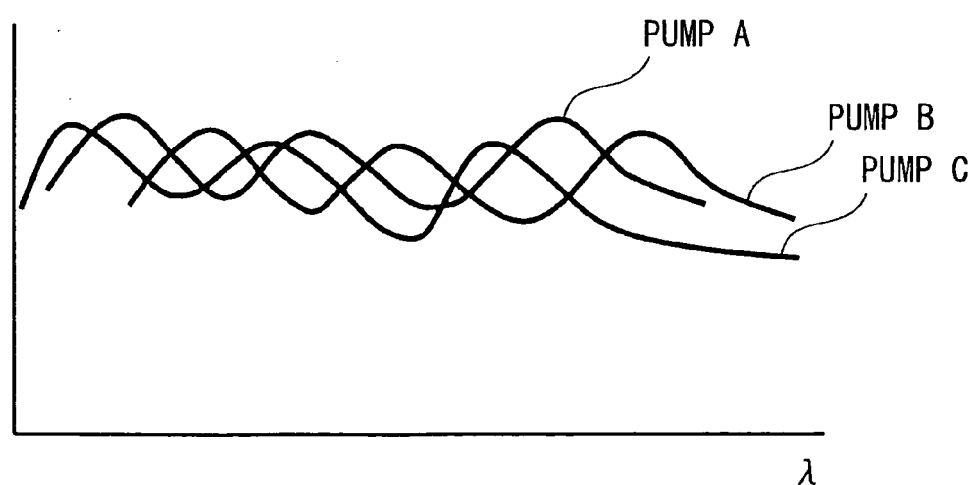
FIG. 37 is a spectral diagram showing respective gains produced by tunable Raman pumps A, B, and C.

FIG. 36 is a block diagram of a fully-automated Raman design amplification system that includes a plurality of tunable Raman pumps A, B, C. Each of the tunable Raman pumps include three different tunable Raman LD pumps $\lambda 1$, $\lambda 2$, $\lambda 3$. As shown in FIG. 37, the respective pumps provide gain profiles as a function of wavelength. By using an iterative FFT process, the controller can identify the respective pump wavelength spacings for the different tunable Raman pumps so that the composite profile obtained by superposition of the gains at a particular wavelength combine to within a target range. For a monitoring process that uses an FFT process as discussed above, deviations between a desired target level, and an actual level, may be determined for respective subbands of the spectrum of interest. In this way, the iterative process can be achieved fully and automatically in a factory setting or in the field. The tunable LD pump modules may also be used in combination with fixed wavelength LD pump modules.

Figure 1B:
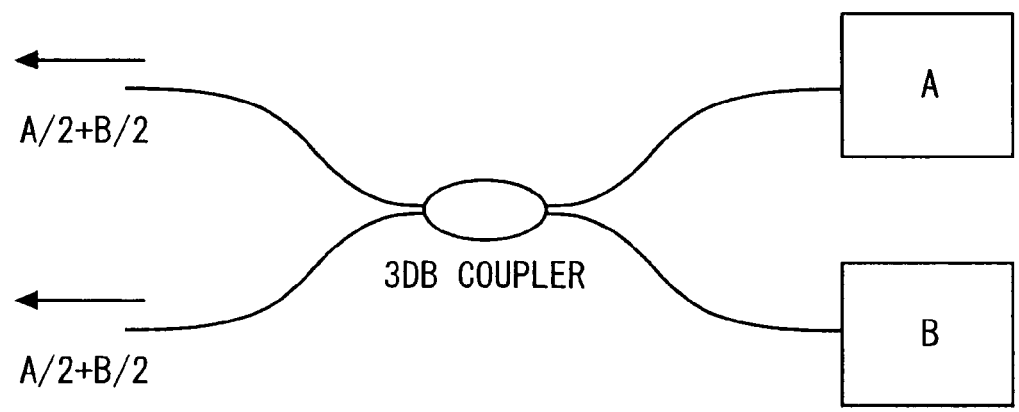
FIG. 1B is a block diagram of a conventional redundant pump source for a Raman amplifier.
Figure 38:
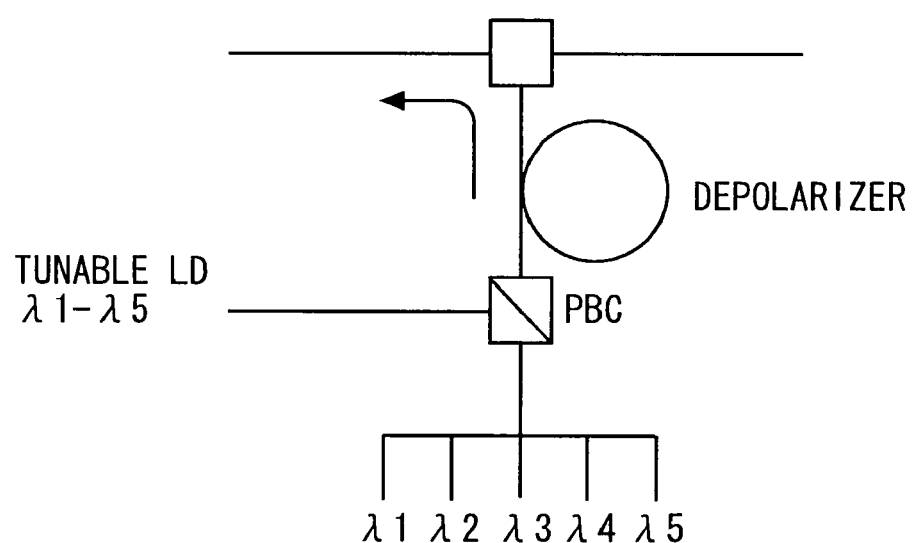
FIG. 38 is a block diagram showing a redundant WDM pump source, that uses a tunable LD pump module as a back-up for a set of pump modules that operate at different wavelengths.

FIG. 38 is an embodiment of the present invention that provides an alternative to the conventional redundant pump source previously discussed with regard to FIG. 1B. Once again, as shown in FIG. 1B, two LD pump sources are combined to provide system-level redundancy. The power levels of each LD pumps are twice that of a normal operating level. This way, if one of the LD pump sources fails, the power level of the surviving LD pump module may be increased to offset the power lost from the failed LD pump.

In contrast, according to the present invention, a single tunable LD (or multiple may be used as well) is combined through a polarization beam combiner with pumps $\lambda 1$, $\lambda 2$, $\lambda 3$, $\lambda 4$, $\lambda 5$. While 5 fixed wavelength pumps are shown, a greater or lesser number of fixed wavelength pumps may be used as well. If all of the pumps $\lambda 1-\lambda 5$ are operating properly, then the tunable LD laser need not be turned on. The controller would make this determination based on the monitoring of the composite gain or signal profile from the Raman amplifier. On the other hand, if one of the pumps $\lambda 1-\lambda 5$ fails (or falls outside a specified value) the controller will instruct the tunable LD to provide a pump light at one of the wavelengths $\lambda 1-\lambda 5$ so as to compensate (or replace) the pump light from the failed LD pump. If more than one of the LD pumps $\lambda 1-\lambda 5$ fail, then the controller executes a routine to either tune the tunable LD to a wavelength that falls in between the two failed pumps (in the case where the pumps are adjacent to one another in wavelength), or selects the wavelength for one of the two failed pumps so as to provide compensation when the pumps are not sequential (e.g. perhaps pump $\lambda 1$ and $\lambda 4$). As compared with the conventional approach of FIG. 1B, there is no need to "over design" the pumps $\lambda 1-\lambda 5$ so as to be able to double its output power because the tunable LD can be brought on-line at the applicable wavelength so as to fill-in for a failed pump.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, an type of disk including floppy disks, optical disks, CD-ROMs, and magneto-optical disks, ROMs, RAMs, EPROMs, EEPROMs, magnetic or optical cards, or any type of pure software inventions (e.g., word processing, accounting, Internet related, etc.) media suitable for storing electronic instructions.

Obviously, additional numerous modifications and variations of the present invention are possible in light of the above teachings. It is therefore to be understood that within the scope of the appended claims, the present invention may be practiced otherwise than as specifically described herein.

What is claimed is:

1. A tunable Raman amplifier for amplifying a WDM optical signal in an amplification medium, comprising:
    a tunable multimode pump source that includes
        a tunable semiconductor laser module configured to emit light having multiple longitudinal modes with a center wavelength that is controllably tunable over a predetermined tuning range, and
        an optical fiber aligned to receive the light from the laser module;
    an optical coupler configured to optically interconnect the tunable multimode pump source with the amplification medium so as to apply the light to the amplification medium; and
    a tuning mechanism configured to controllably alter a control characteristic of said tunable semiconductor laser module based on only on a monitored portion of the optical signal in the amplification medium and change said center wavelength from a first wavelength to a second wavelength within the predetermined tuning range, and
    a controller configured to monitor said monitored portion of the optical signal via a tap downstream, in a signal propagation direction, of the optical coupler.

2. A tunable Raman amplifier of claim 1, wherein:
    said amplification medium is a dispersion compensation fiber.

3. A tunable Raman amplifier of claim 1, wherein:
    said amplification medium is connected to an EDFA; and
    said tuning mechanism is configured to change said center wavelength to said second wavelength so as to provide a predetermined amount of signal amplification in a spectral band in which a gain profile of said EDFA is different by a predetermined amount than a predetermined EDFA gain profile.

4. A tunable Raman amplifier of claim 1, wherein:
    said tunable semiconductor laser module is a sole tunable semiconductor laser module in said tunable Raman amplifier, and
    said controller includes an interface configured to receive an input signal requesting said tuning mechanism to tune said tunable semiconductor laser module so as to provide amplification in a predetermined amplification band.

5. A tunable Raman amplifier of claim 1, wherein:
    said controller is configured to produce a tuning signal and apply said tuning signal to said tunable semiconductor laser module.

6. A tunable Raman amplifier of claim 5, further comprising:
a monitoring mechanism configured to monitor a monitoring signal, said monitoring signal being at least one of a signal level and a gain profile across a predetermined amplification bandwidth in the amplification medium.

7. A tunable Raman amplifier of claim 6, wherein:
said monitoring mechanism includes an input signal level detection mechanism configured to detect a signal level of a signal propagating through said transmission optical fiber; and
said controller being configured to determine the gain profile by comparing said input signal level and said monitoring signal.

8. A tunable Raman amplifier of claim 6, wherein:
said controller includes:
a Fast Fourier Transform mechanism that performs a FFT on said monitoring signal so as to obtain an FFT result, and
a comparison mechanism that is configured to compare said FFT result with a performance profile, and determine if at least a spectral portion of a difference between said FFT result and said performance profile is greater than a predetermined amount.

9. A tunable Raman amplifier claim 8, further comprising:
another tunable semiconductor laser module configured to emit light having multiple longitudinal modes with another center wavelength that is controllably tunable over the predetermined tuning range, wherein
said controller being configured to tune said another center wavelength to another predetermined wavelength so that said performance profile is within said predetermined amount in said spectral portion.

10. A tunable Raman amplifier of claim 5, wherein:
said controller is configured to produce a power control signal that adjusts an output power of said tunable semiconductor laser module to a predetermined power level.

11. A tunable Raman amplifier of claim 10, wherein:
said controller is configured to generate separate control signals for the tunable semiconductor laser module and other tunable semiconductor laser modules, wherein each of said separate control signals includes said tuning signal and said power control signal.

12. A tunable Raman amplifier of claim 5, wherein:
said controller being configured to produce said tuning signal as at least one of a temperature control signal and a current control signal.

13. A tunable Raman amplifier of claim 1, further comprising:
a first fixed wavelength semiconductor laser module configured to emit light having multiple longitudinal modes with a center wavelength that is substantially fixed at a second wavelength;
a second fixed wavelength semiconductor laser module configured to emit light having multiple longitudinal modes with a center wavelength that is substantially fixed at a third wavelength; and
a polarization beam combiner, configured to combine the light from said first fixed wavelength semiconductor laser, said second fixed wavelength semiconductor laser and said tunable semiconductor laser module, such that said tunable semiconductor laser module is tunable to one of said second wavelength and said third wavelength when a corresponding one of said first fixed wavelength semiconductor laser and said second semiconductor laser fails.

14. A tunable multimode pump source for a Raman amplifier for amplifying a WDM optical signal in an amplification medium, comprising:
a tunable semiconductor laser module configured to emit light having multiple longitudinal modes with a center wavelength that is controllably tunable over a predetermined tuning range based on only a monitored portion of the optical signal in the amplification medium;
an optical fiber aligned to receive the light from the laser module, and
a controller configured to monitor said monitored portion of the optical signal via a tap downstream, in a signal propagation direction, of the optical coupler.

15. The tunable multimode pump source of claim 14, wherein:
said optical fiber includes a fiber Bragg grating.

16. The tunable multimode pump source of claim 14, wherein:
said tunable semiconductor laser module includes at least one of a DBR laser and a DFB laser.

17. The tunable multimode pump source of claim 14, wherein
said tunable semiconductor laser module being responsive to a tuning signal by changing said center wavelength from a first wavelength in said predetermined tuning range to a second wavelength in said tuning range.

18. The tunable multimode pump source of claim 17, wherein:
said controller is configured to produce said tuning signal and apply said tuning signal to said tunable semiconductor laser module.

19. The tunable multimode pump source of claim 18, further comprising:
a monitoring mechanism configured to monitor a monitoring signal, said monitoring signal being at least one of a signal level and a gain profile across a predetermined amplification bandwidth in a transmission optical fiber that is configured to carry an optical signal therein.

20. The tunable multimode pump source of claim 19, wherein:
said monitoring mechanism includes an input signal level detection mechanism configured to detect a signal level of a signal propagating through said transmission optical fiber; and
said controller being configured to determine the gain profile by comparing said input signal level and said monitoring signal.

21. The tunable multimode pump source of claim 19, wherein:
said controller includes
a Fast Fourier Transform mechanism that performs a FFT on said monitoring signal so as to obtain an FFT result, and
a comparison mechanism that is configured to compare said FFT result with a performance profile, and determine if at least a spectral portion of a difference between said FFT result and said performance profile are greater than a predetermined amount.

22. The tunable multimode pump source of claim 21, further comprising:

another tunable semiconductor laser module configured to emit light having multiple longitudinal modes with another center wavelength that is controllably tunable over the predetermined tuning range, wherein said controller being configured to tune said another center wavelength to another predetermined wavelength so that said performance profile is within said predetermined amount across a wider spectral portion than if just said tunable semiconductor laser module is used by itself.

23. The tunable multimode pump source of claim 18, wherein:
said controller is configured to produce a power control signal that adjusts an output power of said tunable semiconductor laser module to a predetermined power level.

24. The tunable multimode pump source of claim 23, wherein:
said controller is configured to generate separate control signals for the tunable semiconductor laser module and other tunable semiconductor laser modules, wherein each of said separate control signals includes said tuning signal and said power control signal.

25. The tunable multimode pump source of claim 18, wherein:
said controller being configured to produce said tuning signal as at least one of a temperature control signal and a current control signal.

26. The tunable multimode pump source of claim 25, further comprising:
a heating element configured to heat at least a portion of said tunable semiconductor laser module to a predetermined temperature in response to receiving said temperature control signal.

27. The tunable multimode pump source of claim 14, further comprising:
a first fixed wavelength semiconductor laser module configured to emit light having multiple longitudinal modes with a center wavelength that is substantially fixed at a second wavelength;
a second fixed wavelength semiconductor laser module configured to emit light having multiple longitudinal modes with a center wavelength that is substantially fixed at the a third wavelength; and
a polarization beam combiner, configured to combine the light from said first fixed wavelength semiconductor laser, said second fixed wavelength semiconductor laser and said tunable semiconductor laser module, such that said tunable semiconductor laser module is tunable to one of said second wavelength and said third wavelength when respective of one of said first fixed wavelength semiconductor laser and said second semiconductor laser fails.

28. A method for operating a tunable Raman amplifier for amplifying a WDM optical signal in an amplification medium, comprising steps of:
emitting light from a tunable multimode pump source, said light having multiple longitudinal modes with a center wavelength;
receiving said light in an optical fiber aligned to receive the light from the pump source;
coupling the light to the amplification medium with a coupler so as to amplify an optical signal propagating therethrough;
monitoring a monitoring portion of the optical signal taken by a tap downstream, in a propagation direction of said optical signal, of said coupler; and
tuning said multimode pump source based on only the monitored portion of optical signal in the amplification medium so as to change said center wavelength to another center wavelength.

29. The method of claim 28, further comprising a step of:
producing a tuning signal from a controller and applying said tuning signal to said tunable semiconductor laser module so as to initiate said tuning step.

30. The method of claim 29, wherein said monitoring step includes:
monitoring an output of said Raman amplifier, said output being at least one of a signal level and a gain profile across a predetermined amplification bandwidth in the amplification medium.

31. The method of claim 30, further comprising steps of:
performing a FFT on said output so as to obtain an FFT result, and
comparing said FFT result with a performance profile, and determining if at least a spectral portion of a difference between said FFT result and said performance profile is greater than a predetermined amount.

32. The method of claim 31, further comprising steps of:
emitting from another tunable multimode light source light having multiple longitudinal modes with another center wavelength that is controllably tunable over the predetermined tuning range, and
controllably tuning said another center wavelength to another predetermined wavelength so that said performance profile is within said predetermined amount in said spectral portion.

33. The method of claim 32, further comprising a step of:
adjusting an output power of said tunable semiconductor laser module to a predetermined power level so as bring said performance profile within said predetermined amount in said spectral portion.

34. The method of claim 32, further comprising a step of:
generating separate control signals for the tunable semiconductor laser module and other tunable semiconductor laser modules, wherein each of said separate control signals includes a tuning signal and a power control signal.

35. The method of claim 28, further comprising steps of:
emitting light from a first fixed wavelength semiconductor laser having multiple longitudinal modes with a center wavelength that is substantially fixed at a second wavelength;
emitting light from a second fixed wavelength semiconductor laser having multiple longitudinal modes with a center wavelength that is substantially fixed at a third wavelength; and
combining the light from said first fixed wavelength semiconductor laser, said second fixed wavelength semiconductor laser and said tunable semiconductor laser module, such that said tunable semiconductor laser module is tunable to one of said second wavelength and said third wavelength when a corresponding one of said first fixed wavelength semiconductor laser and said second semiconductor laser fails.

36. A tunable Raman amplifier for amplifying a WDM optical signal in an amplification medium, comprising:
means for emitting light having multiple longitudinal modes with a center wavelength;
means for receiving said light in an optical fiber aligned to receive the light;
means for coupling the light to the amplification medium so as to amplify an optical signal propagating therethrough;

means for monitoring a monitored portion of the optical signal downstream, in a signal propagation direction, of said means for coupling; and means for tuning said means for emitting so as to change said center wavelength to another center wavelength based on only the monitored portion of the optical signal in the amplification medium.

37. The tunable Raman amplifier of claim 36, further comprising:

means for producing a tuning signal and applying said tuning signal to said means for tuning.

38. The tunable Raman amplifier of claim 37, wherein said means for monitoring monitors an output of said Raman amplifier, said output being at least one of a signal level and a gain profile across a predetermined amplification bandwidth in the amplification medium.

39. The tunable Raman amplifier of claim 38, further comprising:

means for performing a FFT on said output so as to obtain an FFT result, and means for comparing said FFT result with a performance profile, and determining if at least a spectral portion of a difference between said FFT result and said performance profile is greater than a predetermined amount.

40. The tunable Raman amplifier of claim 39, further comprising:

means for emitting from another tunable multimode light source light having multiple longitudinal modes with another center wavelength that is controllably tunable over the predetermined tuning range; and means for controllably tuning said another center wavelength to another predetermined wavelength so that said performance profile is within said predetermined amount in said spectral portion.

41. The tunable Raman amplifier of claim 36, further comprising:

means for emitting light at a second wavelength;

means for detecting a failure of said means for emitting light at a second wavelength;

means for tuning said center wavelength to a second wavelength when said means for detecting detects a failure.

42. A tunable Raman amplifier for amplifying a WDM optical signal in an amplification medium, comprising:

a tunable multimode pump source that includes a tunable semiconductor laser module configured to emit light having multiple longitudinal modes with a center wavelength that is controllably tunable over a predetermined tuning range, and an optical fiber aligned to receive the light from the laser module;

an optical coupler configured to optically interconnect the tunable multimode pump source with the amplification medium so as to apply the light to the amplification medium; and a tuning mechanism configured to controllably alter a control characteristic of said tunable semiconductor laser module based on only on a monitored portion of the optical signal in the amplification medium and change said center wavelength from a first wavelength to a second wavelength within the predetermined tuning range, a controller configured to monitor said monitored portion of the optical signal via a tap downstream, in a signal propagation direction, of the optical coupler, and wherein said controller performs a control operation based on the monitored portion of the optical signal, but not based on light emitted from the tunable semiconductor laser module emitted in a direction opposite to a propagation direction of the pumping light.

* * * * *